United States Patent
Yuki et al.

(10) Patent No.: US 10,644,823 B2
(45) Date of Patent: May 5, 2020

(54) OPTICAL TRANSFER SYSTEM, CONTROL DEVICE, OPTICAL TRANSFER METHOD, AND TRANSFER DEVICE

(71) Applicant: FUJITSU LIMITED, Kawasaki-shi, Kanagawa (JP)

(72) Inventors: Masahiro Yuki, Kawasaki (JP); Tomoaki Takeyama, Yokohama (JP); Kazuo Takatsu, Kawaguchi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/435,692

(22) Filed: Jun. 10, 2019

(65) Prior Publication Data

US 2019/0386767 A1    Dec. 19, 2019

(30) Foreign Application Priority Data

Jun. 15, 2018  (JP) ................. 2018-115023

(51) Int. Cl.
*H04J 14/02* (2006.01)
*H04B 10/66* (2013.01)
*H04B 10/572* (2013.01)

(52) U.S. Cl.
CPC ........ *H04J 14/0227* (2013.01); *H04B 10/572* (2013.01); *H04B 10/66* (2013.01)

(58) Field of Classification Search
CPC .... H04J 14/02; H04J 14/0228; H04J 14/0227; H04J 14/0257; H04B 10/61; H04B 10/6164; H04B 10/29; H04B 10/2507; H04B 10/2563; H04B 10/611

USPC ......... 398/79, 202, 204, 208, 173, 175, 176, 398/177, 180, 181, 158, 159, 33
See application file for complete search history.

(56) References Cited

U.S. PATENT DOCUMENTS

| 5,798,853 A | 8/1998 | Watanabe |
| 7,043,099 B1 | 5/2006 | Watanabe |
| 9,379,822 B2 * | 6/2016 | Iizuka .................. H04B 10/611 |
| 2014/0086582 A1 * | 3/2014 | Iwano .................... H04B 10/61 398/48 |

FOREIGN PATENT DOCUMENTS

| JP | 2000-75330 | 3/2000 |
| JP | 2004-348158 | 12/2004 |
| WO | 2012/153856 | 11/2012 |

* cited by examiner

*Primary Examiner* — Hanh Phan
(74) *Attorney, Agent, or Firm* — Fujitsu Patent Center

(57) ABSTRACT

An optical transfer method of an optical transfer system including a transmitter, a first wavelength converter configured to use first excitation light to perform wavelength-conversion of first signal light which is the transmission light into second signal light in a different wavelength band, a second wavelength converter configured to use second excitation light to perform wavelength-conversion of the second signal light into third signal light in a different wavelength band, and a receiver configured to receive the third signal light, the method includes acquiring a wavelength of the transmission light, a wavelength of the first excitation light, and a wavelength of the second excitation light; and deciding local emission light of the receiver based on a wavelength of reception light of the receiver obtained from the wavelength of the transmission light, the wavelength of the first excitation light, and the wavelength of the second excitation light.

14 Claims, 34 Drawing Sheets

| FIRST WAVELENGTH CONVERTER INTERNAL TEMPERATURE (°C) | ZERO-DISPERSION WAVELENGTH (nm) |
|---|---|
| -10 | ... |
| 0 | ... |
| 10 | ... |
| 20 | 1575.6 |
| 30 | 1575.8 |
| 40 | 1576.0 |
| ... | ... |

| SECOND WAVELENGTH CONVERTER INTERNAL TEMPERATURE (°C) | ZERO-DISPERSION WAVELENGTH (nm) |
|---|---|
| -10 | ... |
| 0 | ... |
| 10 | ... |
| 20 | 1577.2 |
| 30 | 1577.5 |
| 40 | 1577.8 |
| ... | ... |

OPTICAL TRANSFER SYSTEM, CONTROL DEVICE, OPTICAL TRANSFER METHOD, AND TRANSFER DEVICE

CROSS-REFERENCE TO RELATED APPLICATION

This application is based upon and claims the benefit of priority of the prior Japanese Patent Application No. 2018-115023, filed on Jun. 15, 2018, the entire contents of which are incorporated herein by reference.

FIELD

The embodiments relate to an optical transfer system, a control device, an optical transfer method, and a transfer device.

BACKGROUND

In recent years, along with expansion of demands related to communication, methods for, for example, increasing the numbers of optical fiber cores, increasing the optical signal capacity per wavelength, increasing the numbers of wavelength division multiplexing (WDM) channels, and so on to thereby expand the transfer capacity have been sought for. However, since the cost of laying optical fibers, and the like are high, attempts are being made to expand the transfer capacity mainly by increasing the optical signal capacity or by increasing the numbers of WDM channels, without increasing the numbers of optical fiber cores.

Such an optical transfer system uses digital coherent optical receivers on receiving-side transfer devices. Such a receiver uses local emission light to optically demodulate signal light from reception light. Local emission light is normally output with a wavelength that matches a channel grid determined by the International Telecommunication Standardization Sector (ITUT). The wavelength of local emission light is desirably the same as the wavelength of reception light, but there are small wavelength differences therebetween in actual devices. Deterioration of reception quality caused by those wavelength differences is coped with by electrical correction processes by digital signal processors (DSPs) in receivers to thereby make sure that required transfer performance is realized.

In recent years, techniques have been proposed in order to attempt to further expand transfer capacity by utilizing, as the wavelength band of optical signals, the conventional (C) band, the long (L) band, or short (S) band, for example. Such a multi-band WDM system using a plurality of wavelength bands uses wavelength converters that may, for example, convert the wavelength of an optical signal into a different wavelength, and perform wavelength-conversion of C-band multiplexed light into L-band or S-band multiplexed light, to thereby achieve high-capacity transfer.

The related art includes techniques disclosed in Japanese Laid-open Patent Publication No. 2000-75330, Japanese Laid-open Patent Publication No. 2004-348158, International Publication Pamphlet WO 2012/153856, and the like, for example.

When converting the wavelength of received signal light into a different wavelength, a wavelength converter may, in some cases, convert the wavelength into a wavelength that is different from a targeted wavelength after conversion, due to various causes such as changes in environmental temperature or variation in characteristics of optical fibers. Such a wavelength mismatch in some cases makes the wavelength of reception light received at a receiver greatly different from the wavelength of local emission light. For example, if the wavelength of reception light far exceeds a channel grid next to corresponding local emission light, it may become difficult to electrically correct the reception light received on the side of a receiver, and reception of the reception light may become difficult.

In view of the above-mentioned circumstances, it is desirable to provide an optical transfer system or the like that may suppress deterioration of quality of reception light that is received on the side of a receiver.

SUMMARY

According to an aspect of the embodiment, an optical transfer system includes a transmitter configured to transmit transmission light, a first wavelength converter configured to use first excitation light to perform wavelength-conversion of first signal light which is the transmission light into second signal light in a different wavelength band, a second wavelength converter configured to use second excitation light to perform wavelength-conversion of the second signal light into third signal light in a different wavelength band, a receiver configured to use local emission light to receive the third signal light as reception light, and a control device configured to acquire a wavelength of the transmission light, a wavelength of the first excitation light, and a wavelength of the second excitation light, and decide a wavelength of local emission light of the receiver based on a wavelength of the reception light of the receiver obtained from the wavelength of the transmission light, the wavelength of the first excitation light, and the wavelength of the second excitation light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A is an explanatory figure illustrating an exemplary zero-dispersion wavelength table of a first wavelength converter;

FIG. 5B is an explanatory figure illustrating an exemplary zero-dispersion wavelength table of a second wavelength converter;

DESCRIPTION OF EMBODIMENTS

Hereinafter, embodiments of an optical transfer system, a control device, an optical transfer method, and a transfer device disclosed by the present application are explained in detail based on the drawings. Individual embodiments shall not limit the disclosed techniques. Individual embodiments illustrated below may be combined as appropriate with one another as long as such combinations do not cause contradictions.

First Embodiment

Figure 1:
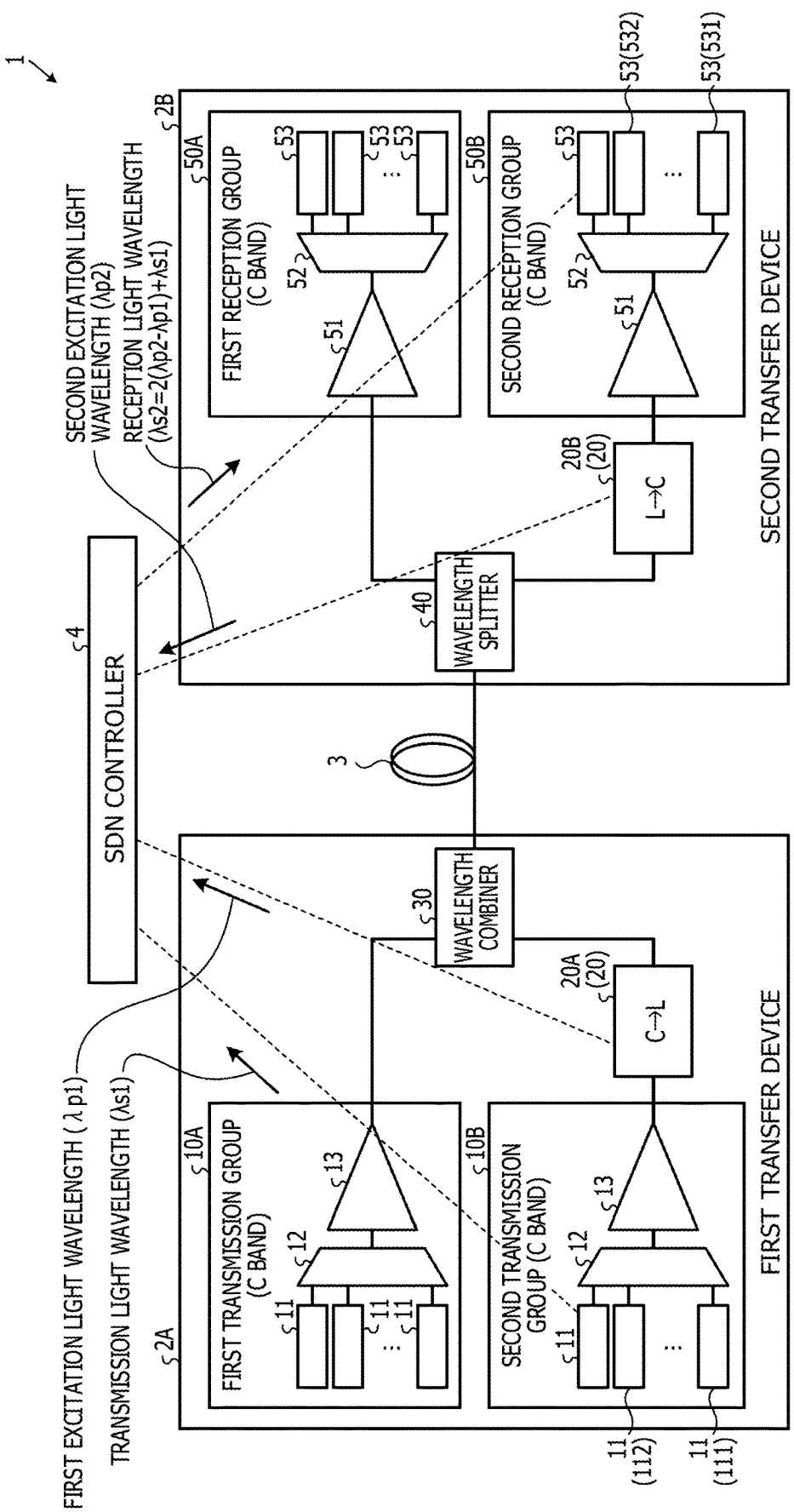
FIG. 1 is an explanatory figure illustrating an exemplary WDM system in a first embodiment.

FIG. 1 is an explanatory figure illustrating an exemplary WDM system in a first embodiment. The WDM system 1 illustrated in FIG. 1 includes a first transfer device 2A, a second transfer device 2B, a transfer line fiber 3 that establishes a coupling between the first transfer device 2A and the second transfer device 2B, and an SDN controller 4. The WDM system 1 is a multi-band system that transfers multiplexed light in different wavelength bands, for example, the C band and L band. The SDN controller 4 is a control device that manages and controls the WDM system 1.

The first transfer device 2A includes a first transmission group 10A, a second transmission group 10B, a first wavelength converter 20A (20), and a wavelength combiner 30. The first transmission group 10A includes a plurality of C-band transmitters 11, an optical combiner 12, and an optical amplifier 13. The transmitters 11 output signal light in different C-band wavelengths to the optical combiner 12. The optical combiner 12 combines signal light from individual transmitters 11, and outputs C-band first multiplexed light to the optical amplifier 13. The optical amplifier 13 is an erbium doped optical fiber amplifier (EDFA), for example. The optical amplifier 13 optically amplifies the first multiplexed light, and outputs the optically amplified C-band first multiplexed light to the wavelength combiner 30.

The second transmission group 10B includes a plurality of C-band transmitters 11, an optical combiner 12, and an optical amplifier 13. The transmitters 11 output signal light in different C-band wavelengths to the optical combiner 12. The optical combiner 12 combines signal light from individual transmitters 11, and outputs C-band first multiplexed light to the optical amplifier 13. The optical amplifier 13 optically amplifies the first multiplexed light, and outputs the amplified C-band first multiplexed light to the first wavelength converter 20A. Although the first transmission group 10A and second transmission group 10B have the built-in optical amplifiers 13, they need not be present if first multiplexed light from the optical combiners 12 have sufficient power, and configurations related to them may be changed as appropriate.

The first wavelength converter 20A is a degenerate four-wave mixing wavelength converter that performs wavelength-conversion of the C-band first multiplexed light from the second transmission group 10B into L-band second multiplexed light using first excitation light. The first wavelength converter 20A outputs the wavelength-converted L-band second multiplexed light to the wavelength combiner 30. The wavelength combiner 30 combines the C-band first multiplexed light from the first transmission group 10A and the L-band second multiplexed light from the first wavelength converter 20A, and outputs the first multiplexed light and second multiplexed light to the transfer line fiber 3.

The second transfer device 2B includes a wavelength splitter 40, a second wavelength converter 20B (20), a first reception group 50A, and a second reception group 50B. The wavelength splitter 40 splits the multiplexed light received from the transfer line fiber 3 into C-band first multiplexed light and L-band second multiplexed light, outputs the first multiplexed light to the first reception group 50A, and outputs the second multiplexed light to the second wavelength converter 20B. The first reception group 50A includes an optical amplifier 51, an optical splitter 52, and a plurality of receivers 53. The optical amplifier 51 optically amplifies the first multiplexed light from the wavelength splitter 40, and outputs the optically amplified first multiplexed light to the optical splitter 52. The optical amplifier 51 is an EDFA, for example. The optical splitter 52 outputs C-band signal light with any wavelength in the first multiplexed light to the individual receivers 53. Each receiver 53 uses local emission light with a wavelength directed to itself to receive reception light which is included in the C-band signal light with any wavelength in the first multiplexed light from the optical splitter 52, and is directed to itself.

The second wavelength converter 20B performs wavelength-conversion of the L-band second multiplexed light from the wavelength splitter 40 into C-band first multiplexed light using second excitation light, and outputs the wavelength-converted C-band first multiplexed light to the second reception group 50B. The second reception group 50B includes an optical amplifier 51, an optical splitter 52, and a plurality of receivers 53. The optical amplifier 51 optically amplifies the wavelength-converted first multiplexed light from the second wavelength converter 20B, and outputs the optically amplified first multiplexed light to the optical splitter 52. The optical splitter 52 outputs C-band signal light with any wavelength in the first multiplexed light to the individual receivers 53. Each receiver 53 uses local emission light with a wavelength directed to itself to receive reception light which is included in the C-band signal light with any wavelength in the first multiplexed light from the optical splitter 52, and is directed to itself. Each transmitter 11 in the first transmission group 10A uses an arbitrary C-band wavelength for the transmitter 11 to communicate with a receiver 53 which is among the plurality of receivers 53 in the first reception group 50A, and corresponds to the transmitter 11. Similarly, each transmitter 11 in the second transmission group 10B also uses an arbitrary C-band wavelength for the transmitter 11 to communicate with a receiver 53 which is among the plurality of receivers 53 in the second reception group 50B, and corresponds to the transmitter 11. For example, a transmitter 111 in the second transmission group 10B, and a receiver 531 in the second reception group 50B use signal light with the same wavelength C1 to communicate, and a transmitter 112, and a receiver 532 use signal light with the same wavelength C2 to communicate. For example, the transmitters 11 and the receivers 53 each form a communication pair that uses the same wavelength.

Figure 2:
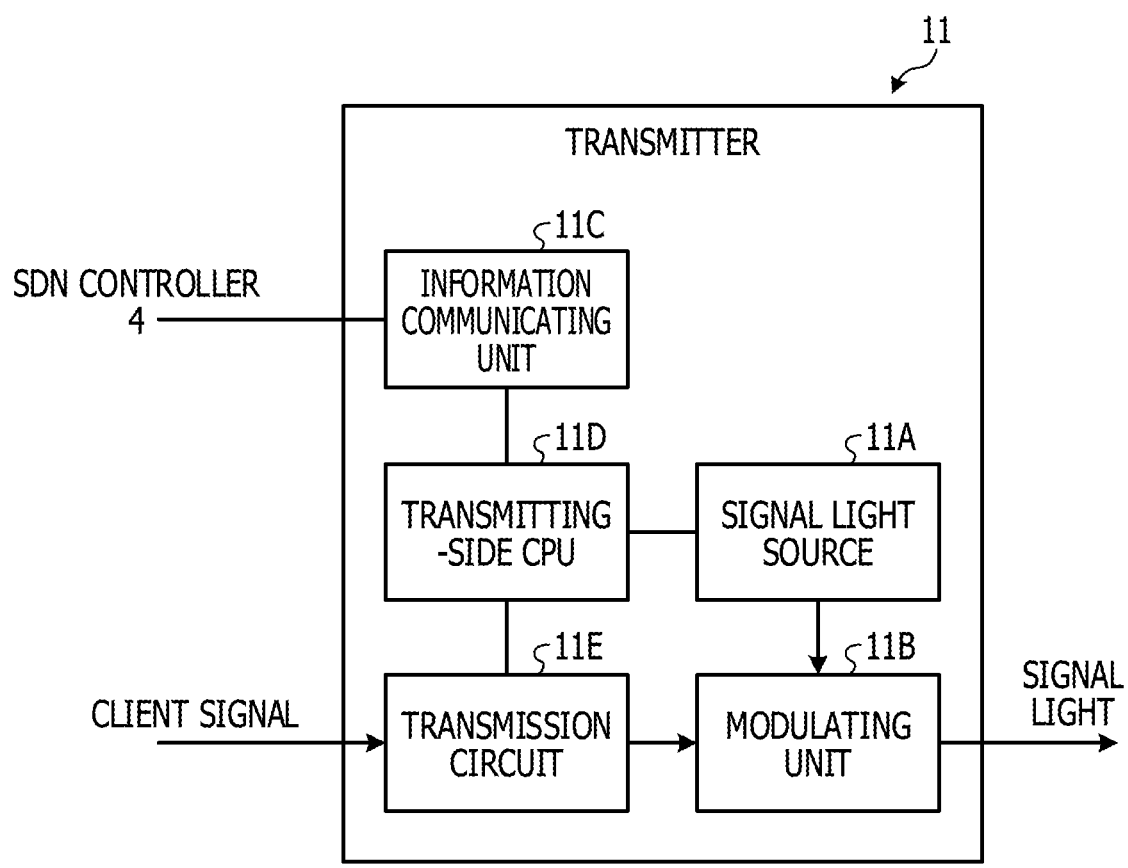
FIG. 2 is an explanatory figure illustrating an exemplary transmitter.

FIG. 2 is an explanatory figure illustrating an exemplary transmitter. The transmitter illustrated by reference to FIG. 2 may be one of the transmitters 11 illustrated in FIG. 1. The transmitter 11 illustrated in FIG. 2 is a digital coherent optical transmitter. The transmitter 11 includes a signal light source 11A, a modulating unit 11B, an information communicating unit 11C, a transmitting-side CPU 11D, and a transmission circuit 11E. The signal light source 11A is a laser diode (LD) that emits C-band signal light. The transmission circuit 11E is a circuit that executes a transmission process on a client signal. The modulating unit 11B optically modulates the client signal using the C-band signal light, and outputs signal light which is the optically-modulated client signal to the optical combiner 12. The information communicating unit 11C is a communicating unit that communicates control information with the SDN controller 4, for example. The transmitting-side CPU 11D performs overall control of the transmitter 11.

Figure 3:
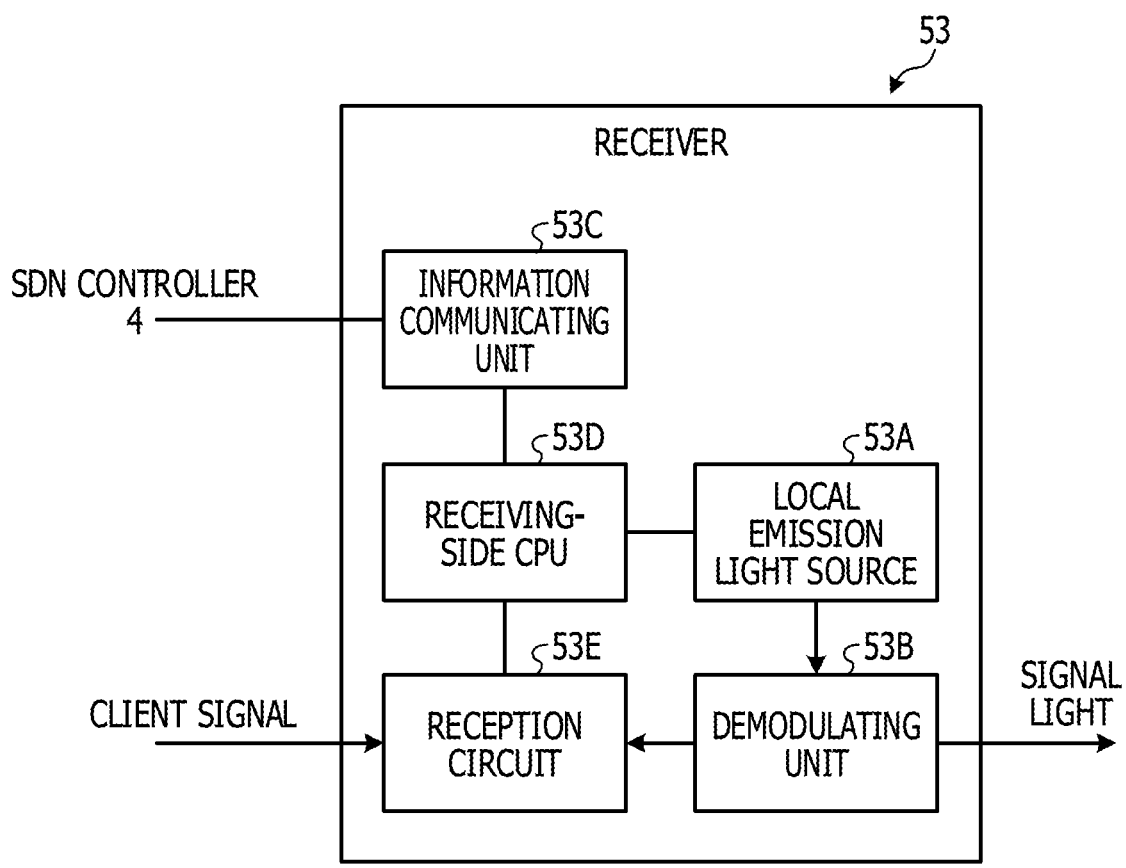
FIG. 3 is an explanatory figure illustrating an exemplary receiver.

FIG. 3 is an explanatory figure illustrating an exemplary receiver. The receiver illustrated by reference to FIG. 3 may be one of the receivers 53 illustrated in FIG. 1. The receiver 53 illustrated in FIG. 3 is a digital coherent optical receiver. The receiver 53 includes a local emission light source 53A, a demodulating unit 53B, an information communicating unit 53C, a receiving-side CPU 53D, and a reception circuit 53E. The local emission light source 53A is an LD that emits local emission light. The demodulating unit 53B uses the local emission light to optically demodulate signal light from reception light. The reception circuit 53E is a circuit that executes a reception process of extracting a client signal from the optically demodulated signal light. The information communicating unit 53C is a communicating unit that communicates control information with the SDN controller 4, for example. The receiving-side CPU 53D performs overall control of the receiver 53.

Figure 4:
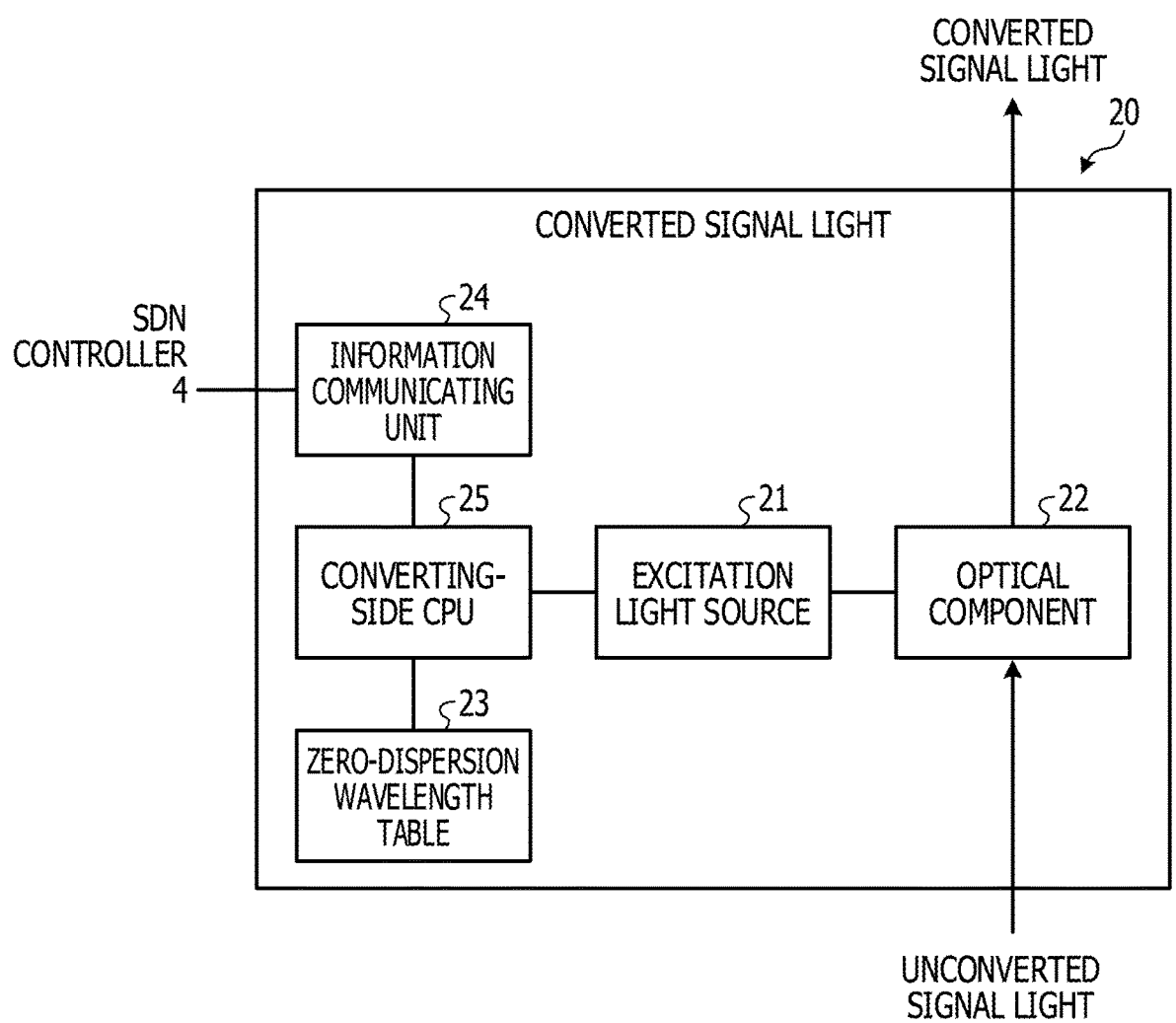
FIG. 4 is an explanatory figure illustrating an exemplary wavelength converter.

FIG. 4 is an explanatory figure illustrating an exemplary wavelength converter. The wavelength converter illustrated by reference to FIG. 4 may be one of the wavelength converters 20 illustrated in FIG. 1. The wavelength converter 20 illustrated in FIG. 4 is a degenerate four-wave mixing wavelength converter. The wavelength converter 20 includes an excitation light source 21, an optical component 22 such as a nonlinear fiber, a zero-dispersion wavelength table 23, an information communicating unit 24, and a converting-side CPU 25. The excitation light source 21 is an LD that emits excitation light. The optical component 22 is an optical component such as a WDM coupler, an optical circulator, a nonlinear fiber, or an optical band pass filter (BPF) that is used when wavelength-conversion of first signal light into second signal light in a different wavelength band is performed using the excitation light. The first signal light is wavelength-unconverted C-band signal light, for example, and the second signal light is wavelength-converted signal light in the L band, for example. The zero-dispersion wavelength table 23 is a table that manages the zero-dispersion wavelength of a nonlinear fiber for each internal temperature. The information communicating unit 24 is a communicating unit that communicates control information with the SDN controller 4. The converting-side CPU 25 performs overall control of the wavelength converter 20.

FIG. 5A is an explanatory figure illustrating an exemplary zero-dispersion wavelength table 23 of the first wavelength converter 20A. The converting-side CPU 25 in the first wavelength converter 20A measures the internal temperature in the first wavelength converter 20A, and extracts a zero-dispersion wavelength corresponding to the internal temperature from the zero-dispersion wavelength table 23. Furthermore, the converting-side CPU 25 controls the excitation light source 21 so as to adjust excitation light such that the excitation light matches the extracted zero-dispersion wavelength. FIG. 5B is an explanatory figure illustrating an exemplary zero-dispersion wavelength table 23 of the second wavelength converter 20B. The converting-side CPU 25 in the second wavelength converter 20B measures the internal temperature in the second wavelength converter 20B, and extracts a zero-dispersion wavelength corresponding to the internal temperature from the zero-dispersion wavelength table 23. Furthermore, the converting-side CPU 25 controls the excitation light source 21 so as to adjust excitation light according to the extracted zero-dispersion wavelength.

Figure 6:
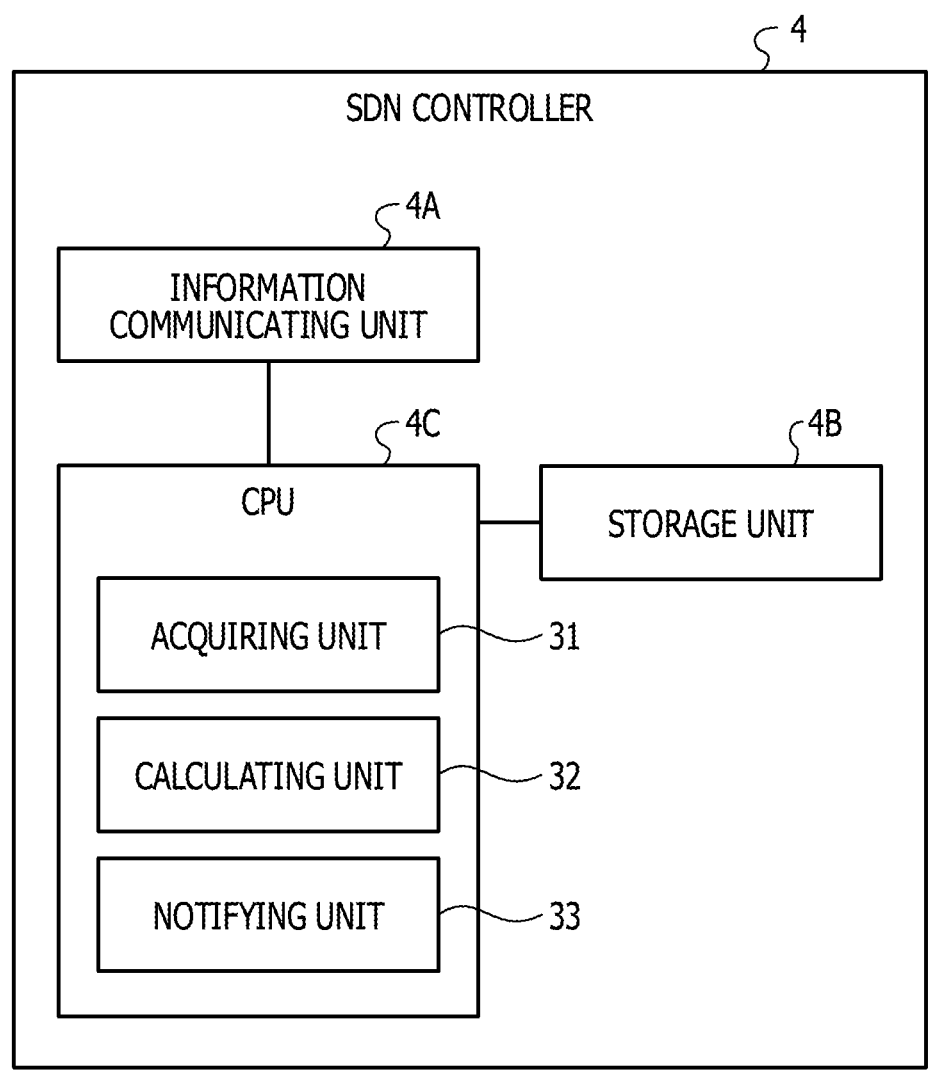
FIG. 6 is an explanatory figure illustrating an exemplary software defined network (SDN) controller.

FIG. 6 is a block diagram illustrating an exemplary SDN controller. The SDN controller illustrated by reference to FIG. 6 may be the SDN controller 4 illustrated in FIG. 1. The SDN controller 4 includes an information communicating unit 4A, a storage unit 4B, and a CPU 4C. The information communicating unit 4A communicates control information such as wavelength information with the transmitters 11, the first wavelength converter 20A, the second wavelength converter 20B, and the receivers 53. The storage unit 4B stores various types of information such as a program. The CPU 4C executes the program stored in the storage unit 4B to have functions of an acquiring unit 31, a calculating unit 32, and a notifying unit 33. The acquiring unit 31 acquires various types of information from each transmitter 11 in the second transmission group 10B, the first wavelength converter 20A, and the second wavelength converter 20B through the information communicating unit 4A. The acquiring unit 31 acquires a transmission light wavelength $\lambda s1$ from each transmitter 11 in the second transmission group 10B through the information communicating unit 4A. The transmission light wavelength $\lambda s1$ is the wavelength of signal light which is different for each transmitter 11 in the second transmission group 10B. The acquiring unit 31 acquires a first excitation light wavelength $\lambda p1$ from the first wavelength converter 20A through the information communicating unit 4A. The first excitation light wavelength $\lambda p1$ is the wavelength of first excitation light of the first wavelength converter 20A. The acquiring unit 31 acquires a second excitation light wavelength $\lambda p2$ from the second wavelength converter 20B through the information communicating unit 4A. The second excitation light wavelength $\lambda p2$ is the wavelength of second excitation light of the second wavelength converter 20B. The first excitation light wavelength $\lambda p1$ and second excitation light wavelength $\lambda p2$ are the same wavelength. Based on the transmission light wavelength $\lambda s1$, first excitation light wavelength $\lambda p1$, and second excitation light wavelength $\lambda p2$, the calculating unit 32 calculates a reception light wavelength $\lambda s2$ received at a receiver 53 corresponding to a transmitter 11. The receiver 53 is a receiver which is among the plurality of receivers 53 in the second reception group 50B, and uses the transmission light wavelength $\lambda s1$ of a transmitter 11 in the second transmission group 10B.

The calculating unit 32 uses the formula, $2(\lambda p2-\lambda p1)+\lambda s1$, to calculate the reception light wavelength $\lambda s2$ of each receiver 53. If the reception light wavelength $\lambda s2$ of each receiver 53 is calculated, the notifying unit 33 notifies the reception light wavelength $\lambda s2$ to a corresponding receiver 53 through the information communicating unit 4A. Note that the CPU 4C may calculate the reception light wavelength $\lambda s2$ of each receiver 53, and decide a local emission light wavelength for each receiver 53 from the reception light wavelength $\lambda s2$ of each receiver 53, and may notify the local emission light wavelength of each receiver 53 to a corresponding receiver 53. The receiving-side CPU 53D in the receiver 53 sets the received reception light wavelength $\lambda s2$ as a local emission light wavelength in the local emission light source 53A. As a result, since the receiver 53 uses local emission light with the reception light wavelength $\lambda s2$, the receiver 53 may receive signal light from a corresponding transmitter 11.

Since the first wavelength converter 20A and the second wavelength converter 20B are not used between the first transmission group 10A and the first reception group 50A, the calculating unit 32 does not calculate the reception light wavelength $\lambda s2$ of each receiver 53 in the first reception group 50A. In contrast to this, since the first wavelength converter 20A and the second wavelength converter 20B are used between the second transmission group 10B and the second reception group 50B, the calculating unit 32 calculates the reception light wavelength $\lambda s2$ of each receiver 53 in the second reception group 50B. For example, based on the transmission light wavelength $\lambda s1$ "C1" of the transmitter 111, the first excitation light wavelength $\lambda p1$, and the second excitation light wavelength $\lambda p2$, the calculating unit 32 calculates the reception light wavelength $\lambda s2$ directed to the receiver 531. Based on the transmission light wavelength $\lambda s1$ "C2" of the transmitter 112, the first excitation light wavelength $\lambda p1$, and the second excitation light wavelength $\lambda p2$, the calculating unit 32 calculates the reception light wavelength $\lambda s2$ of the receiver 532.

Figure 7:
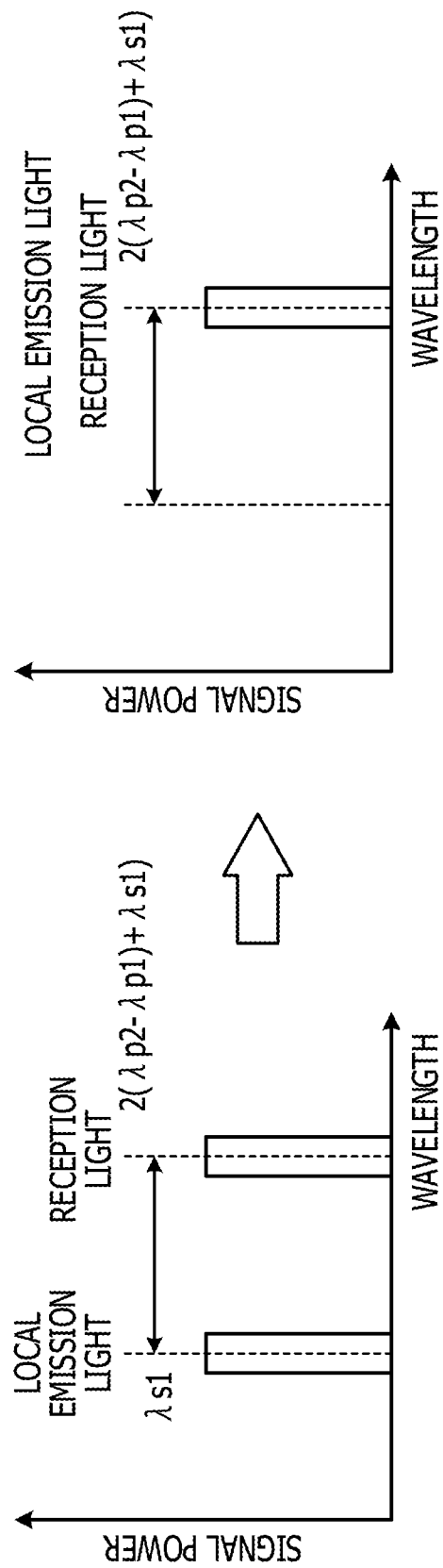
FIG. 7 is an explanatory figure illustrating exemplary processing operation to be performed at a time of shifting a local emission light wavelength to a reception light wavelength.

FIG. 7 is an explanatory figure illustrating exemplary processing operation to be performed at a time of shifting a local emission light wavelength to a reception light wavelength. Since the reception light wavelength $\lambda s2$ from the SDN controller 4 is set as the reception light wavelength, the receiving-side CPU 53D in the receiver 53 controls the local emission light source 53A such that the local emission light wavelength shifts to the reception light wavelength. As a result, even if signal light wavelength-converted at the wavelength converter 20 or the like far exceeds a channel grid due to a wavelength mismatch or the like, deterioration of reception quality of each receiver 53 may be suppressed since a mismatch between a local emission light wavelength and a reception light wavelength is removed.

Figure 8:
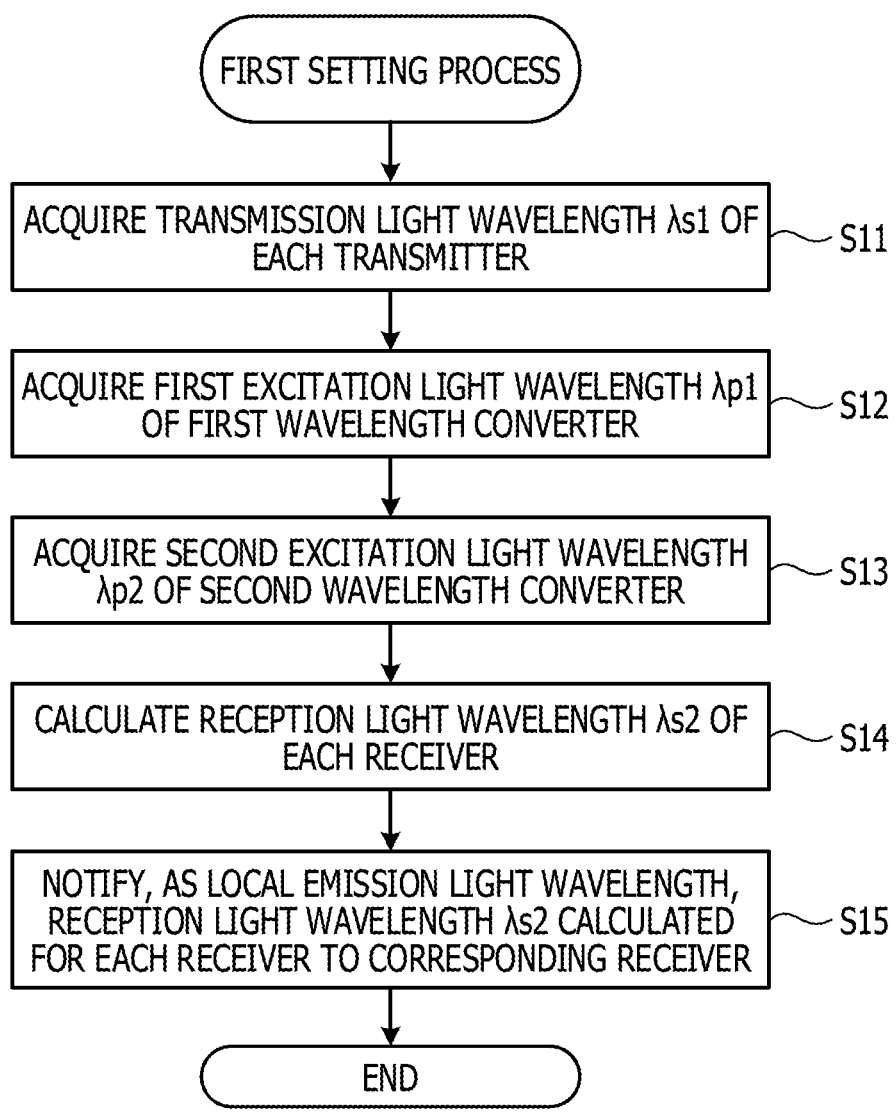
FIG. 8 is a flow diagram illustrating exemplary processing operation to be performed at a central processing unit (CPU) in an SDN controller related to a first setting process.

Next, operation of the WDM system 1 in the first embodiment is explained. FIG. 8 is a flow diagram illustrating exemplary processing operation to be performed at a CPU in an SDN controller related to a first setting process. The CPU and the SDN controller described by reference to FIG. 8 may be the CPU 4C and the SDN controller 4 illustrated in FIG. 6. In FIG. 8, the acquiring unit 31 in the CPU 4C acquires the transmission light wavelength $\lambda s1$ of each transmitter 11 from each transmitter 11 in the second transmission group 10B through the information communicating unit 4A (Step S11). The transmission light wavelength $\lambda s1$ is the wavelength of transmission light which is different for each transmitter 11 in the second transmission group 10B. The acquiring unit 31 acquires a first excitation light wavelength $\lambda p1$ from the first wavelength converter 20A through the information communicating unit 4A (Step S12). The acquiring unit 31 acquires a second excitation light wavelength $\lambda p2$ from the second wavelength converter 20B through the information communicating unit 4A (Step S13). The calculating unit 32 in the CPU 4C uses the formula, $2(\lambda p2-\lambda p1)+\lambda s1$, to calculate the reception light wavelength $\lambda s2$ of the receiver 53 corresponding to a transmitter 11 (Step S14). The notifying unit 33 in the CPU 4C notifies, as the local emission light wavelength, the reception light wavelength $\lambda s2$ calculated for each receiver 53 to a corresponding receiver 53 through the information communicating unit 4A (Step S15), and ends the processing operation illustrated in FIG. 8.

Each receiver 53 receives a reception light wavelength λs2 from the SDN controller 4, and sets the reception light wavelength λs2 as the local emission light wavelength in the local emission light source 53A. As a result, for example, even if signal light wavelength-converted at the wavelength converter 20 or the like far exceeds a channel grid due to a wavelength mismatch or the like, the receiver 53 may suppress deterioration of reception quality since a mismatch between a local emission light wavelength and a reception light wavelength is removed.

Transfer devices of the related techniques also experience wavelength mismatches, and the wavelength mismatches are actually corrected electrically by DSPs. It is functionally possible to sweep local emission light in a transfer device. However, in a transfer device that receives wavelength-converted reception light through the wavelength converter 20, the wavelength of the reception light might far exceed a channel grid due to a wavelength mismatch. At this time, since, for transfer devices of the related techniques, the case where the wavelength of reception light far exceeds a channel grid is not expected, reception of the reception light may become difficult.

The SDN controller 4 in the first embodiment acquires the transmission light wavelength λs1 of each transmitter 11 in the second transmission group 10B, the first excitation light wavelength λp1 of the first wavelength converter 20A, and the second excitation light wavelength λp2 of the second wavelength converter 20B. The SDN controller 4 uses the formula, $2(\lambda p2-\lambda p1)+\lambda s1$, to calculate the reception light wavelength λs2 of each receiver 53 in the second reception group 50B. Furthermore, the SDN controller 4 notifies each receiver 53 of the reception light wavelength λs2 calculated for each receiver 53. The receiver 53 sets the reception light wavelength λs2 as the local emission light wavelength such that received reception light wavelength λs2 matches the local emission light wavelength even if the signal light wavelength-converted at the wavelength converter 20 or the like far exceeds a channel grid due to a wavelength mismatch or the like, for example. As a result, since a mismatch between a reception light wavelength and a local emission light wavelength is removed, deterioration of reception quality may be suppressed. Since the wavelength of local emission light of a receiver 53 is corrected to match a reception light wavelength, lowering of a signal power caused by a mismatch of the zero-dispersion wavelength of a nonlinear fiber in the wavelength converter 20, and deterioration of reception quality due to the influence of a signal wavelength mismatch may be suppressed.

Although the WDM system 1 in the first embodiment including one span of a transfer line fiber between the first transfer device 2A and the second transfer device 2B is illustrated as an example, the present embodiment may be applied to a WDM system including a plurality of (N) spans. For example, using the formula, $2\times\Sigma[$(the second excitation light wavelengths λp2 of the N spans of second wavelength converters 20B)−(the first excitation light wavelengths λp1 of the N spans of first wavelength converters 20A)$]+$(the transmission light wavelength λs1), the reception light wavelength λs2 of a receiver 53 may be calculated even in the case of N spans.

The acquiring unit 31 in the first embodiment acquires, through the information communicating unit 4A, the transmission light wavelengths λs1 from transmitters 11, the first excitation light wavelength λp1 from the first wavelength converter 20A, and the second excitation light wavelength from the second wavelength converter 20B. However, the SDN controller 4 may store in advance in the storage unit 4B wavelength information such as the transmission light wavelength λs1 of each transmitter 11, the first excitation light wavelength λp1, and the second excitation light wavelength λp2, and acquire the wavelength information from the storage unit 4B, and configurations related to this may be changed as appropriate.

The SDN controller 4 in the first embodiment uses the formula, $2(\lambda p2-\lambda p1)+\lambda s1$, to calculate the reception light wavelength λs2, but this is not the sole example, and configurations related to this may be changed as appropriate. An embodiment thereof is explained below as a second embodiment. The same configurations as those in the WDM system 1 in the first embodiment are given the same signs, and explanations about the overlapping configurations and operation are omitted.

Second Embodiment

Figure 9:
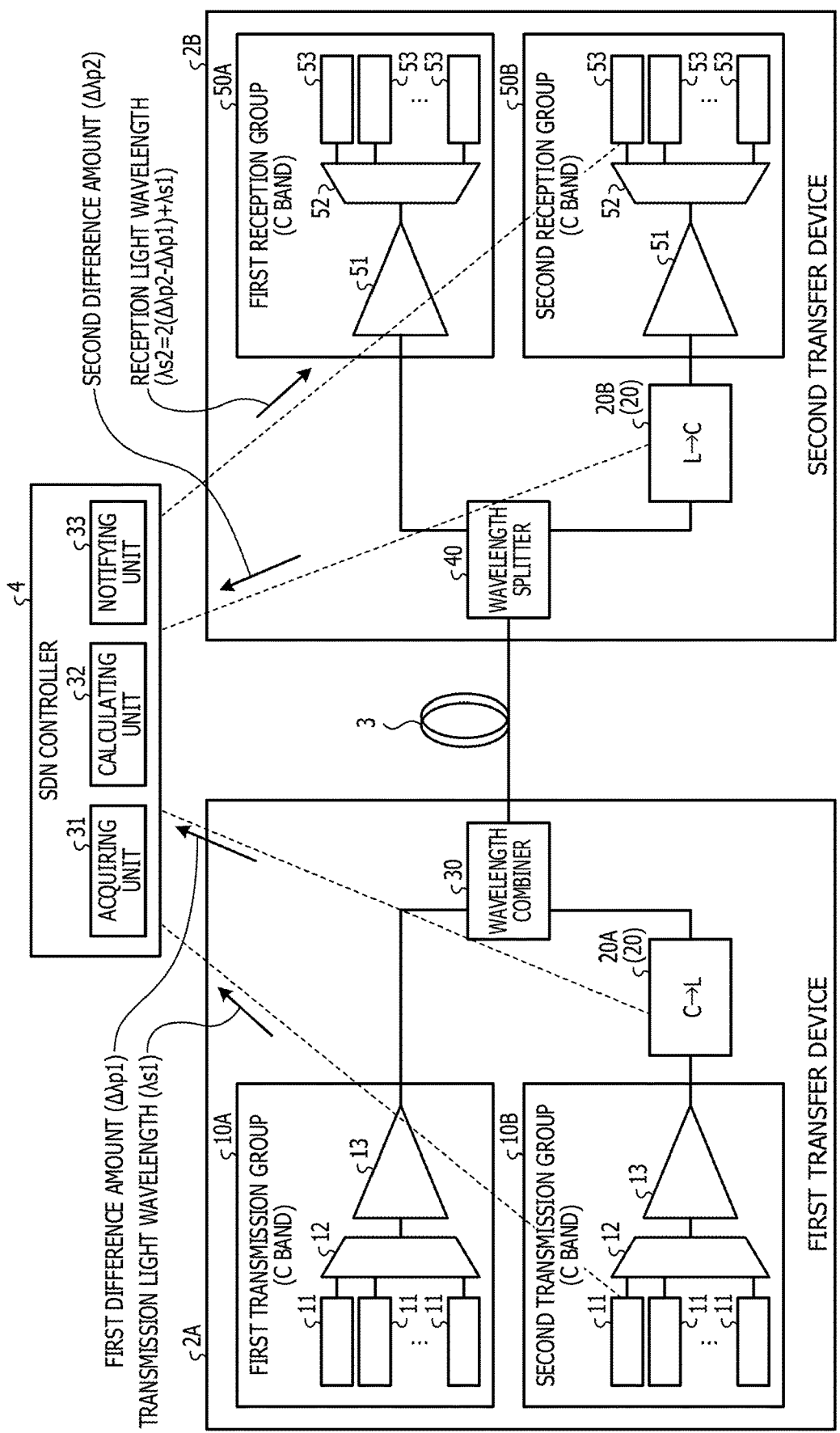
FIG. 9 is an explanatory figure illustrating an exemplary WDM system in a second embodiment.

FIG. 9 is an explanatory figure illustrating an exemplary WDM system 1A in the second embodiment. The WDM system 1A in the second embodiment is different from the WDM system 1 in the first embodiment in that $2(\Delta\lambda p2-\Delta\lambda p1)+\lambda s1$ is used instead of $2(\lambda p2-\lambda p1)+\lambda s1$. $\Delta\lambda p1$ is a first difference amount indicating a wavelength difference between a setting reference wavelength and a first excitation light wavelength λp1. $\Delta\lambda p2$ is a second difference amount indicating a wavelength difference between the setting reference wavelength and a second excitation light wavelength λp2.

The converting-side CPU 25 in the first wavelength converter 20A calculates the first difference amount $\Delta\lambda p1$ based on the setting reference wavelength and a first excitation light wavelength λp1. The converting-side CPU 25 in the second wavelength converter 20B calculates the second difference amount $\Delta\lambda p2$ based on the setting reference wavelength and a second excitation light wavelength λp2.

The acquiring unit 31 of the SDN controller 4 acquires, through the information communicating unit 4A, a transmission light wavelength λs1 from each transmitter 11 in the second transmission group 10B, a first difference amount $\Delta\lambda p1$ from the first wavelength converter 20A, and a second difference amount $\Delta\lambda p2$ from the second wavelength converter 20B. The calculating unit 32 uses the formula, $2(\Delta\lambda p2-\Delta\lambda p1)+\lambda s1$, to calculate the reception light wavelength λs2 of each receiver 53 in the second reception group 50B. If the reception light wavelength λs2 of each receiver 53 is calculated, the notifying unit 33 notifies the reception light wavelength λs2 to a corresponding receiver 53 through the information communicating unit 4A.

Figure 10:
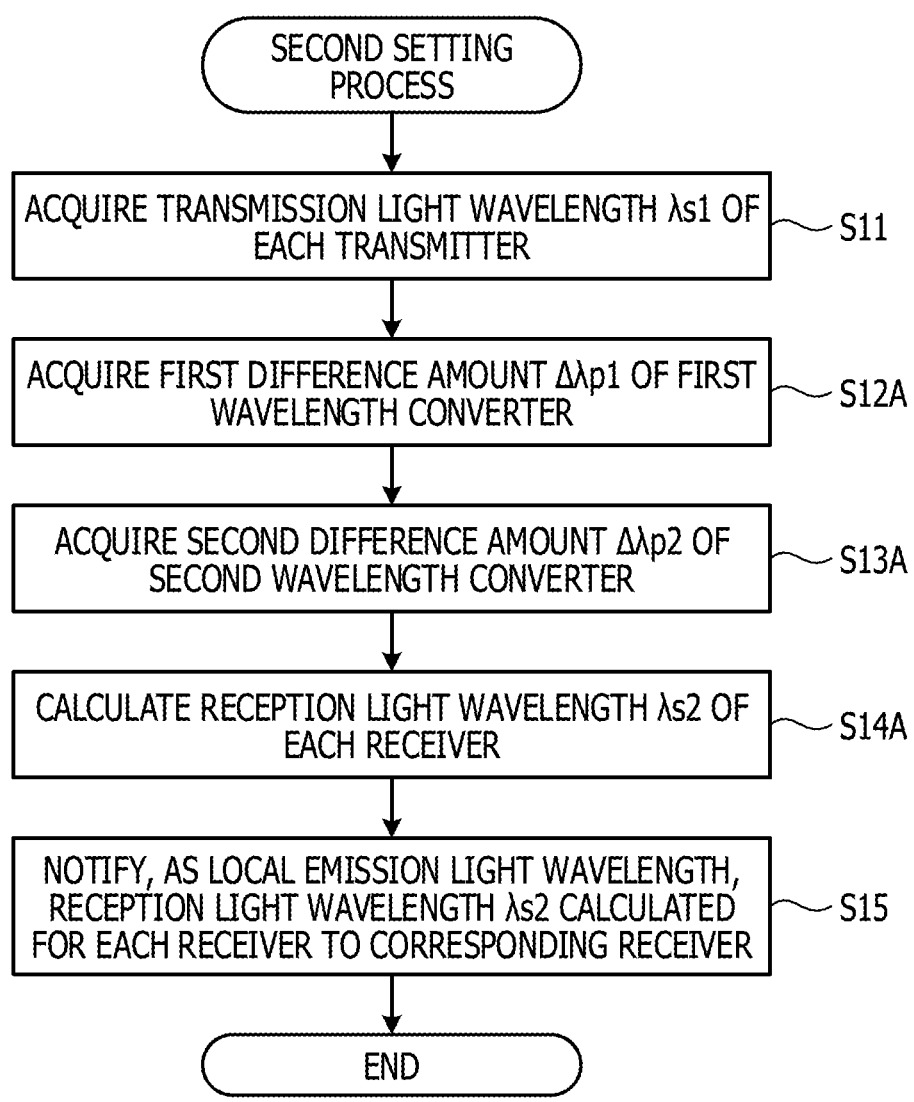
FIG. 10 is a flow diagram illustrating exemplary processing operation to be performed at a CPU in an SDN controller related to a second setting process.

Next, operation of the WDM system 1A in the second embodiment is explained. FIG. 10 is a flow diagram illustrating exemplary processing operation to be performed at a CPU in an SDN controller related to a second setting process. The CPU and the SDN controller described by reference to FIG. 10 may be the CPU 4C and the SDN controller 4 illustrated in FIG. 6. In FIG. 10, the acquiring unit 31 in the CPU 4C acquires the transmission light wavelength λs1 of each transmitter 11 from each transmitter 11 in the second transmission group 10B through the information communicating unit 4A (Step S11). The acquiring unit 31 acquires a first difference amount $\Delta\lambda p1$ from the first wavelength converter 20A through the information communicating unit 4A (Step S12A). The acquiring unit 31 acquires a second difference amount $\Delta\lambda p2$ from the second wavelength converter 20B through the information communicating unit 4A (Step S13A). The calculating unit 32 uses the formula, $2(\Delta\lambda p2-\Delta\lambda p1)+\lambda s1$, to calculate the reception light wavelength $\lambda s2$ of each receiver 53 in the second reception group 50B (Step S14A).

Each receiver 53 in the second reception group 50B receives the reception light wavelength $\lambda s2$ of each receiver 53 calculated at the SDN controller 4, and sets the reception light wavelength $\lambda s2$ as the local emission light wavelength. As a result, for example, even if signal light wavelength-converted at the wavelength converter 20 or the like far exceeds a channel grid due to a wavelength mismatch or the like, the receiver 53 may suppress deterioration of reception quality since a mismatch between a local emission light wavelength and a reception light wavelength is removed.

The SDN controller 4 in the second embodiment acquires the transmission light wavelength $\lambda s1$ of each transmitter 11 in the second transmission group 10B, the first difference amount $\Delta\lambda p1$ of the first wavelength converter 20A, and the second difference amount $\Delta\lambda p2$ of the second wavelength converter 20B. The SDN controller 4 uses the formula, $2(\Delta\lambda p2-\Delta\lambda p1)+\lambda s1$, to calculate the reception light wavelength $\lambda s2$ of each receiver 53 in the second reception group 50B, and notifies each receiver 53 of the reception light wavelength $\lambda s2$. The receiver 53 sets the reception light wavelength $\lambda s2$ as the local emission light wavelength such that received reception light wavelength $\lambda s2$ matches the local emission light wavelength even if the signal light wavelength-converted at the wavelength converter 20 or the like far exceeds a channel grid due to a wavelength mismatch or the like, for example. As a result, since a mismatch between a local emission light wavelength and a reception light wavelength is removed, deterioration of reception quality may be suppressed.

In the second transfer device 2B in the second embodiment, the optical splitters 52 are illustrated as an example, but WSSs may be arranged instead of the optical splitters 52, and an embodiment thereof is explained below as a third embodiment.

Third Embodiment

Figure 11:
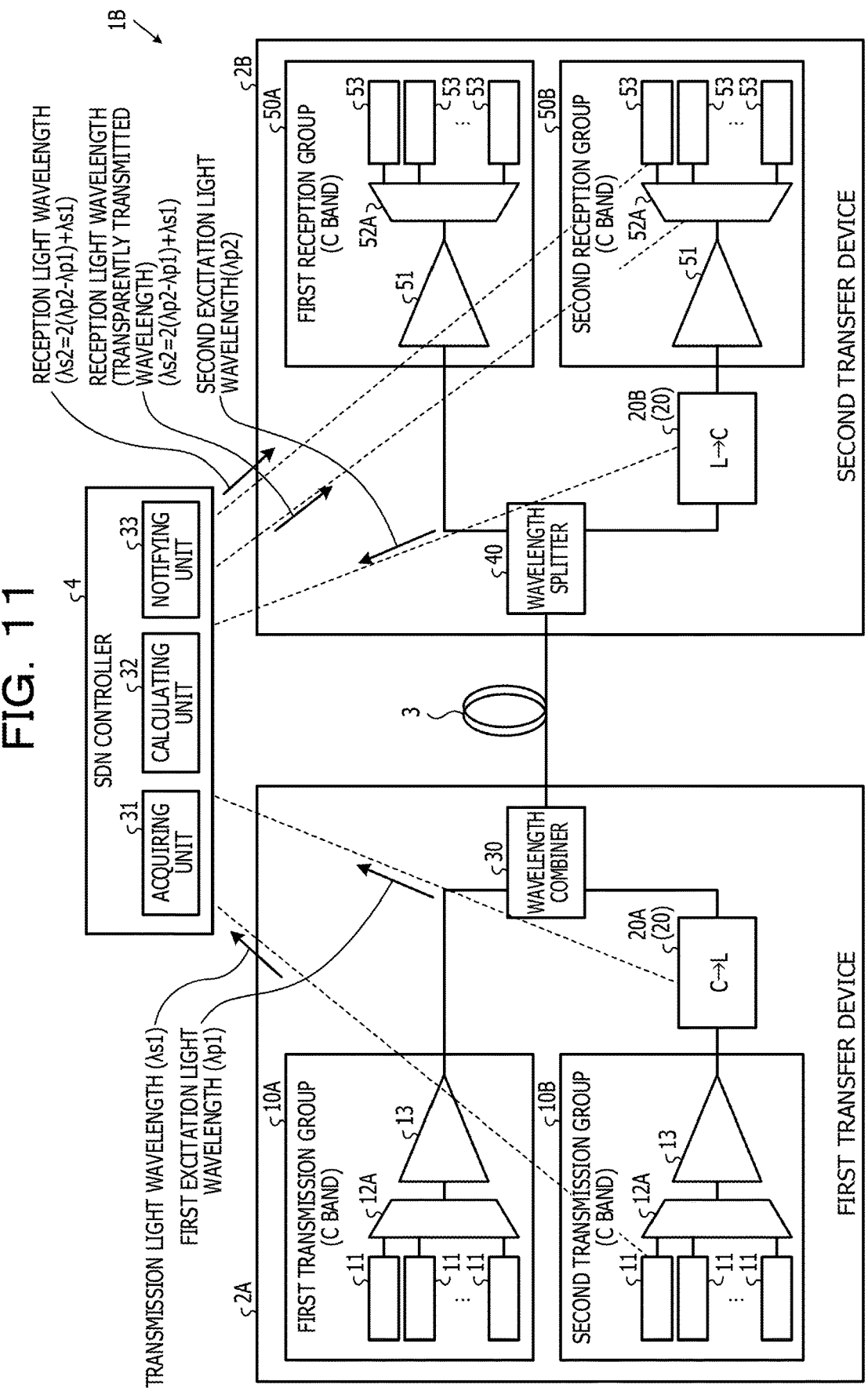
FIG. 11 is an explanatory figure illustrating an exemplary WDM system in a third embodiment.

FIG. 11 is an explanatory figure illustrating an exemplary WDM system 1B in the third embodiment. The same configurations as those in the WDM system 1B in the third embodiment are given the same signs, and explanations about the overlapping configurations and operation are omitted. The WDM system 1B in the third embodiment is different from the WDM system 1 in the first embodiment in that first WSSs 12A are arranged instead of the optical combiners 12, and second WSSs 52A are arranged instead of the optical splitters 52.

The first WSS 12A in the first transmission group 10A selects a wavelength of signal light of each transmitter 11, and multiplexes the signal light of individual transmitters 11 to output first multiplexed light to the optical amplifier 13. The first WSS 12A in the second transmission group 10B selects a wavelength of the signal light of each transmitter 11, and multiplexes the signal light of individual transmitters 11 to output first multiplexed light to the optical amplifier 13.

The second WSS 52A in the first reception group 50A, for example, transparently transmits only signal light with a wavelength corresponding to each receiver 53 in multiplexed light, and outputs transparently transmitted signal light to a corresponding receiver 53. The second WSS 52A in the second reception group 50B, for example, transparently transmits only signal light with a wavelength corresponding to each receiver 53 in multiplexed light, and outputs transparently transmitted signal light to a corresponding receiver 53. The second WSSs 52A sets a transparently transmitted wavelength for each receiver 53.

The acquiring unit 31 acquires, through the information communicating unit 4A, a transmission light wavelength $\lambda s1$ of each transmitter 11 in the second transmission group 10B, a first excitation light wavelength $\lambda p1$, and a second excitation light wavelength $\lambda p2$. The calculating unit 32 uses the formula, $2(\lambda p2-\lambda p1)+\lambda s1$, to calculate the reception light wavelength $\lambda s2$ of each receiver 53 in the second reception group 50B. The notifying unit 33 notifies the reception light wavelength $\lambda s2$ corresponding to a receiver 53 to the receiver 53 through the information communicating unit 4A, and notifies the second WSS 52A in the second reception group 50B of the reception light wavelength $\lambda s2$ such that signal light with the reception light wavelength $\lambda s2$ is transparently transmitted.

Figure 12:
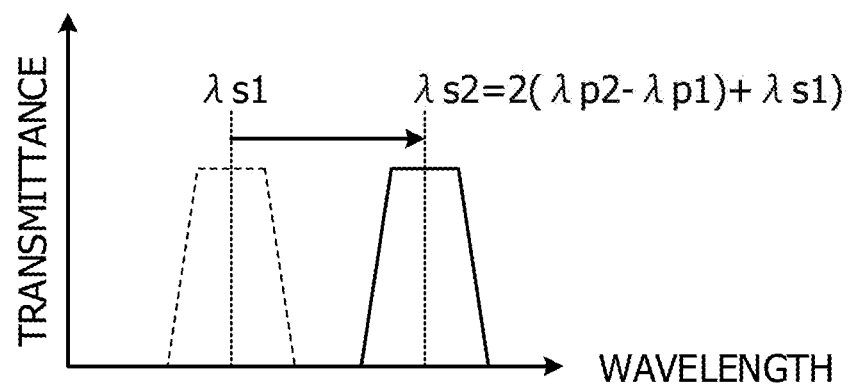
FIG. 12 is an explanatory figure illustrating exemplary transparently transmitted wavelengths before and after shifting at a second wavelength selective switch (WSS)

FIG. 12 is an explanatory figure illustrating exemplary transparently transmitted wavelengths before and after shifting at a second WSS 52A. If the second WSS 52A receives a reception light wavelength $\lambda s2$ of each receiver 53 from the SDN controller 4, the second WSS 52A sets the transparently transmitted wavelength and bandwidth of each receiver 53 such that signal light with the reception light wavelength $\lambda s2$ is transparently transmitted as illustrated in FIG. 12.

Figure 13:
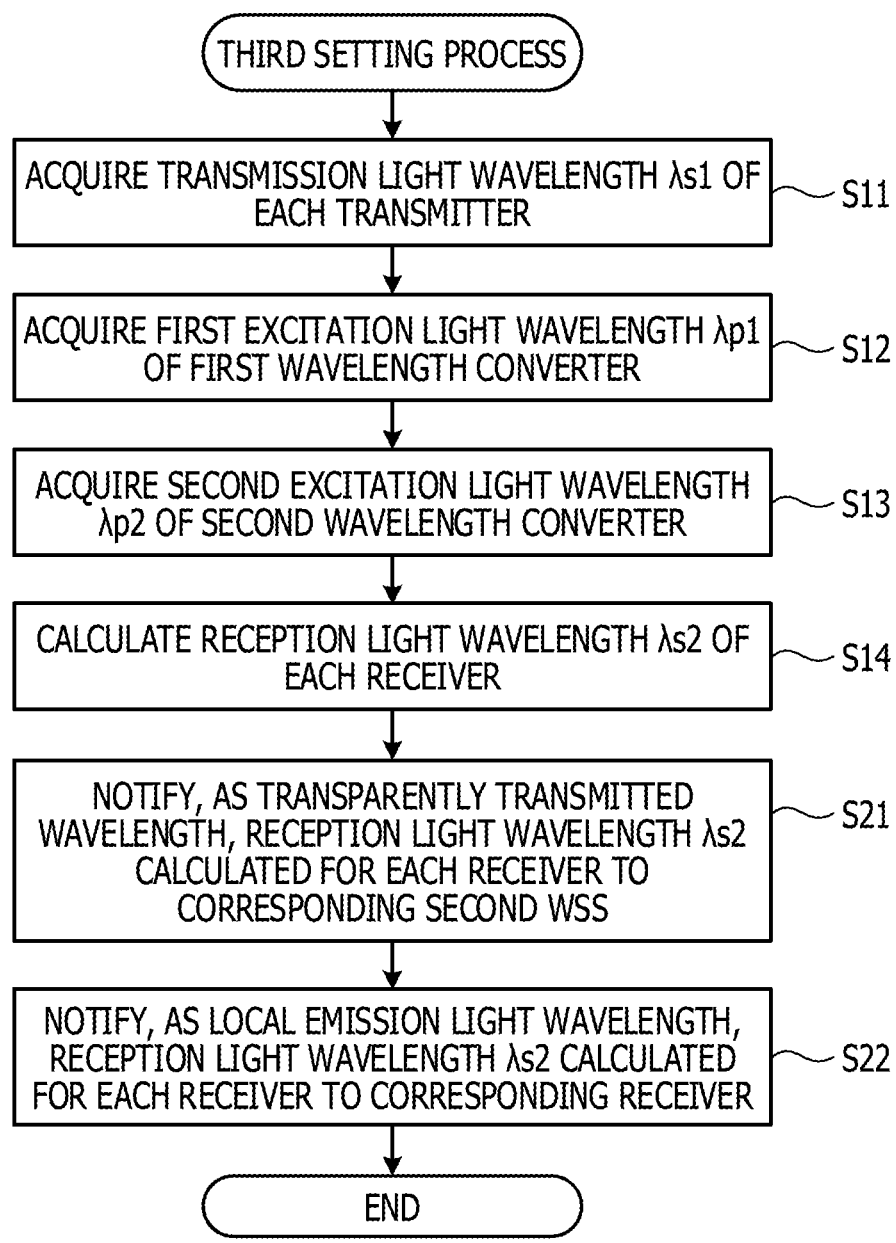
FIG. 13 is a flow diagram illustrating exemplary processing operation to be performed at a CPU in an SDN controller related to a third setting process.

Next, operation of the WDM system 1B in the third embodiment is explained. FIG. 13 is a flow diagram illustrating exemplary processing operation to be performed at a CPU in an SDN controller related to a third setting process. The CPU and the SDN controller described by reference to FIG. 13 may be the CPU 4C and the SDN controller 4 illustrated in FIG. 6. In FIG. 13, the notifying unit 33 in the CPU 4C in the SDN controller 4 calculates a reception light wavelength $\lambda s2$ of a receiver 53 at Step S14, and then notifies the second WSS 52A to set the reception light wavelength $\lambda s2$ as the transparently transmitted wavelength (Step S21). Since the second WSS 52A received the reception light wavelength $\lambda s2$ of each receiver 53 in the second reception group 50B, the second WSS 52A set the reception light wavelength $\lambda s2$ as the transparently transmitted wavelength. Furthermore, the notifying unit 33 notifies the second WSS 52A of the reception light wavelength $\lambda s2$ of each receiver 53 in the second reception group 50B, then notifies each receiver 53 of the reception light wavelength $\lambda s2$ of each receiver 53 in the second reception group 50B (Step S22), and ends the processing operation illustrated in FIG. 13.

The SDN controller 4 in the third embodiment acquires the transmission light wavelength $\lambda s1$ of each transmitter 11 in the second transmission group 10B, the first excitation light wavelength $\lambda p1$ of the first wavelength converter 20A, and the second excitation light wavelength $\lambda p2$ of the second wavelength converter 20B. The SDN controller 4 uses the formula, $2(\lambda p2-\lambda p1)+\lambda s1$, to calculate the reception light wavelength $\lambda s2$ of each receiver 53 in the second reception group 50B, and notifies each receiver 53 of the reception light wavelength $\lambda s2$. Furthermore, the SDN controller 4 notifies the second WSS 52A of the reception light wavelength $\lambda s2$ of each receiver 53 as the transparently transmitted wavelength. As a result, the second WSS 52A outputs signal light directed to a receiver 53 to the receiver 53 in order to set the received reception light wavelength $\lambda s2$ as the transparently transmitted wavelength. Furthermore, for example, even if signal light wavelength-converted at the wavelength converter 20 or the like far exceeds a channel grid due to a wavelength mismatch or the like, the receiver 53 may suppress deterioration of reception quality since a mismatch between a reception light wavelength and a local emission light wavelength is removed by setting the received reception light wavelength λs2 as the local emission light wavelength.

The second WSSs 52A that transparently transmits only signal light with a wavelength corresponding to each receiver 53 in multiplexed light is illustrated as an example, but the present embodiment may certainly be applied to the case where signal light including signal light with wavelengths corresponding to the receivers 53 is transparently transmitted.

The second WSSs 52A are arranged instead of the optical splitters 52 for convenience of explanation, arrayed-waveguide gratings (AWGs), optical couplers, or the like may be arranged, and configurations related to this may be changed as appropriate. When AWGs are used, the temperatures of temperature controllers of the AWGs are changed to thereby transparently transmit or block light with a certain wavelength in multiplexed light. Optical couplers transparently transmit light with any wavelength in multiplexed light.

The SDN controller 4 in the first embodiment uses the formula, $2(\lambda p2-\lambda p1)+\lambda s1$, to calculate the reception light wavelength λs2 of each receiver 53 in the second reception group 50B, and notifies the receiver 53 of the reception light wavelength λs2. However, a shifted wavelength amount may be calculated using a first excitation light wavelength λp1 and a second excitation light wavelength λp2, and an embodiment thereof is explained below as a fourth embodiment.

Fourth Embodiment

Figure 14:
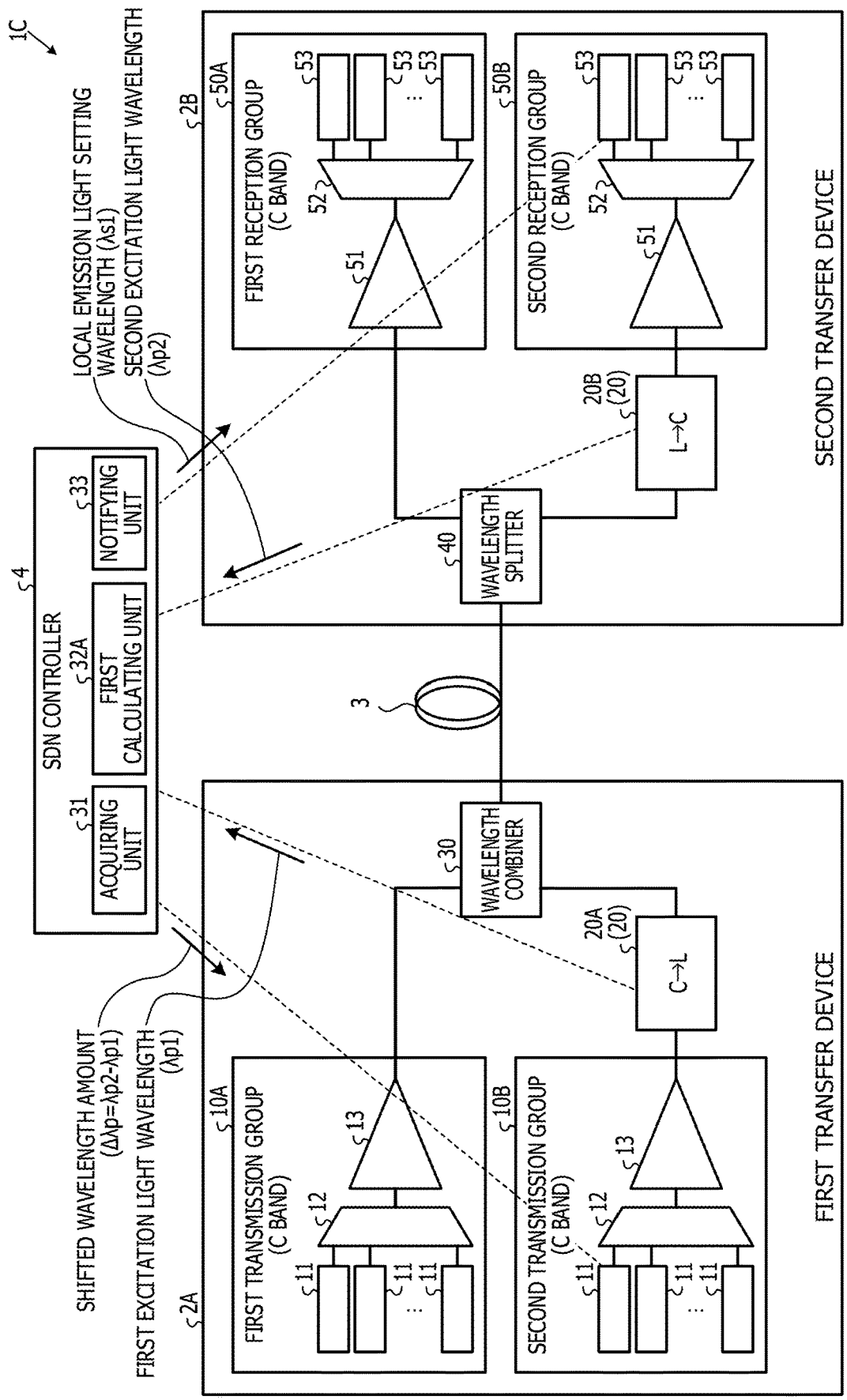
FIG. 14 is an explanatory figure illustrating an exemplary WDM system in a fourth embodiment.

FIG. 14 is an explanatory figure illustrating an exemplary WDM system 1C in the fourth embodiment. The same configurations as those in the WDM system 1 in the first embodiment are given the same signs, and explanations about the overlapping configurations and operation are omitted. The WDM system 1C in the fourth embodiment is different from the WDM system 1 in the first embodiment in that the SDN controller 4 calculates a shifted wavelength amount Δλp based on a first excitation light wavelength λp1 and a second excitation light wavelength λp2. Furthermore, another difference is that the SDN controller 4 notifies each transmitter 11 in the second transmission group 10B of the calculated shifted wavelength amount Δλp, and based on the received shifted wavelength amount Δλp, each transmitter 11 shifts the wavelength of signal light to be emitted.

If a first excitation light wavelength λp1 matches a second excitation light wavelength λp2, reception light of a receiver 53 in the second reception group 50B, and transmission light of a corresponding transmitter 11 in the second transmission group 10B have the same wavelength. In contrast to this, if a first excitation light wavelength λp1 does not match a second excitation light wavelength λp2, the wavelength of reception light of a receiver 53 in the second reception group 50B does not match. Accordingly, in order to correct this mismatch, the wavelength of transmission light of a transmitter 11 in the second transmission group 10B is shifted. For example, the transmitter 11 in the second transmission group 10B calculates $-2\Delta\lambda p$, and shifts the wavelength of transmission light by the calculated $-2\Delta\lambda p$ such that the mismatch amount Δλp between the first excitation light wavelength λp1 and the second excitation light wavelength λp2 is cancelled out.

Furthermore, a first calculating unit 32A is arranged in the CPU 4C in the SDN controller 4, instead of the calculating unit 32. After a first excitation light wavelength λp1 and a second excitation light wavelength λp2 are acquired at the acquiring unit 31, the first calculating unit 32A calculates the shifted wavelength amount Δλp based on the first excitation light wavelength λp1 and second excitation light wavelength λp2. For example, the first calculating unit 32A uses the formula, $\lambda p2-\lambda p1$, to calculate the shifted wavelength amount Δλp. The notifying unit 33 shifts a transmission light wavelength λs1 of each transmitter 11 in the second transmission group 10B, and then notifies a receiver 53 in the second reception group 50B of the transmission light wavelength λs1 so as to make the transmission light wavelength the same as the reception light wavelength.

Figure 15:
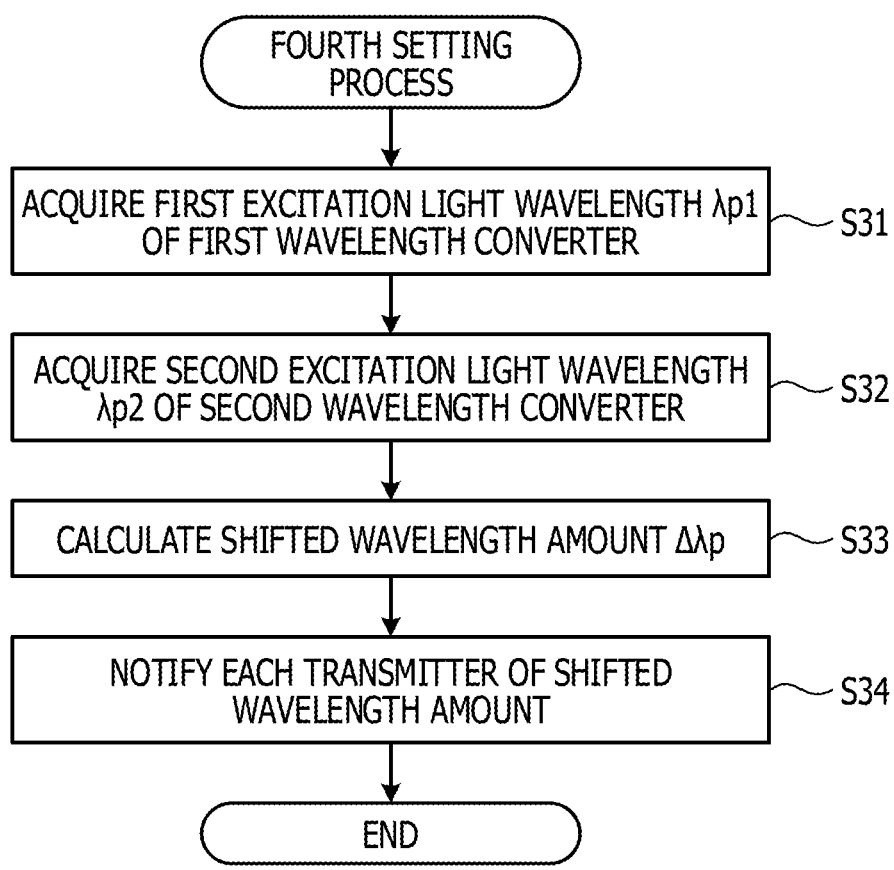
FIG. 15 is a flow diagram illustrating exemplary processing operation to be performed at a CPU in an SDN controller related to a fourth setting process.

Next, operation of the WDM system 1C in the fourth embodiment is explained. FIG. 15 is a flow diagram illustrating exemplary processing operation to be performed at a CPU in an SDN controller related to a fourth setting process. The CPU and the SDN controller described by reference to FIG. 15 may be the CPU 4C and the SDN controller 4 illustrated in FIG. 6. In FIG. 15, the acquiring unit 31 in the CPU 4C in the SDN controller 4 acquires a first excitation light wavelength λp1 from the first wavelength converter 20A through the information communicating unit 4A (Step S31). The acquiring unit 31 acquires a second excitation light wavelength λp2 from the second wavelength converter 20B through the information communicating unit 4A (Step S32). The first calculating unit 32A calculates a shifted wavelength amount Δ based on $\lambda p2-\lambda p1$ (Step S33). The notifying unit 33 notifies each transmitter 11 in the second transmission group 10B of the shifted wavelength amount Δλp through the information communicating unit 4A (Step S34). As a result, each transmitter 11 in the second transmission group 10B calculates a shifted amount $-2\Delta\lambda p$ for the wavelength of transmission light based on the shifted wavelength amount Δλp, and shifts the wavelength of the transmission light by $-2\Delta\lambda p$. Furthermore, the notifying unit 33 shifts a transmission light wavelength λs1 of each transmitter 11 in the second transmission group 10B, and then notifies a receiver 53 in the second reception group 50B of the unshifted transmission light wavelength λs1 so as to make the local emission light wavelength the same as the reception light wavelength.

The SDN controller 4 in the fourth embodiment acquires the first excitation light wavelength λp1 of the first wavelength converter 20A, and the second excitation light wavelength λp2 of the second wavelength converter 20B. The SDN controller 4 uses the formula, $\lambda p2-\lambda p1$, to calculate a shifted wavelength amount Δλp, and notifies each transmitter 11 in the second transmission group 10B of the shifted wavelength amount Δλp. Each transmitter 11 in the second transmission group 10B shifts the wavelength of transmission light (first signal light) by $-2\Delta\lambda p$. The notifying unit 33 shifts a transmission light wavelength λs1 of each transmitter 11 in the second transmission group 10B, and then notifies a receiver 53 in the second reception group 50B of the unshifted transmission light wavelength λs1 so as to make the local emission light wavelength the same as the reception light wavelength. As a result, for example, even if signal light wavelength-converted at the wavelength converter 20 or the like far exceeds a channel grid due to a wavelength mismatch or the like, deterioration of reception quality of each receiver 53 may be suppressed since a local emission light wavelength and a reception light wavelength are caused to match.

The SDN controller 4 in the fourth embodiment uses the formula, $\lambda p2-\lambda p1$, to calculate a shifted wavelength amount Δλp based on a first excitation light wavelength λp1 and a second excitation light wavelength λp2. However, the SDN controller 4 may notify each transmitter 11 in the second transmission group 10B of a first excitation light wavelength λp1 and a second excitation light wavelength λp2. In this case, each transmitter 11 itself in the second transmission group 10B may calculate a shifted wavelength amount Δλp based on the received first excitation light wavelength λp1 and second excitation light wavelength λp2, and configurations related to this may be changed as appropriate.

Although each transmitter 11 in the fourth embodiment calculates a shifted amount −2Δλp for the wavelength of transmission light, the SDN controller 4 may calculate a shifted amount −2Δλp for the wavelength of transmission light, and notify each transmitter 11 of the calculated shifted amount −2Δλp, and configurations related to this may be changed as appropriate.

The SDN controller 4 in the fourth embodiment that notifies each transmitter 11 of a shifted wavelength amount Δλp is illustrated as an example, but it may notify a shifted wavelength amount Δλp to each receiver 53 in addition to each transmitter 11, and an embodiment thereof is explained below as a fifth embodiment.

Fifth Embodiment

Figure 16:
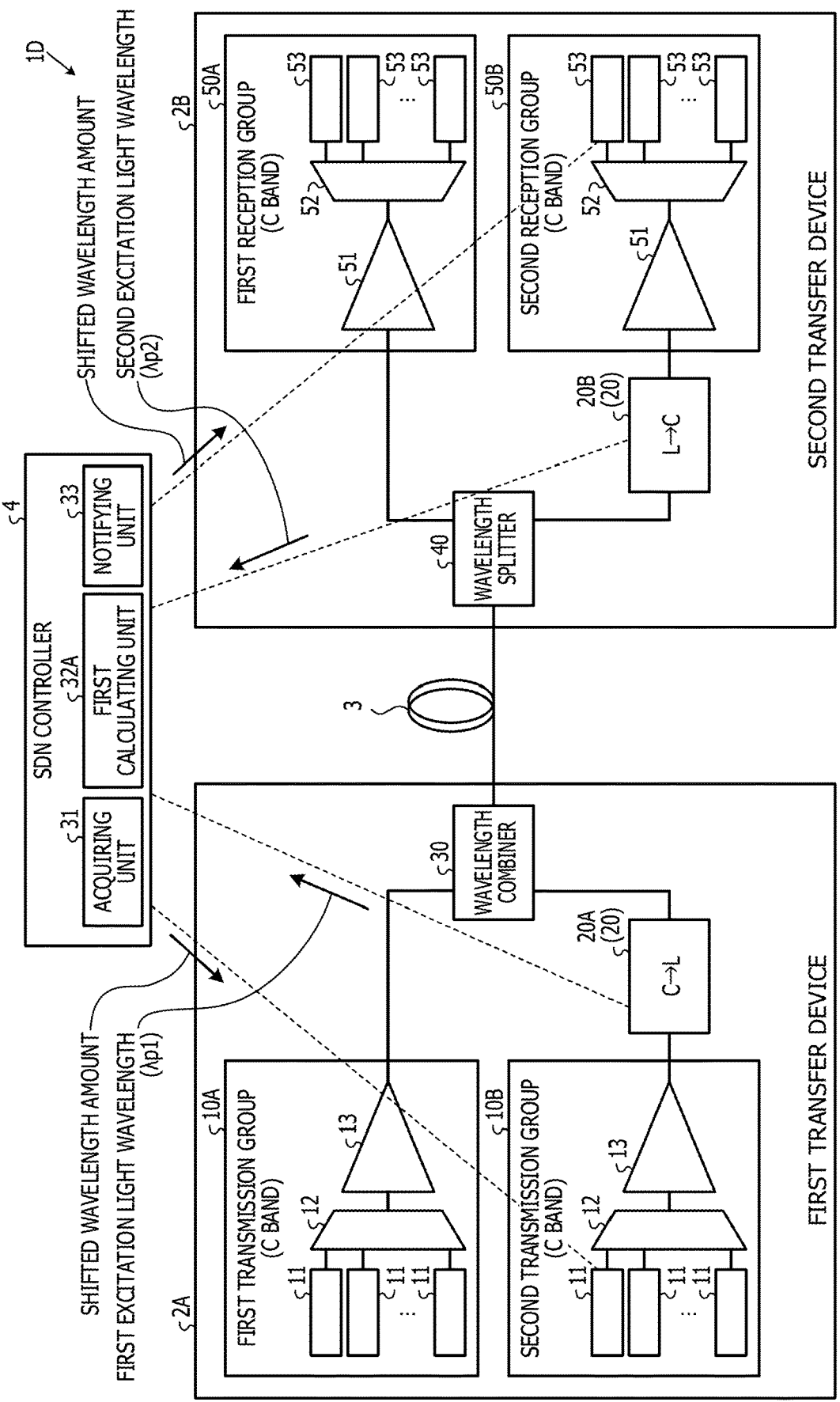
FIG. 16 is an explanatory figure illustrating an exemplary WDM system in a fifth embodiment.

FIG. 16 is an explanatory figure illustrating an exemplary WDM system 1D in the fifth embodiment. The same configurations as those in the WDM system 1C in the fourth embodiment are given the same signs, and explanations about the overlapping configurations and operation are omitted. The WDM system 1D in the fifth embodiment is different from the WDM system 1C in the fourth embodiment in that a shifted wavelength amount Δλp is notified to each transmitter 11 and also to each receiver 53.

If a first excitation light wavelength λp1 matches a second excitation light wavelength λp2, reception light of a receiver 53 in the second reception group 50B, and transmission light of a corresponding transmitter 11 in the second transmission group 10B have the same wavelength. In contrast to this, if a first excitation light wavelength λp1 does not match a second excitation light wavelength λp2, the wavelength of reception light of a receiver 53 in the second reception group 50B does not match. Accordingly, in order to correct this mismatch, the wavelength of transmission light of a transmitter 11 in the second transmission group 10B, and the wavelength of reception light of a receiver 53 in the second reception group 50B are shifted. For example, each transmitter 11 in the second transmission group 10B shifts the wavelength of transmission light by −Δλp such that the mismatch amount Δλp between the first excitation light wavelength λp1 and the second excitation light wavelength λp2 is cancelled out. Furthermore, each receiver 53 in the second reception group 50B shifts the wavelength of reception light by +Δλp.

Figure 17:
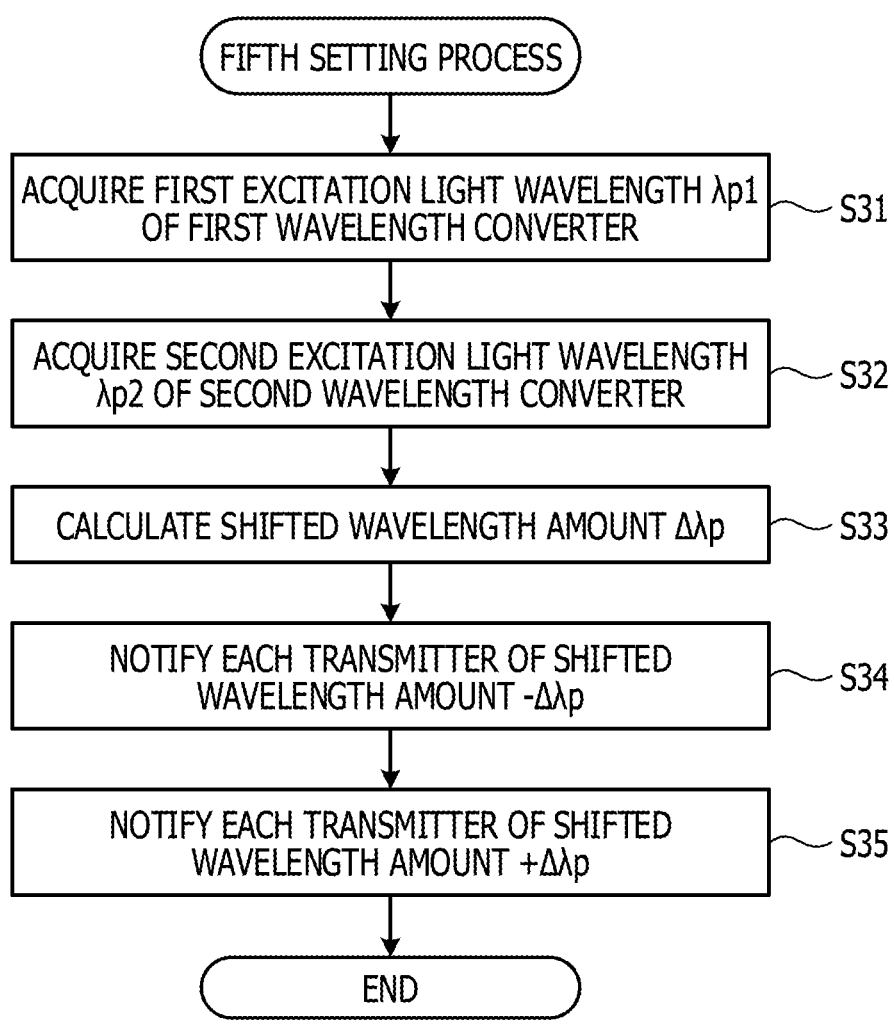
FIG. 17 is a flow diagram illustrating exemplary processing operation to be performed at a CPU in an SDN controller related to a fifth setting process.

Next, operation of the WDM system 1D in the fifth embodiment is explained. FIG. 17 is a flow diagram illustrating exemplary processing operation to be performed at a CPU in an SDN controller related to a fifth setting process. The CPU and the SDN controller described by reference to FIG. 17 may be the CPU 4C and the SDN controller 4 illustrated in FIG. 6. In FIG. 17, the notifying unit 33 in the CPU 4C calculates a shifted wavelength amount Δλp at Step S33, and then notifies each transmitter 11 in the second transmission group 10B of the shifted wavelength amount Δλp through the information communicating unit 4A (Step S35A). As a result, each transmitter 11 in the second transmission group 10B shifts the wavelength of the transmission light by −Δλp based on the shifted wavelength amount Δλp.

Furthermore, the notifying unit 33 notifies each transmitter 11 of the shifted wavelength amount Δλp, then notifies each receiver 53 in the second reception group 50B of the shifted wavelength amount Δλp through the information communicating unit 4A (Step S36), and ends the processing operation illustrated in FIG. 15. As a result, each receiver 53 in the second reception group 50B shifts the local emission light wavelength as the wavelength of the reception light by +Δλp based on the shifted wavelength amount Δλp.

The SDN controller 4 in the fifth embodiment acquires the first excitation light wavelength λp1 of the first wavelength converter 20A, and the second excitation light wavelength λp2 of the second wavelength converter 20B. The SDN controller 4 uses the formula, λp2−λp1, to calculate a shifted wavelength amount Δλp, and notifies each transmitter 11 in the second transmission group 10B of the shifted wavelength amount Δλp. Each transmitter 11 in the second transmission group 10B shifts the wavelength of transmission light by −Δλp. The SDN controller 4 notifies each receiver 53 in the second reception group 50B of the shifted wavelength amount Δλp. Each receiver 53 in the second reception group 50B shifts the local emission light wavelength as the wavelength of the reception light by +Δλp. As a result, for example, even if signal light wavelength-converted at the wavelength converter 20 or the like far exceeds a channel grid due to a wavelength mismatch or the like, each receiver 53 in the second reception group 50B may suppress deterioration of reception quality.

The SDN controller 4 in the above-mentioned first embodiment uses 2(λp2−λp1)+λs1 to calculate a reception light wavelength λs2. However, a reception light wavelength λs2 may be calculated not at the SDN controller 4, but at the receiving-side CPUs 53D of the receivers 53 in the second reception group 50B, and an embodiment thereof is explained below as a sixth embodiment.

Sixth Embodiment

Figure 18:
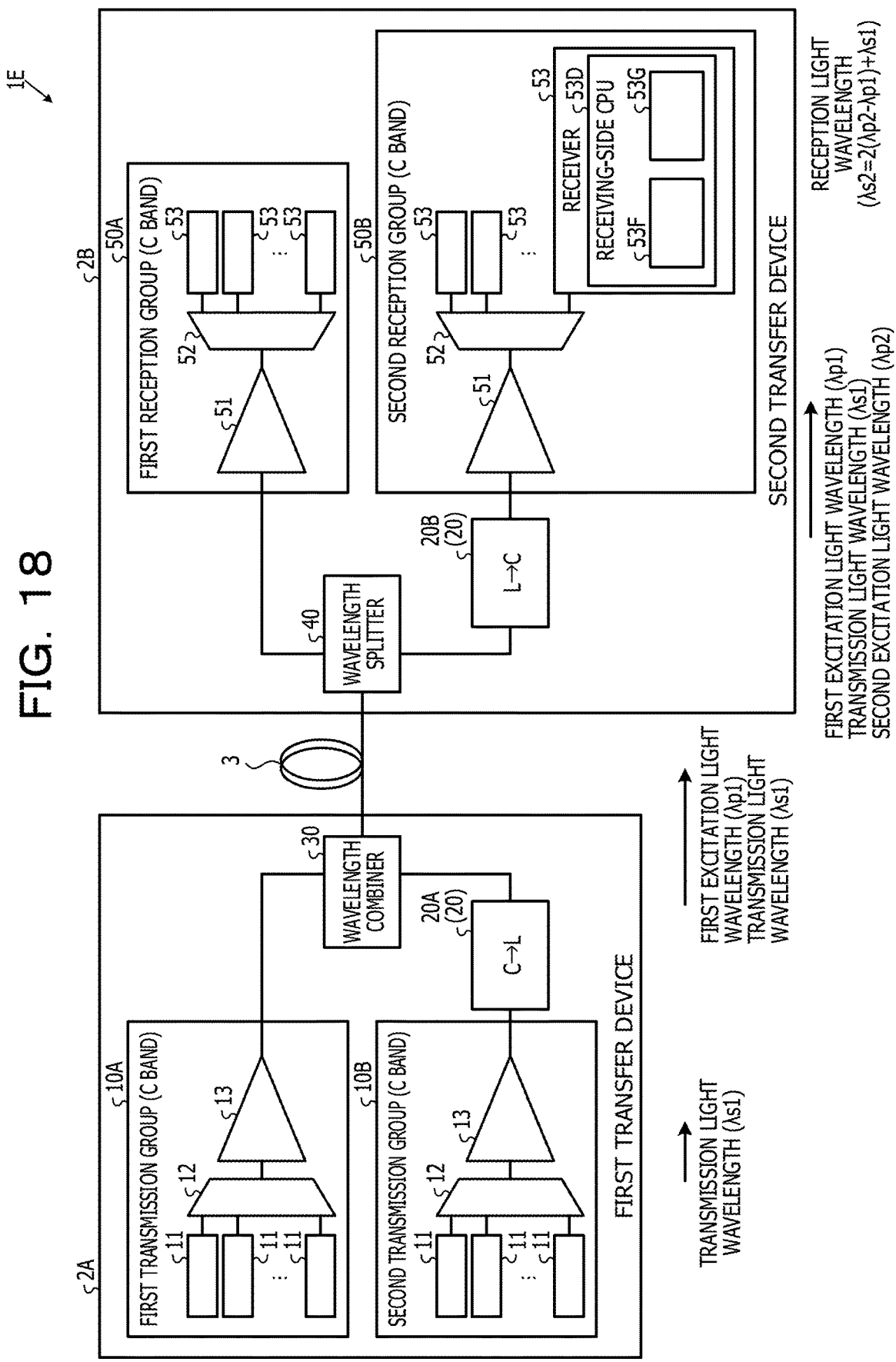
FIG. 18 is an explanatory figure illustrating an exemplary WDM system in a sixth embodiment.

FIG. 18 is an explanatory figure illustrating an exemplary WDM system 1E in the sixth embodiment. The same configurations as those in the WDM system 1 illustrated in FIG. 1 are given the same signs, and explanations about the overlapping configurations and operation are omitted. The WDM system 1E illustrated in FIG. 18 is different from the WDM system 1 illustrated in FIG. 1 in that a reception light wavelength λs2 is calculated at each receiver 53 in the second reception group 50B, instead of the SDN controller 4.

The information communicating unit 11C in each transmitter 11 in the second transmission group 10B communicates with the information communicating unit 24 in the first wavelength converter 20A. The information communicating unit 24 in the first wavelength converter 20A communicates with the information communicating unit 24 in the second wavelength converter 20B. The information communicating unit 24 in the second wavelength converter 20B communicates with the information communicating unit 53C in each receiver 53 in the second reception group 50B.

The receiving-side CPU 53D in each receiver 53 has functions of a second calculating unit 53F, and a setting unit 53G. The second calculating unit 53F acquires a transmission light wavelength λs1, a first excitation light wavelength λp1, and a second excitation light wavelength λp2 through the information communicating unit 53C. The second calculating unit 53F uses $2(\lambda p2-\lambda p1)+\lambda s1$ to calculate the reception light wavelength $\lambda s2$. The setting unit 53G sets the calculated reception light wavelength $\lambda s2$ as the local emission light wavelength in the local emission light source 53A.

Each transmitter 11 in the second transmission group 10B notifies the first wavelength converter 20A of a transmission light wavelength $\lambda s1$ through the information communicating unit 11C. The first wavelength converter 20A notifies the second wavelength converter 20B of a first excitation light wavelength $\lambda p1$ in addition to a transmission light wavelength $\lambda s1$ through the information communicating unit 24.

The second wavelength converter 20B notifies a corresponding receiver 53 in the second reception group 50B of a second excitation light wavelength $\lambda p2$ in addition to a transmission light wavelength $\lambda s1$ and a first excitation light wavelength $\lambda p1$ through the information communicating unit 24. The second calculating unit 53F in each receiver 53 in the second reception group 50B uses $2(\lambda p2-\lambda p1)+\lambda s1$ to calculate a reception light wavelength $\lambda s2$ based on the transmission light wavelength $\lambda s1$, first excitation light wavelength $\lambda p1$, and second excitation light wavelength $\lambda p2$. The setting unit 53G sets the reception light wavelength $\lambda s2$ calculated at the second calculating unit 53F as the local emission light wavelength of the local emission light source 53A.

Each receiver 53 in the second reception group 50B in the sixth embodiment acquires the transmission light wavelength $\lambda s1$ of each transmitter 11 in the second transmission group 10B, the first excitation light wavelength $\lambda p1$ of the first wavelength converter 20A, and the second excitation light wavelength $\lambda p2$ of the second wavelength converter 20B. Each receiver 53 in the second reception group 50B uses the formula, $2(\lambda p2-\lambda p1)+\lambda s1$, to calculate a reception light wavelength $\lambda s2$, and sets the reception light wavelength $\lambda s2$ as the local emission light wavelength in the local emission light source 53A. The receiver 53 sets the received reception light wavelength $\lambda s2$ as the local emission light wavelength even if the signal light wavelength-converted at the wavelength converter 20 or the like far exceeds a channel grid due to a wavelength mismatch or the like, for example. As a result, since a mismatch between a reception light wavelength and a local emission light wavelength is removed, deterioration of reception quality may be suppressed.

Although a system that performs wavelength-conversion of C-band first multiplexed light into L-band second multiplexed light, and wavelength-conversion of L-band second multiplexed light into C-band first multiplexed light is illustrated as an example of the WDM system 1 in the above-mentioned first embodiment, the wavelength band to which the system may be applied is not limited to the L band, but configurations related to this may be changed as appropriate. For example, an embodiment in which a wavelength converter that performs wavelength-conversion of C-band first multiplexed light into S-band third multiplexed light, and wavelength-conversion of S-band third multiplexed light into C-band first multiplexed light is added is explained below as a seventh embodiment.

Seventh Embodiment

Figure 19:
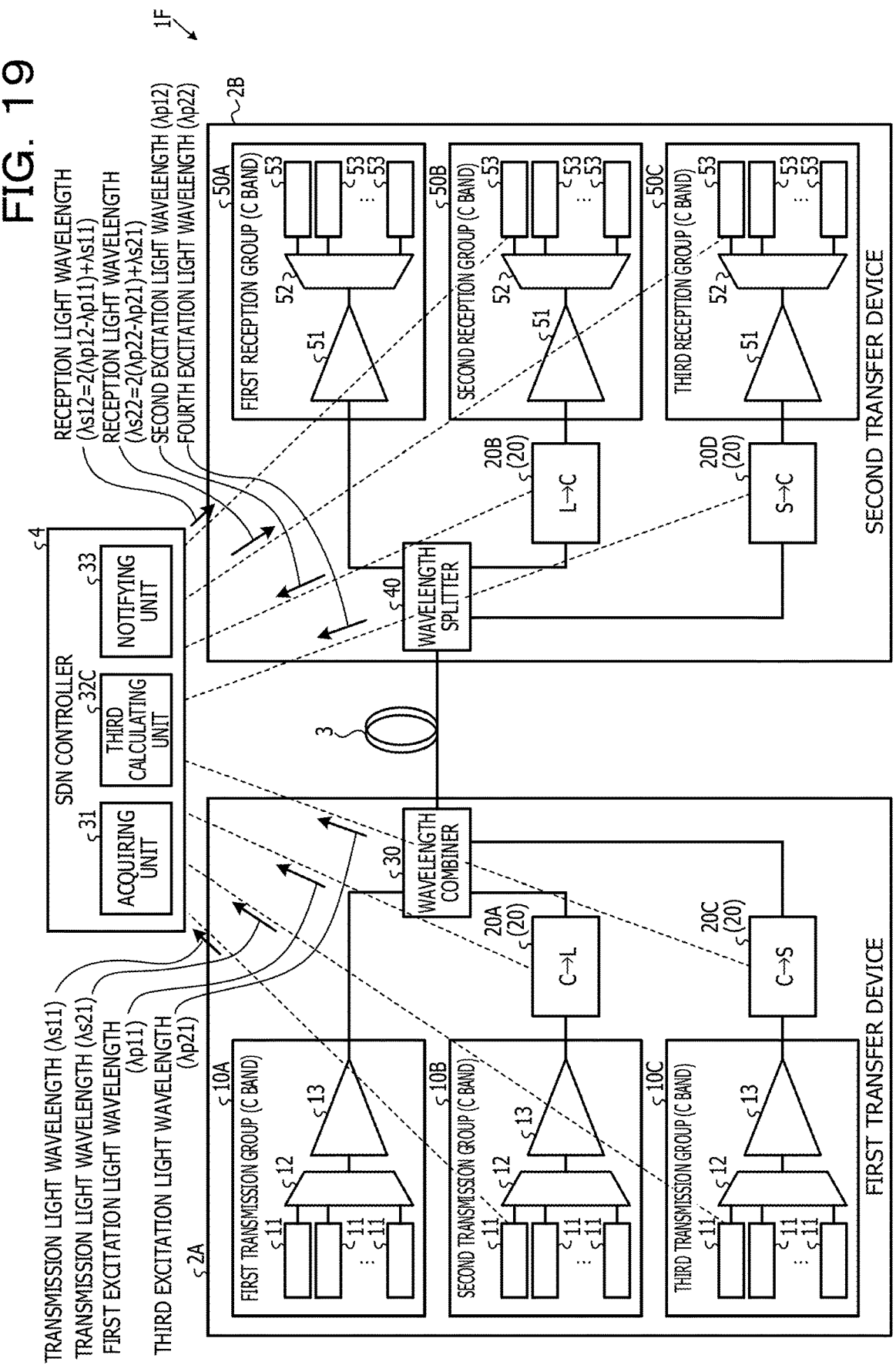
FIG. 19 is an explanatory figure illustrating an exemplary WDM system in a seventh embodiment.

FIG. 19 is an explanatory figure illustrating an exemplary WDM system 1F in the seventh embodiment. The same configurations as those in the WDM system 1 in the first embodiment are given the same signs, and explanations about the overlapping configurations and operation are omitted. The first transfer device 2A illustrated in FIG. 19 includes a third transmission group 10C, and a third wavelength converter 20C, in addition to the first transmission group 10A, second transmission group 10B, first wavelength converter 20A, and wavelength combiner 30. The third transmission group 10C includes C-band transmitters 11, an optical combiner 12, and an optical amplifier 13.

The third wavelength converter 20C uses third excitation light to perform wavelength-conversion of C-band first multiplexed light from the third transmission group 10C into S-band third multiplexed light. The third wavelength converter 20C outputs the S-band third multiplexed light to the wavelength combiner 30. The wavelength combiner 30 combines C-band first multiplexed light from the first transmission group 10A, L-band second multiplexed light from the first wavelength converter 20A, and S-band third multiplexed light from the third wavelength converter 20C. The wavelength combiner 30 outputs the first multiplexed light, second multiplexed light, and third multiplexed light to the transfer line fiber 3.

The second transfer device 2B includes a fourth wavelength converter 20D, and a third reception group 50C in addition to the wavelength splitter 40, second wavelength converter 20B, first reception group 50A, and second reception group 50B. The third reception group 50C includes an optical amplifier 51, an optical splitter 52, and C-band receivers 53. The wavelength splitter 40 splits multiplexed light received from the transfer line fiber 3 into C-band first multiplexed light, L-band second multiplexed light, and S-band third multiplexed light. The wavelength splitter 40 outputs the C-band first multiplexed light to the first reception group 50A, outputs the L-band second multiplexed light to the second wavelength converter 20B, and outputs the S-band third multiplexed light to the fourth wavelength converter 20D.

The fourth wavelength converter 20D uses fourth excitation light to perform wavelength-conversion of the S-band third multiplexed light from the wavelength splitter 40 into C-band first multiplexed light. The fourth excitation light wavelength is the same as the third excitation light wavelength. The fourth wavelength converter 20D outputs the wavelength-converted C-band third multiplexed light to the third reception group 50C.

A third calculating unit 32C is arranged in the CPU 4C in the SDN controller 4, instead of the calculating unit 32. The acquiring unit 31 acquires, through the information communicating unit 4A, the transmission light wavelength $\lambda s11$ from each transmitter 11 in the second transmission group 10B, the first excitation light wavelength $\lambda p11$ from the first wavelength converter 20A, and the second excitation light wavelength $\lambda p12$ from the second wavelength converter 20B. The first excitation light wavelength $\lambda p11$ is the same as the second excitation light wavelength $\lambda p12$. The third calculating unit 32C uses the formula, $2(\lambda p12-\lambda p11)+\lambda s11$, to calculate a reception light wavelength $\lambda s12$ based on the transmission light wavelength $\lambda s11$, first excitation light wavelength $\lambda p11$, and second excitation light wavelength $\lambda p12$. The reception light wavelength $\lambda s12$ is a reception light wavelength of a receiver 53 in the second reception group 50B corresponding to a transmitter 11 in the second transmission group 10B. The notifying unit 33 notifies the reception light wavelength $\lambda s12$ calculated for each receiver 53 in the second reception group 50B to the receiver 53. As a result, each receiver 53 in the second reception group 50B sets the received reception light wavelength $\lambda s12$ as the local emission light wavelength in a local emission light source 34.

The acquiring unit 31 acquires, through the information communicating unit 4A, the transmission light wavelength λs21 from each transmitter 11 in the third transmission group 10C, the first excitation light wavelength λp21 from the third wavelength converter 20C, and the second excitation light wavelength λp22 from the fourth wavelength converter 20D. The third calculating unit 32C uses the formula, $2(\lambda p22-\lambda p21)+\lambda s21$, to calculate a reception light wavelength λs22 based on the transmission light wavelength λs21, first excitation light wavelength λp21, and second excitation light wavelength λp22. The reception light wavelength λs22 is a reception light wavelength of a receiver 53 in the third reception group 50C corresponding to a transmitter 11 in the third transmission group 10C. The notifying unit 33 notifies the reception light wavelength λs22 calculated for each receiver 53 in the third reception group 50C to the receiver 53. As a result, each receiver 53 in the third reception group 50C sets the received reception light wavelength λs22 as the local emission light wavelength in a local emission light source 34.

Each receiver 53 in the second reception group 50B receives the calculated reception light wavelength λs12 of each receiver 53, and sets the reception light wavelength λs12 as the local emission light wavelength. For example, even if signal light wavelength-converted at the wavelength converter 20 or the like far exceeds a channel grid due to a wavelength mismatch or the like, a mismatch between a local emission light wavelength and a reception light wavelength is removed in each receiver 53 in the second reception group 50B. As a result, deterioration of reception quality of multiplexed light transferred in L-band second multiplexed light may be suppressed.

Each receiver 53 in the third reception group 50C receives the calculated reception light wavelength λs22 of each receiver 53, and sets the reception light wavelength λs22 as the local emission light wavelength. For example, even if signal light wavelength-converted at the wavelength converter 20 or the like far exceeds a channel grid due to a wavelength mismatch or the like, a mismatch between a local emission light wavelength and a reception light wavelength is removed in each receiver 53 in the third reception group 50C. As a result, deterioration of reception quality of multiplexed light transferred in S-band third multiplexed light may be suppressed. Moreover, high-capacity transfer may be realized using the wavelength bands of the C band, L band, and S band in the WDM system 1F.

Although the WDM system 1 in the above-mentioned first embodiment is illustrated as an example in which multiplexed light is transferred from the first transfer device 2A to the second transfer device 2B, the similar effects may certainly be attained even if multiplexed light is transferred from the second transfer device 2B to the first transfer device 2A. In view of this, an embodiment of a WDM system 1G that transfers light bidirectionally between transfer devices is explained below as an eighth embodiment.

Eighth Embodiment

Figure 20:
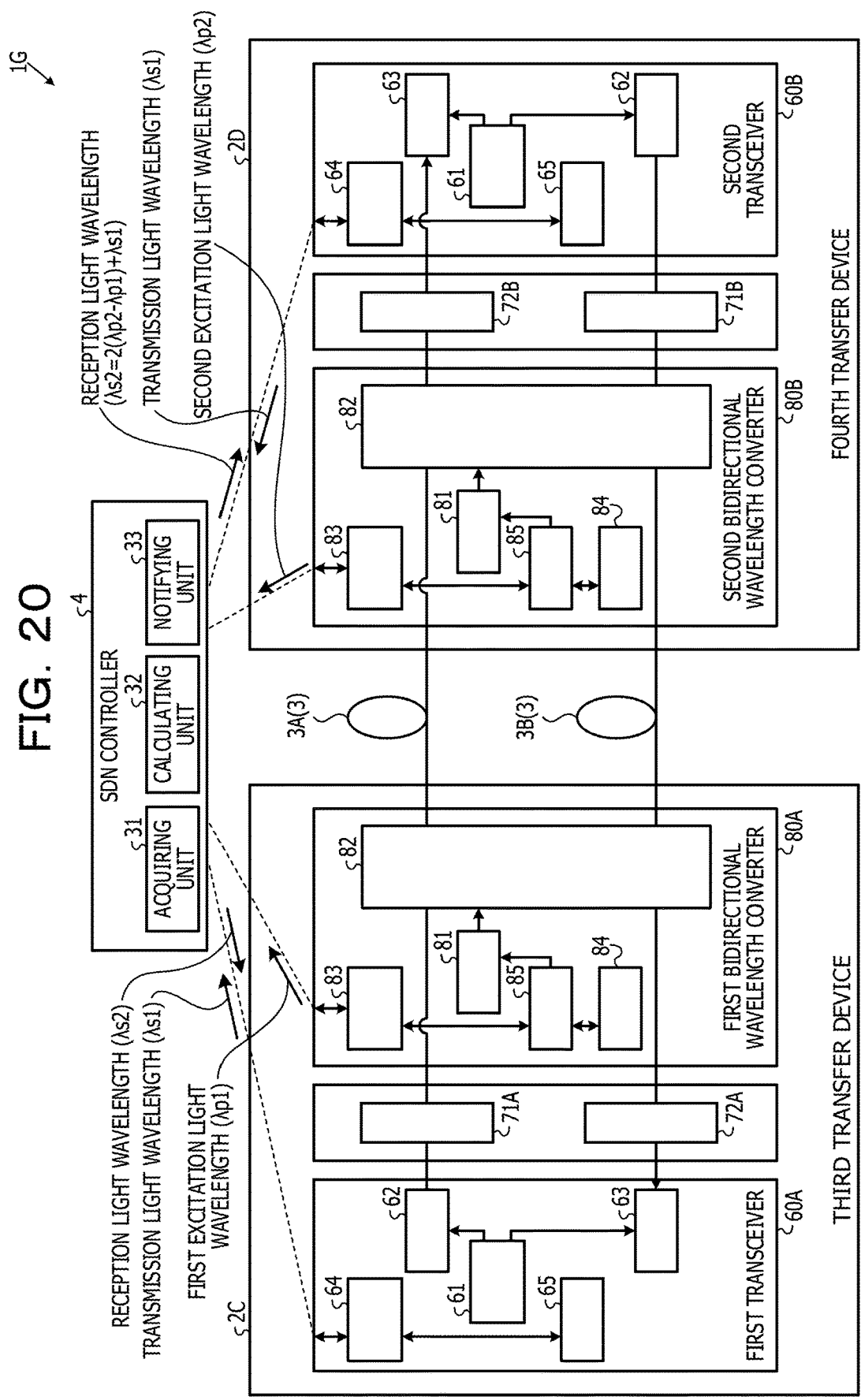
FIG. 20 is an explanatory figure illustrating an exemplary WDM system in an eighth embodiment.

FIG. 20 is an explanatory figure illustrating an exemplary WDM system 1G in the eighth embodiment. The WDM system 1G illustrated in FIG. 20 includes a third transfer device 2C, a fourth transfer device 2D, and the transfer line fiber 3. The transfer line fiber 3 includes an uplink transfer line fiber 3A that transfers multiplexed light from the third transfer device 2C to the fourth transfer device 2D, and a downlink transfer line fiber 3B that transfers multiplexed light from the fourth transfer device 2D to the third transfer device 2C.

The third transfer device 2C includes a plurality of first transceivers 60A, an optical combiner 71A, an optical splitter 72A, and a first bidirectional wavelength converter 80A. The third transfer device 2C illustrated in FIG. 20 has a plurality of built-in first transceivers 60A.

A first transceiver 60A includes a light source 61, a modulating unit 62, a demodulating unit 63, an information communicating unit 64, and a CPU 65. The light source 61 is an LD that has a transmission function of emitting signal light, and a reception function of emitting local emission light. The modulating unit 62 optically modulates signal light from the light source 61. The demodulating unit 63 uses local emission light from the light source 61 to optically demodulate reception light split at the optical splitter 72A. The information communicating unit 64 communicates with the SDN controller 4. The CPU 65 performs overall control of the first transceiver 60A. The optical combiner 71A combines signal light from the first transceivers 60A, and outputs the combined multiplexed light to the first bidirectional wavelength converter 80A. The optical splitter 72A outputs, to each first transceiver 60A, C-band signal light with any wavelength in first multiplexed light from the first bidirectional wavelength converter 80A. Each first transceiver 60A uses local emission light with a wavelength directed to itself to receive reception light which is included in the C-band signal light with any wavelength in the first multiplexed light from the optical splitter 72A, and is directed to itself.

The fourth transfer device 2D includes a plurality of second transceivers 60B, an optical combiner 71B, an optical splitter 72B, and a second bidirectional wavelength converter 80B. The fourth transfer device 2D illustrated in FIG. 20 has a plurality of built-in second transceivers 60B. A second transceiver 60B includes a light source 61, a modulating unit 62, a demodulating unit 63, an information communicating unit 64, and a CPU 65.

The first bidirectional wavelength converter 80A includes an excitation light source 81, a bidirectional nonlinear fiber 82, an information communicating unit 83, a storage unit 84, and a CPU 85. The excitation light source 81 is an LD that emits first excitation light. The bidirectional nonlinear fiber 82 uses the first excitation light from the excitation light source 81 to perform wavelength-conversion of the C-band first multiplexed light into L-band second multiplexed light, and uses the first excitation light to perform wavelength-conversion of second multiplexed light into first multiplexed light. The information communicating unit 83 communicates with the SDN controller 4. The storage unit 84 stores various types of information such as a zero-dispersion wavelength table. The CPU 85 performs overall control of the first bidirectional wavelength converter 80A.

The second bidirectional wavelength converter 80B includes an excitation light source 81, a bidirectional nonlinear fiber 82, an information communicating unit 83, a storage unit 84, and a CPU 85. The excitation light source 81 is an LD that emits second excitation light. The bidirectional nonlinear fiber 82 uses the second excitation light from the excitation light source 81 to perform wavelength-conversion of the C-band first multiplexed light into L-band second multiplexed light, and uses the second excitation light to perform wavelength-conversion of second multiplexed light into first multiplexed light. The information communicating unit 83 communicates with the SDN controller 4. The storage unit 84 stores various types of information such as a zero-dispersion wavelength table. The CPU 85 performs overall control of the second bidirectional wavelength converter 80B.

The optical combiner 71A in the third transfer device 2C combines C-band signal light from individual first transceivers 60A, and outputs first multiplexed light to the first bidirectional wavelength converter 80A. The first bidirectional wavelength converter 80A uses the first excitation light to perform wavelength-conversion of the first multiplexed light from the optical combiner 71A into L-band second multiplexed light. The first bidirectional wavelength converter 80A outputs the wavelength-converted L-band second multiplexed light to the uplink transfer line fiber 3A.

The second bidirectional wavelength converter 80B uses the second excitation light to perform wavelength-conversion of the L-band second multiplexed light received from the uplink transfer line fiber 3A into C-band first multiplexed light. Furthermore, the second bidirectional wavelength converter 80B outputs the wavelength-converted first multiplexed light to the optical splitter 72B. The optical splitter 72B in the fourth transfer device 2D outputs, to each second transceiver 60B, C-band signal light in any wavelength in the first multiplexed light from the second bidirectional wavelength converter 80B. Each second transceiver 60B uses local emission light with a wavelength directed to itself to receive reception light which is included in the C-band signal light with any wavelength in the first multiplexed light from the optical splitter 72B, and is directed to itself.

The optical combiner 71A in the fourth transfer device 2D combines C-band signal light from individual second transceivers 60B, and outputs first multiplexed light to the second bidirectional wavelength converter 80B. The second bidirectional wavelength converter 80B uses the second excitation light to perform wavelength-conversion of the C-band first multiplexed light from the optical combiner 71B into L-band second multiplexed light. The second bidirectional wavelength converter 80B outputs the wavelength-converted L-band second multiplexed light to the downlink transfer line fiber 3B.

The first bidirectional wavelength converter 80A uses the first excitation light to perform wavelength-conversion of the L-band second multiplexed light received from the downlink transfer line fiber 3B into C-band first multiplexed light. Furthermore, the first bidirectional wavelength converter 80A outputs the wavelength-converted first multiplexed light to the optical splitter 72A. The optical splitter 72A in the third transfer device 2C outputs, to each first transceiver 60A, C-band signal light with any wavelength in first multiplexed light from the first bidirectional wavelength converter 80A.

The acquiring unit 31 in the SDN controller 4 acquires, through the information communicating unit 4A, a transmission light wavelength $\lambda s1$ from the first transceiver 60A, a first excitation light wavelength $\lambda p1$ from the first bidirectional wavelength converter 80A, and a second excitation light wavelength $\lambda p2$ from the second bidirectional wavelength converter 80B. The calculating unit 32 uses the formula, $2(\lambda p2-\lambda p1)+\lambda s1$, to calculate a reception light wavelength $\lambda s2$ of a second transceiver 60B corresponding to a first transceiver 60A. The notifying unit 33 notifies the reception light wavelength $\lambda s2$ calculated for each second transceiver 60B to the corresponding second transceiver 60B through the information communicating unit 4A. As a result, the second transceiver 60B controls the light source 61 so as to set the received reception light wavelength $\lambda s2$ as the local emission light wavelength.

The acquiring unit 31 in the SDN controller 4 acquires a transmission light wavelength $\lambda s1$ from the second transceiver 60B, a first excitation light wavelength $\lambda p1$ from the first bidirectional wavelength converter 80A, and a second excitation light wavelength $\lambda p2$ from the second bidirectional wavelength converter 80B. The calculating unit 32 uses the formula, $2(\lambda p2-\lambda p1)+\lambda s1$, to calculate a reception light wavelength $\lambda s2$ of a first transceiver 60A corresponding to a second transceiver 60B. The notifying unit 33 notifies the reception light wavelength $\lambda s2$ calculated for each second transceiver 60B to the corresponding first transceiver 60A. As a result, the first transceiver 60A controls the light source 61 so as to set the received reception light wavelength $\lambda s2$ as the local emission light wavelength.

Deterioration of reception quality may be suppressed in the WDM system 1G in the eighth embodiment even if the bidirectional wavelength converters 80A and 80B are used.

In the WDM system 1 in the above-mentioned first embodiment, the first transfer device 2A and the second transfer device 2B are coupled by a single span of the transfer line fiber 3. However, the coupling between the first transfer device 2A and the second transfer device 2B is not limited to a single span of the transfer line fiber 3, but may be a plurality of spans of transfer line fibers. Accordingly, an embodiment thereof is explained below as a ninth embodiment.

Ninth Embodiment

Figure 21:
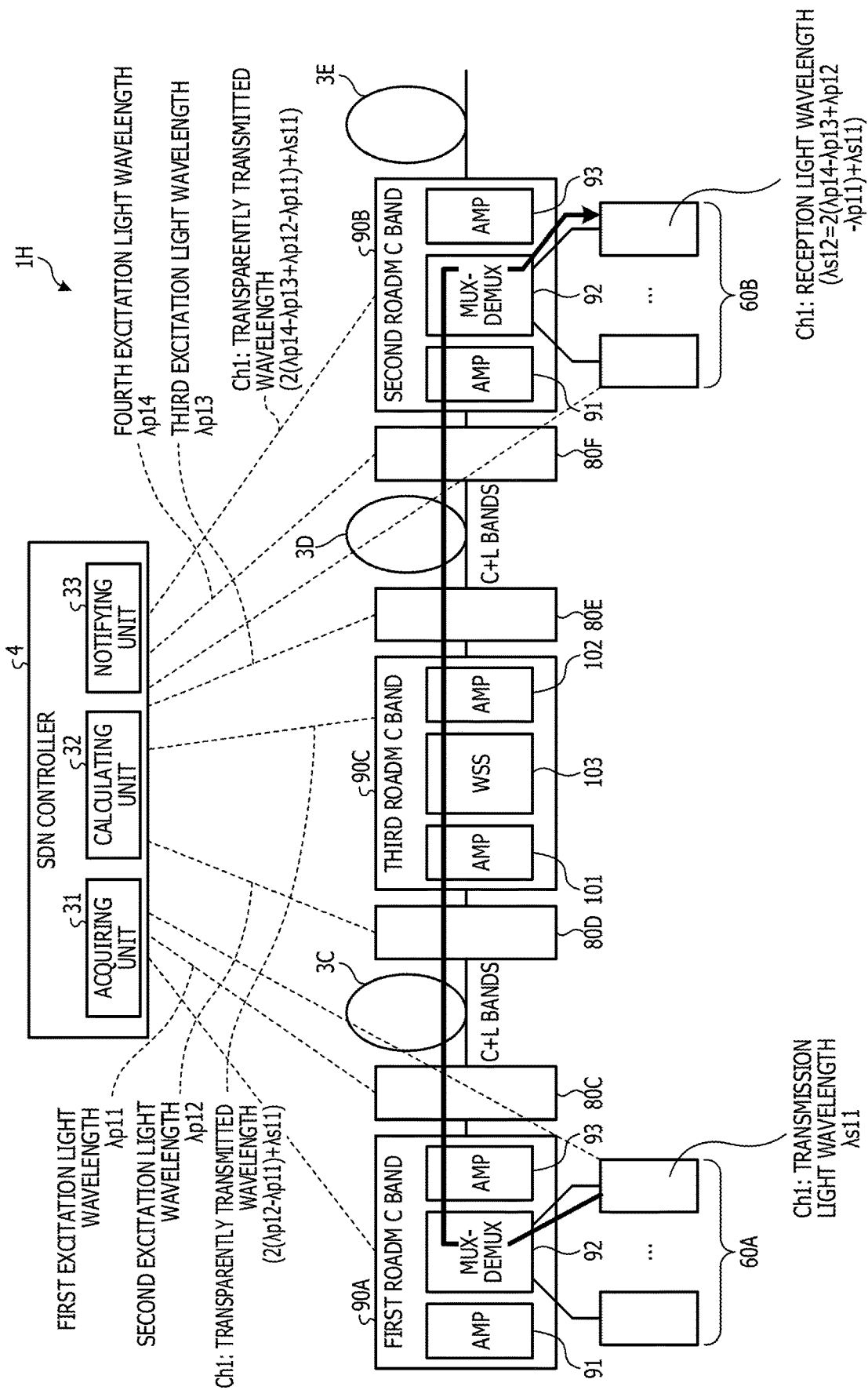
FIG. 21 is an explanatory figure illustrating an exemplary WDM system in a ninth embodiment.

FIG. 21 is an explanatory figure illustrating an exemplary WDM system 1H in the ninth embodiment. The WDM system 1H illustrated in FIG. 21 includes a first reconfigurable optical add/drop multiplexer (ROADM) 90A, an eleventh wavelength converter 80C, a first span 3C, and a twelfth wavelength converter 80D. The WDM system 1H includes an in line amplifier (ILA) 100, a thirteenth wavelength converter 80E, a second span 3D, a fourteenth wavelength converter 80F, and a second ROADM 90B.

The first ROADM 90A includes a pre-amplifier 91, a multiplexer/demultiplexer (MUX-DEMUX) 92, and a post-amplifier 93. The MUX-DEMUX 92 is coupled with a plurality of first transceivers 60A, multiplexes C-band signal light from the individual first transceivers 60A which is then to be output as first multiplexed light, and splits first multiplexed light into C-band signal light which is then to be output. The MUX-DEMUX 92 outputs the multiplexed C-band first multiplexed light to the eleventh wavelength converter 80C. The MUX-DEMUX 92 selects, at a WSS therein, an arbitrary single wavelength from all the wavelengths of 88 channels received from the eleventh wavelength converter 80C, for example. Since the WSS therein adjusts a transparently transmitted band of receivable signal light according to received signal light, even if the wavelength of the reception light far exceeds the wavelength of a channel grid, wavelength-selection of the wavelength of the reception light may be performed without missing any of wavelengths. The MUX-DEMUX 92 combines selected wavelengths into a plurality of wavelengths of 16 channels, for example, and transmits the combined signal light to each first transceiver 60A. A first transceiver 60A uses local emission light with a signal light wavelength directed to itself to receive the signal light directed to itself from the signal light received from the MUX-DEMUX 92.

The eleventh wavelength converter 80C uses eleventh excitation light to perform wavelength-conversion of first multiplexed light into second multiplexed light, and uses the eleventh excitation light to perform wavelength-conversion of the second multiplexed light into the first multiplexed light. The twelfth wavelength converter 80D uses twelfth excitation light to perform wavelength-conversion of the second multiplexed light into the first multiplexed light, and uses the twelfth excitation light to perform wavelength-conversion of the first multiplexed light into the second multiplexed light. The ILA 100 is a relay device that is arranged between the twelfth wavelength converter 80D and the thirteenth wavelength converter 80E, and includes a pre-amplifier 101 and post-amplifier 102 that optically amplify first multiplexed light, and a WSS 103 that transparently transmits signal light with a set wavelength. The thirteenth wavelength converter 80E uses thirteenth excitation light to perform wavelength-conversion of first multiplexed light into second multiplexed light, and uses the thirteenth excitation light to perform wavelength-conversion of the second multiplexed light into the first multiplexed light. The fourteenth wavelength converter 80F uses fourteenth excitation light to perform wavelength-conversion of the second multiplexed light into the first multiplexed light, and uses the fourteenth excitation light to perform wavelength-conversion of the first multiplexed light into the second multiplexed light.

The second ROADM 90B includes a pre-amplifier 91, a MUX-DEMUX 92, and a post-amplifier 93. The MUX-DEMUX 92 is coupled with a plurality of second transceivers 60B, multiplexes C-band signal light from the individual second transceivers 60B which is then to be output as first multiplexed light, and splits first multiplexed light into C-band signal light which is then to be output. The MUX-DEMUX 92 outputs the multiplexed C-band first multiplexed light to the fourteenth wavelength converter 80F. The MUX-DEMUX 92 selects, at a WSS therein, an arbitrary single wavelength from all the wavelengths of 88 channels received from the fourteenth wavelength converter 80F, for example. Since the WSS therein adjusts a transparently transmitted band of receivable signal light according to received signal light, even if the wavelength of the reception light far exceeds the wavelength of a channel grid, wavelength-selection of the wavelength of the reception light may be performed without missing any of wavelengths. The MUX-DEMUX 92 combines selected wavelengths into a plurality of (for example, 16 channels of) wavelengths, and transmits the combined signal light to each second transceiver 60B. A second transceiver 60B uses local emission light with a signal light wavelength directed to itself to receive the signal light directed to itself from the signal light received from the MUX-DEMUX 92.

The first ROADM 90A multiplexes C-band signal light from individual first transceivers 60A, and outputs the first multiplexed light to the eleventh wavelength converter 80C. The eleventh wavelength converter 80C uses eleventh excitation light to perform wavelength-conversion of first multiplexed light into L-band second multiplexed light, and outputs the wavelength-converted second multiplexed light to the first span 3C. The twelfth wavelength converter 80D receives the L-band second multiplexed light from the first span 3C, uses the twelfth excitation light to perform wavelength-conversion of the second multiplexed light into C-band first multiplexed light, and outputs the wavelength-converted C-band first multiplexed light to the ILA 100. The ILA 100 optically amplifies the first multiplexed light from the twelfth wavelength converter 80D, and outputs the optically amplified first multiplexed light to the thirteenth wavelength converter 80E.

The thirteenth wavelength converter 80E uses thirteenth excitation light to perform wavelength-conversion of first multiplexed light into second multiplexed light, and outputs the wavelength-converted second multiplexed light to the second span 3D. The fourteenth wavelength converter 80F receives the L-band second multiplexed light from the second span 3D, uses the fourteenth excitation light to perform wavelength-conversion of the second multiplexed light into first multiplexed light, and outputs the wavelength-converted first multiplexed light to the second ROADM 90B. The second ROADM 90B splits the first multiplexed light converted at the fourteenth wavelength converter 80F into arbitrary C-band signal light, combines split C-band signal light corresponding to the number of a plurality of channels, and outputs the combined signal light to each corresponding second transceiver 60B. A second transceiver 60B uses local emission light with a signal light wavelength directed to itself to receive the signal light directed to itself from the signal light received from the MUX-DEMUX 92.

The acquiring unit 31 in the SDN controller 4 acquires a transmission light wavelength $\lambda s11$ from the first transceiver 60A, an eleventh excitation light wavelength $\lambda p11$ from the eleventh wavelength converter 80C, and a twelfth excitation light wavelength $\lambda p12$ from the twelfth wavelength converter 80D. Furthermore, the acquiring unit 31 acquires a thirteenth excitation light wavelength $\lambda p13$ from the thirteenth wavelength converter 80E, and a fourteenth excitation light wavelength $\lambda p14$ from the fourteenth wavelength converter 80F. The calculating unit 32 uses the formula, $2(\lambda p12-\lambda p11)+\lambda s11$, to calculate a transparently transmitted wavelength that is transparently transmitted through the WSS 103 in the ILA 100 based on the transmission light wavelength $\lambda s11$, eleventh excitation light wavelength $\lambda p11$, and twelfth excitation light wavelength $\lambda p12$. Furthermore, the calculating unit 32 uses the formula, $2(\lambda p14-\lambda p13+\lambda p12-\lambda p11)+\lambda s11$, to calculate a transparently transmitted wavelength of the MUX-DEMUX 92 in the second ROADM 90B, and a reception light wavelength $\lambda s12$ of a second transceiver 60B on the receiving side.

The notifying unit 33 notifies the WSS 103 in the ILA 100 of the first transparently transmitted wavelength calculated using the formula, $2(\lambda p12-\lambda p11)+\lambda s11$. The ILA 100 sets the received first transparently transmitted wavelength in the WSS 103. Furthermore, the notifying unit 33 notifies the reception light wavelength $\lambda s12$ calculated using the formula, $2(\lambda p14-\lambda p13+\lambda p12-\lambda p11)+\lambda s11$, to the second ROADM 90B, and a corresponding second transceiver 60B. The second ROADM 90B sets the reception light wavelength $\lambda s12$ as the transparently transmitted wavelength in the MUX-DEMUX 92. Furthermore, the second transceiver 60B sets the reception light wavelength $\lambda s12$ as the local emission light wavelength in the light source 61.

The SDN controller 4 in the ninth embodiment uses the formula, $2(\lambda p12-\lambda p11)+\lambda s11$, to calculate the transparently transmitted wavelength that is transparently transmitted through the WSS 103 in the ILA 100 even if the ILA 100 is arranged between the first ROADM 90A and the second ROADM 90B. Furthermore, the SDN controller 4 uses the formula, $2(\lambda p14-\lambda p13+\lambda p12-\lambda p11)+\lambda s11$, to calculate a transparently transmitted wavelength of the MUX-DEMUX 92 in the second ROADM 90B, and a reception light wavelength $\lambda s12$ of a second transceiver 60B on the receiving side. The SDN controller 4 sets the transparently transmitted wavelength calculated using the formula, $2(\lambda p12-\lambda p11)+\lambda s11$, in the WSS 103 in the ILA 100. Furthermore, the SDN controller 4 sets the reception light wavelength $\lambda s12$ calculated using the formula, $2(\lambda p14-\lambda p13+\lambda p12-$ λp11)+λs11, as the transparently transmitted wavelength of the MUX-DEMUX 92 in the second ROADM 90B, and the local emission light wavelength of a second transceiver 60B on the receiving side. As a result, deterioration of reception quality may be suppressed even if the ILA 100 is arranged between the first transceiver 60A and the second transceiver 6B.

The WDM system 1H in the ninth embodiment has the twelfth wavelength converter 80D that is arranged at the input stage of the ILA 100, and the thirteenth wavelength converter 80E that is arranged at the output stage of the ILA 100, and optically amplifies the C-band first multiplexed light at the amplifier in the ILA 100. However, if the amplifier in the ILA 100 has the function of optically amplifying C-band first multiplexed light, and L-band second multiplexed light, the twelfth wavelength converter 80D, and thirteenth wavelength converter 80E may not be arranged, and configurations related to this may be changed as appropriate.

Although the eleventh wavelength converter 80C outputs wavelength-converted L-band second multiplexed light to the first span 3C for convenience of explanation, L-band second multiplexed light, and C-band first multiplexed light may be combined, and output to the first span 3C. In this case, the eleventh wavelength converter 80C splits first multiplexed light, and second multiplexed light from the first span 3C, performs wavelength-conversion of the split second multiplexed light into first multiplexed light, and outputs the wavelength-converted first multiplexed light, and the split first multiplexed light. Although the twelfth wavelength converter 80D outputs wavelength-converted L-band second multiplexed light to the first span 3C, L-band second multiplexed light, and C-band first multiplexed light may be combined, and output to the first span 3C. In this case, the twelfth wavelength converter 80D splits first multiplexed light, and second multiplexed light from the first span 3C, performs wavelength-conversion of the split second multiplexed light into first multiplexed light, and outputs the wavelength-converted first multiplexed light, and the split first multiplexed light to the ILA 100.

Although the thirteenth wavelength converter 80E outputs wavelength-converted L-band second multiplexed light to the second span 3D, L-band second multiplexed light, and C-band first multiplexed light may be combined, and output to the second span 3D. In this case, the thirteenth wavelength converter 80E splits first multiplexed light, and second multiplexed light from the second span 3D, performs wavelength-conversion of the split second multiplexed light into first multiplexed light, and outputs the wavelength-converted first multiplexed light, and the split first multiplexed light to the ILA 100. Although the fourteenth wavelength converter 80F outputs wavelength-converted L-band second multiplexed light to the second span 3D, L-band second multiplexed light, and C-band first multiplexed light may be combined, and output to the second span 3D. In this case, the fourteenth wavelength converter 80F splits first multiplexed light, and second multiplexed light from the second span 3D, performs wavelength-conversion of the split second multiplexed light into first multiplexed light, and outputs the wavelength-converted first multiplexed light, and the split first multiplexed light.

Although the WDM system 1H in the ninth embodiment has the ILA 100 arranged between the first ROADM 90A and the second ROADM 90B, it may have a third ROADM 90C that is arranged instead of the ILA 100, and an embodiment thereof is explained below as a tenth embodiment.

Tenth Embodiment

Figure 22:
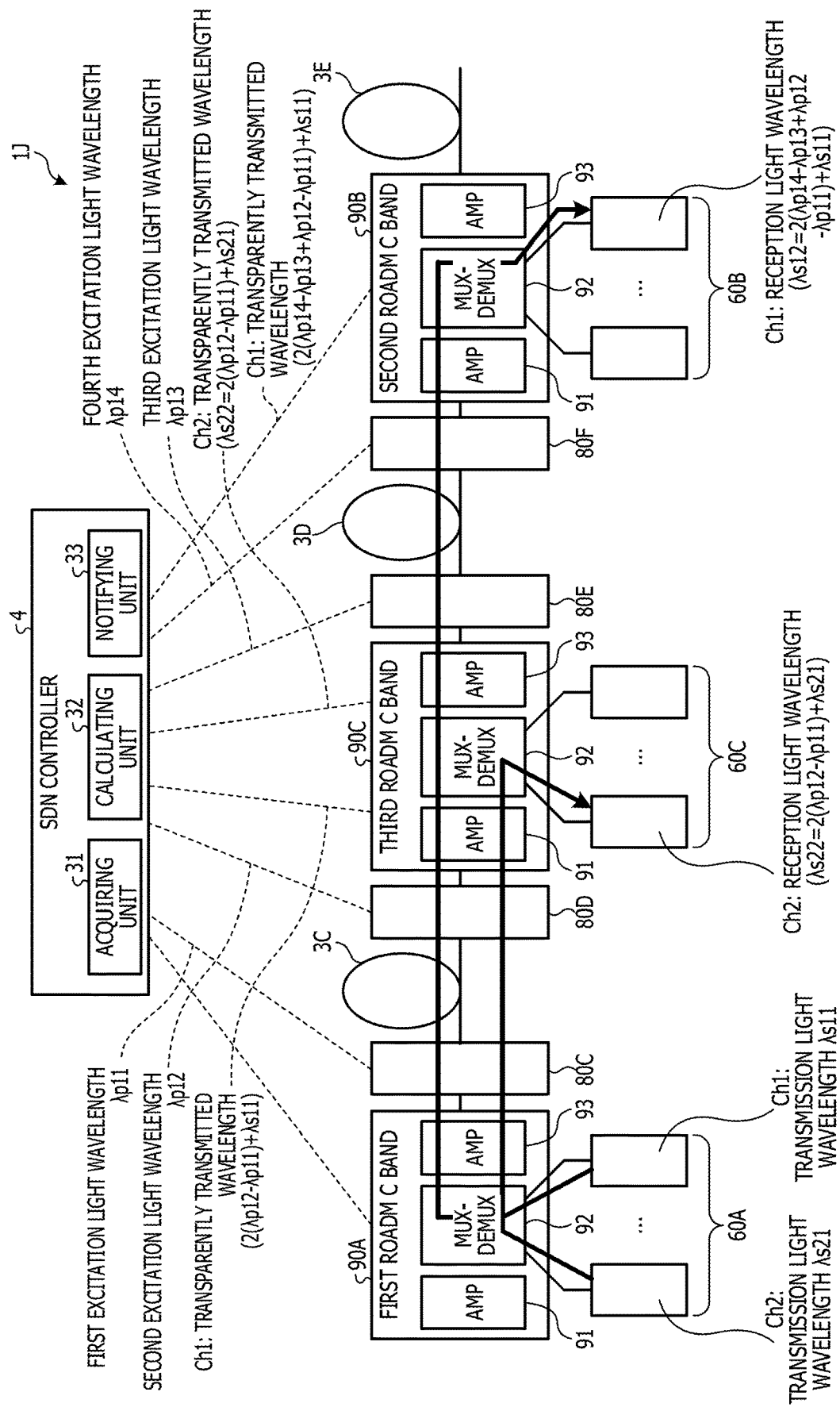
FIG. 22 is an explanatory figure illustrating an exemplary WDM system in a tenth embodiment.

FIG. 22 is an explanatory figure illustrating an exemplary WDM system 1J in the tenth embodiment. The same configurations as those in the WDM system 1H in the ninth embodiment are given the same signs, and explanations about the overlapping configurations and operation are omitted. The WDM system 1J in the tenth embodiment is different from the WDM system 1H in the ninth embodiment in that the third ROADM 90C is arranged instead of the ILA 100.

The third ROADM 90C illustrated in FIG. 22 includes a pre-amplifier 91, a MUX-DEMUX 92, and a post-amplifier 93. The pre-amplifier 91 and post-amplifier 93 optically amplify C-band first multiplexed light. The pre-amplifier 91 optically amplifies wavelength-converted first multiplexed light from the twelfth wavelength converter 80D, and outputs the optically amplified first multiplexed light to the MUX-DEMUX 92. The MUX-DEMUX 92 is coupled with a plurality of third transceivers 60C, and outputs signal light to a corresponding third transceiver 60C in the plurality of third transceivers 60C based on transparently transmitted wavelength. The transparently transmitted wavelength is a wavelength of signal light received by the third transceiver 60C.

The MUX-DEMUX 92 transparently transmits the optically amplified first multiplexed light from the pre-amplifier 91 based on the transparently transmitted wavelength, and outputs the transparently transmitted first multiplexed light to the post-amplifier 93. The transparently transmitted wavelength is a wavelength of signal light received by the second transceiver 60B. The post-amplifier 93 optically amplifies the first multiplexed light, and outputs the optically amplified first multiplexed light to the thirteenth wavelength converter 80E.

The thirteenth wavelength converter 80E uses thirteenth excitation light to perform wavelength-conversion of first multiplexed light into second multiplexed light, and outputs the wavelength-converted second multiplexed light to the second span 3D. The fourteenth wavelength converter 80F uses the fourteenth excitation light to perform wavelength-conversion of the second multiplexed light from the second span 3D into first multiplexed light, and outputs the wavelength-converted first multiplexed light to the second ROADM 90B. The MUX-DEMUX 92 in the second ROADM 90B splits the wavelength-converted first multiplexed light into arbitrary C-band signal light based on the transparently transmitted wavelength, combines split C-band signal light corresponding to the number of a plurality of channels, and outputs the combined signal light to each corresponding second transceiver 60B. A second transceiver 60B uses local emission light with a signal light wavelength directed to itself to receive the signal light directed to itself from the signal light received from the MUX-DEMUX 92.

The acquiring unit 31 in the SDN controller 4 acquires a transmission light wavelength $\lambda s11$ from the first transceiver 60A, an eleventh excitation light wavelength $\lambda p11$ from the eleventh wavelength converter 80C, and a twelfth excitation light wavelength $\lambda p12$ from the twelfth wavelength converter 80D. Furthermore, the acquiring unit 31 acquires a thirteenth excitation light wavelength $\lambda p13$ from the thirteenth wavelength converter 80E, and a fourteenth excitation light wavelength $\lambda p14$ from the fourteenth wavelength converter 80F. The calculating unit 32 uses the formula, $2(\lambda p12-\lambda p11)+\lambda s11$, to calculate a first transparently transmitted wavelength that is transparently transmitted through the MUX-DEMUX 92 in the third ROADM 90C based on the transmission light wavelength $\lambda s11$, eleventh excitation light wavelength $\lambda p11$, and twelfth excitation light wavelength $\lambda p12$. Furthermore, the calculating unit 32 uses the formula, $2(\lambda p14-\lambda p13+\lambda p12-\lambda p11)+\lambda s11$, to calculate a second transparently transmitted wavelength of the MUX-DEMUX 92 in the second ROADM 90B, and a reception light wavelength $\lambda s12$ of a second transceiver 60B on the receiving side.

The notifying unit 33 notifies the MUX-DEMUX 92 in the third ROADM 90C of the first transparently transmitted wavelength calculated using the formula, $2(\lambda p12-\lambda p11)+\lambda s11$. The MUX-DEMUX 92 sets the received first transparently transmitted wavelength. As a result, the MUX-DEMUX 92 transparently transmits signal light with the transmission light wavelength $\lambda s11$. Furthermore, the notifying unit 33 notifies the reception light wavelength $\lambda s12$ calculated using the formula, $2(\lambda p14-\lambda p13+\lambda p12-\lambda p11)+\lambda s11$, to the second ROADM 90B, and a corresponding second transceiver 60B. The second ROADM 90B sets the reception light wavelength $\lambda s12$ as the transparently transmitted wavelength in the MUX-DEMUX 92. Furthermore, the second transceiver 60B sets the reception light wavelength $\lambda s12$ as the local emission light wavelength in the light source 61. As a result, the second transceiver 60B may suppress deterioration of reception quality in reception of signal light with the transmission light wavelength $\lambda s11$ of a first transceiver 60A.

The calculating unit 32 acquires a transmission light wavelength $\lambda s21$ from the first transceiver 60A, an eleventh excitation light wavelength $\lambda p11$ from the eleventh wavelength converter 80C, and a twelfth excitation light wavelength $\lambda p12$ from the twelfth wavelength converter 80D. The transmission light wavelength $\lambda s21$ of a first transceiver 60A is used for communication of a Ch2 third transceiver 60C. The calculating unit 32 uses the formula, $2(\lambda p12-\lambda p11)+\lambda s21$, to calculate a first transparently transmitted wavelength that is transparently transmitted through the MUX-DEMUX 92 in the third ROADM 90C based on the transmission light wavelength $\lambda s21$, eleventh excitation light wavelength $\lambda p11$, and twelfth excitation light wavelength $\lambda p12$. Furthermore, the calculating unit 32 uses the formula, $2(\lambda p12-\lambda p11)+\lambda s21$, to calculate a second transparently transmitted wavelength of the MUX-DEMUX 92 in the third ROADM 90C, and a reception light wavelength $\lambda s22$ of a third transceiver 60C on the receiving side.

The notifying unit 33 notifies the MUX-DEMUX 92 in the third ROADM 90C of the first transparently transmitted wavelength calculated using the formula, $2(\lambda p12-\lambda p11)+\lambda s21$. The MUX-DEMUX 92 sets the received first transparently transmitted wavelength. As a result, the MUX-DEMUX 92 transparently transmits signal light with the transmission light wavelength $\lambda s21$. Furthermore, the notifying unit 33 notifies the reception light wavelength $\lambda s22$ calculated using the formula, $2(\lambda p12-\lambda p11)+\lambda s21$, to the third ROADM 90C, and a corresponding third transceiver 60C. The third ROADM 90C sets the reception light wavelength $\lambda s22$ as the transparently transmitted wavelength in the MUX-DEMUX 92. Furthermore, the third transceiver 60C sets the reception light wavelength $\lambda s22$ as the local emission light wavelength in the light source 61. As a result, the third transceiver 60C v suppress deterioration of reception quality in reception of signal light with the transmission light wavelength $\lambda s21$ of a first transceiver 60A.

Although the WDM system 1 in the above-mentioned first embodiment is illustrated as an example in which the degenerate four-wave mixing wavelength converter 20 is used, a non-degenerate four-wave mixing wavelength converter 110 may be used, and an embodiment thereof is explained below as an eleventh embodiment. The same configurations as those in the WDM system 1 in the first embodiment are given the same signs, and explanations about the overlapping configurations and operation are omitted.

Eleventh Embodiment

Figure 23:
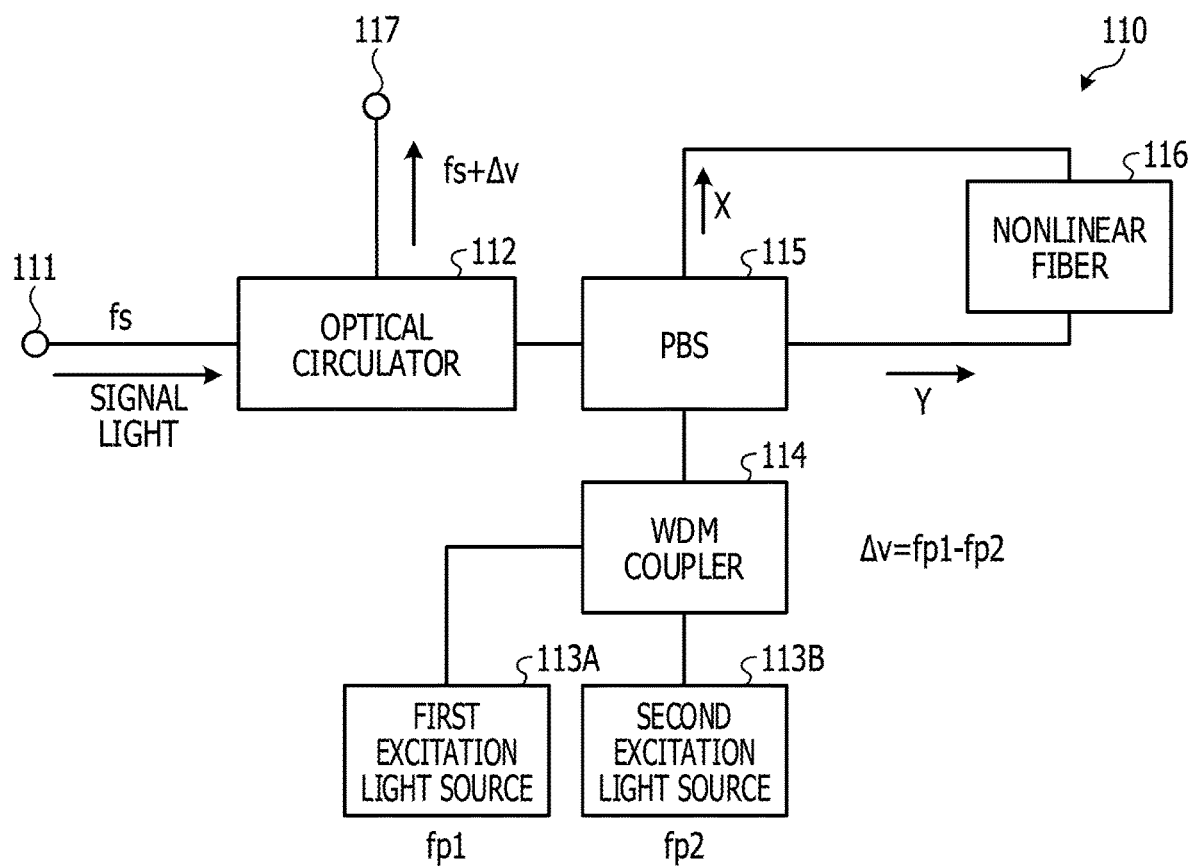
FIG. 23 is an explanatory figure illustrating an exemplary non-degenerate four-wave mixing wavelength converter.

FIG. 23 is an explanatory figure illustrating the exemplary non-degenerate four-wave mixing wavelength converter 110. The wavelength converter 110 illustrated in FIG. 23 includes an input port 111, an optical circulator 112, a first excitation light source 113A, a second excitation light source 113B, a WDM coupler 114, a polarizing beam splitter (PBS) 115, a nonlinear fiber 116, and an output port 117. The optical circulator 112 receives signal light through the input port 111, and outputs the signal light to the PBS 115. Furthermore, the WDM coupler 114 combines twenty-first excitation light from the first excitation light source 113A, and twenty-second excitation light from the second excitation light source 113B, and outputs the twenty-first excitation light and twenty-second excitation light to the PBS 115. The PBS 115 polarizes and splits the signal light, twenty-first excitation light, and twenty-second excitation light, and inputs the vertically polarized signal light, twenty-first excitation light, and twenty-second excitation light to the nonlinear fiber 116 in the X-direction. Furthermore, the PBS 115 inputs the horizontally polarized signal light, twenty-first excitation light, and twenty-second excitation light to the nonlinear fiber 116 in the Y-direction. The nonlinear fiber 116 uses the twenty-first excitation light, and twenty-second excitation light to perform wavelength-conversion of the horizontally polarized signal light into horizontally polarized converted light, and outputs the wavelength-converted, horizontally polarized converted light to the PBS 115. The nonlinear fiber 116 uses the twenty-first excitation light, and twenty-second excitation light to perform wavelength-conversion of the vertically polarized signal light into vertically polarized converted light, and outputs the wavelength-converted, vertically polarized converted light to the PBS 115. The PBS 115 combines the vertically polarized converted light, and horizontally polarized converted light, and outputs the converted light to the optical circulator 112. The optical circulator 112 outputs the converted light from the PBS 115 through the output port 117.

Figure 24:
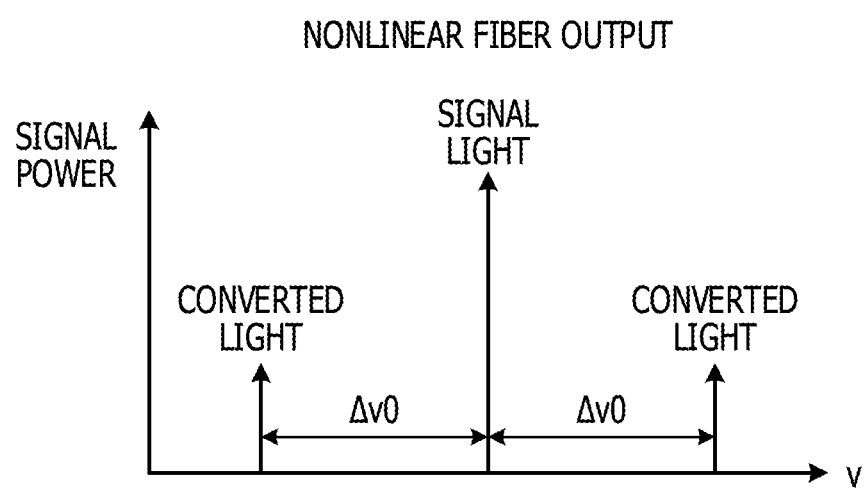
FIG. 24 is an explanatory figure illustrating an exemplary relationship between signal light and converted light.

FIG. 24 is an explanatory figure illustrating an exemplary relationship between signal light and converted light. The converted light generates light with wavelengths that are different by $\pm\Delta v0$ from the wavelength of signal light as illustrated in FIG. 24.

$\Delta v0$ is the frequency difference between a frequency fp1 of eleventh excitation light, and a frequency fp2 of twelfth excitation light.

Figure 25:
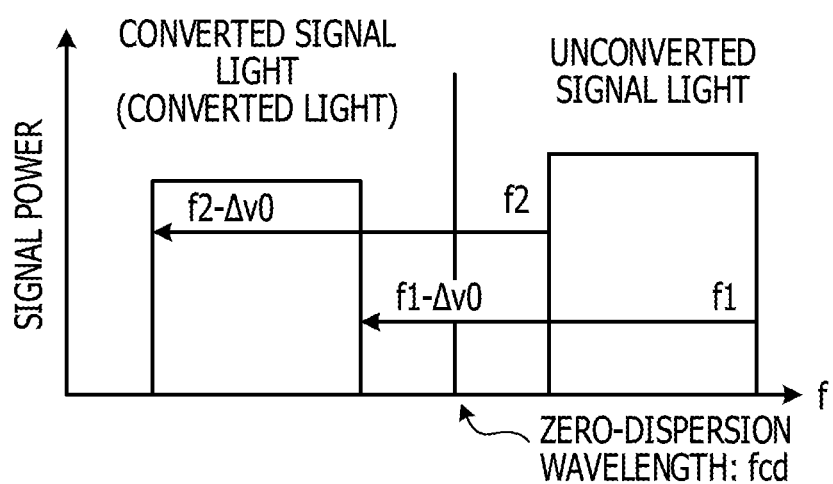
FIG. 25 is an explanatory figure illustrating an exemplary relationship between signal light and converted light in a case where a zero-dispersion frequency of a nonlinear fiber matches a zero-dispersion frequency corresponding to a set environment.

FIG. 25 is an explanatory figure illustrating an exemplary relationship between unconverted signal light and converted signal light in a case where a zero-dispersion frequency of a nonlinear fiber matches a zero-dispersion frequency corresponding to a set environment. The nonlinear fiber illustrated by reference to FIG. 25 may be the nonlinear fiber 116 illustrated in FIG. 23. The unconverted signal light generates converted signal light (converted light) to have a frequency $-\Delta v0$ from the frequency of unconverted signal light. For example, converted light of unconverted signal light f1 is generated to have a frequency f1−Δv0, and converted light of unconverted signal light f2 is generated to have a frequency f2−Δv0. For example, if the zero-dispersion frequency of the nonlinear fiber 116 is set to the zero-dispersion frequency corresponding to the set environment, converted light has sufficient signal power in a wavelength-converted band as illustrated in FIG. 25. For example, if the zero-dispersion frequency of the nonlinear fiber 116 is set to the zero-dispersion frequency corresponding to the set environment, the wavelength-conversion efficiency of wavelength-conversion of signal light into converted light increases.

Figure 26:
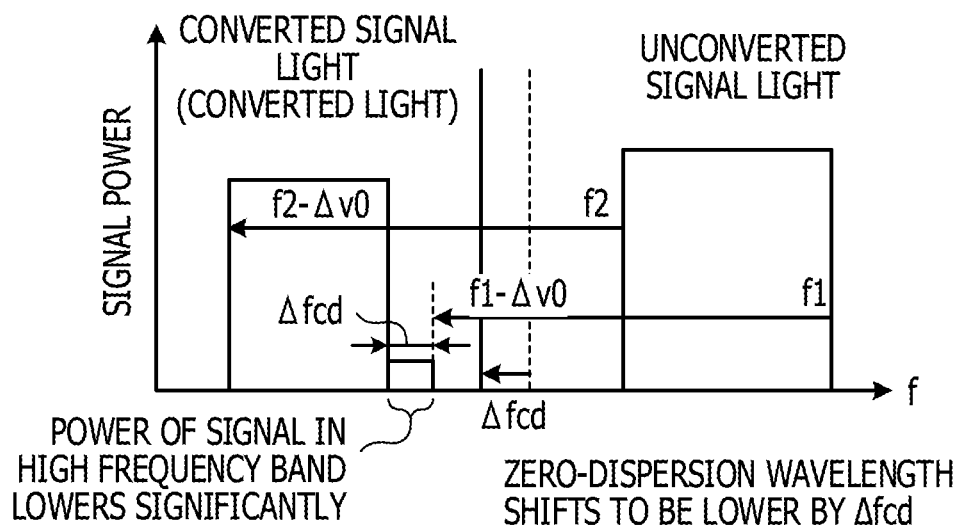
FIG. 26 is an explanatory figure illustrating an exemplary relationship between signal light and converted light in a case where a zero-dispersion frequency of a nonlinear fiber is shifted to be lower than a zero-dispersion frequency corresponding to a set environment.

FIG. 26 is an explanatory figure illustrating an exemplary relationship between signal light and converted light in a case where a zero-dispersion frequency of a nonlinear fiber is shifted to be lower than a zero-dispersion frequency corresponding to a set environment. The nonlinear fiber illustrated by reference to FIG. 26 may be the nonlinear fiber 116 illustrated in FIG. 23. If the zero-dispersion frequency of the nonlinear fiber 116 is shifted to be lower than the zero-dispersion frequency corresponding to the set environment by Δfcd, for example, converted light of unconverted signal light f1 is generated to have a frequency f1−Δv0, and converted light of unconverted signal light f2 is generated to have a frequency f2−Δv0. However, since the zero-dispersion frequency of the nonlinear fiber 116 is shifted to be lower than the zero-dispersion frequency suited to the set environment by Δfcd, the signal power of the converted light on the high frequency band side lowers significantly as illustrated in FIG. 26.

Figure 27:
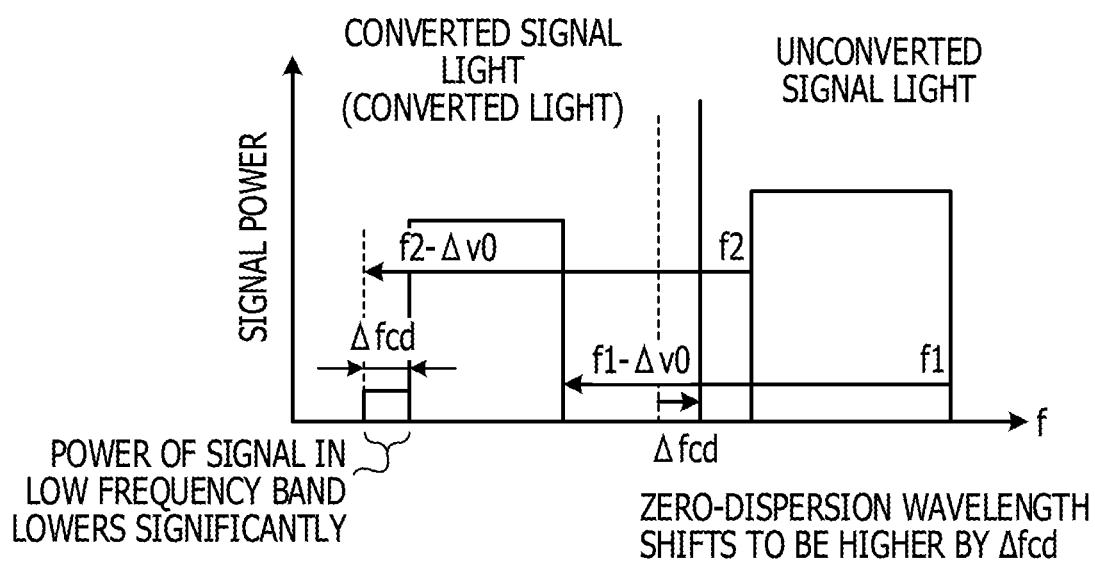
FIG. 27 is an explanatory figure illustrating an exemplary relationship between signal light and converted light in a case where a zero-dispersion frequency of a nonlinear fiber is shifted to be higher than a zero-dispersion frequency corresponding to a set environment.

FIG. 27 is an explanatory figure illustrating an exemplary relationship between unconverted signal light and converted signal light in a case where the zero-dispersion frequency of a nonlinear fiber is shifted to be higher than a zero-dispersion frequency corresponding to a set environment. The nonlinear fiber illustrated by reference to FIG. 27 may be the nonlinear fiber 116 illustrated in FIG. 23. If the zero-dispersion frequency of the nonlinear fiber 116 is shifted to be higher than the zero-dispersion frequency corresponding to the set environment by Δfcd, for example, converted light of unconverted signal light f1 is generated to have a frequency f1−Δv0, and converted light of unconverted signal light f2 is generated to have a frequency f2−Δv0. However, since the zero-dispersion frequency of the nonlinear fiber 116 is shifted to be higher than the zero-dispersion frequency suited to the set environment by Δfcd, the signal power of the converted light in the low frequency band lowers significantly as illustrated in FIG. 27.

Figure 28:
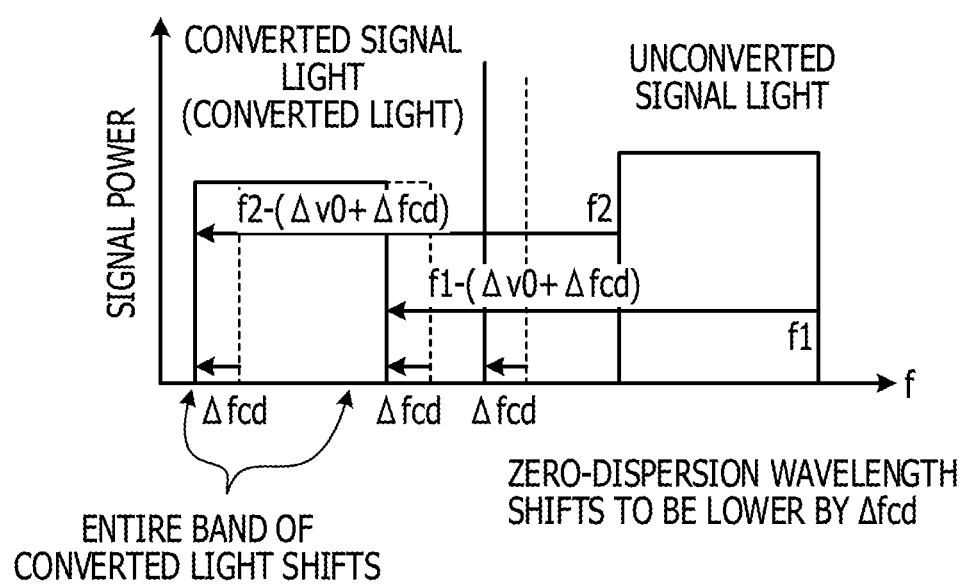
FIG. 28 is an explanatory figure illustrating an exemplary relationship between signal light and converted light in a case where a zero-dispersion frequency of a nonlinear fiber is shifted by correction.

FIG. 28 is an explanatory figure illustrating an exemplary relationship between signal light and converted light in a case where a zero-dispersion frequency of a nonlinear fiber is shifted by correction. The nonlinear fiber illustrated by reference to FIG. 28 may be the nonlinear fiber 116 illustrated in FIG. 23. By adding an error Δfcd to an excitation light frequency difference Δv0 of the wavelength converter 110 to change the excitation light frequency difference without changing the zero-dispersion frequency, deterioration of signal power of converted light may be suppressed. However, it is supposed that the zero-dispersion frequency of the nonlinear fiber 116 is shifted to be lower than the zero-dispersion frequency corresponding to the set environment by Δfcd. In this case, for example, converted light of unconverted signal light f1 shifts to have a frequency f1−(Δv0+Δfcd), and converted light of unconverted signal light f2 shifts to have a frequency f2−(Δv0+Δfcd). However, if the excitation light frequency difference Δv0 is changed, the entire frequency band of wavelength-converted signal light (converted light) is shifted by Δfcd as illustrated in FIG. 28. As a result, a mismatch occurs between a local emission light wavelength and a reception light wavelength, and the reception quality deteriorates.

Figure 29:
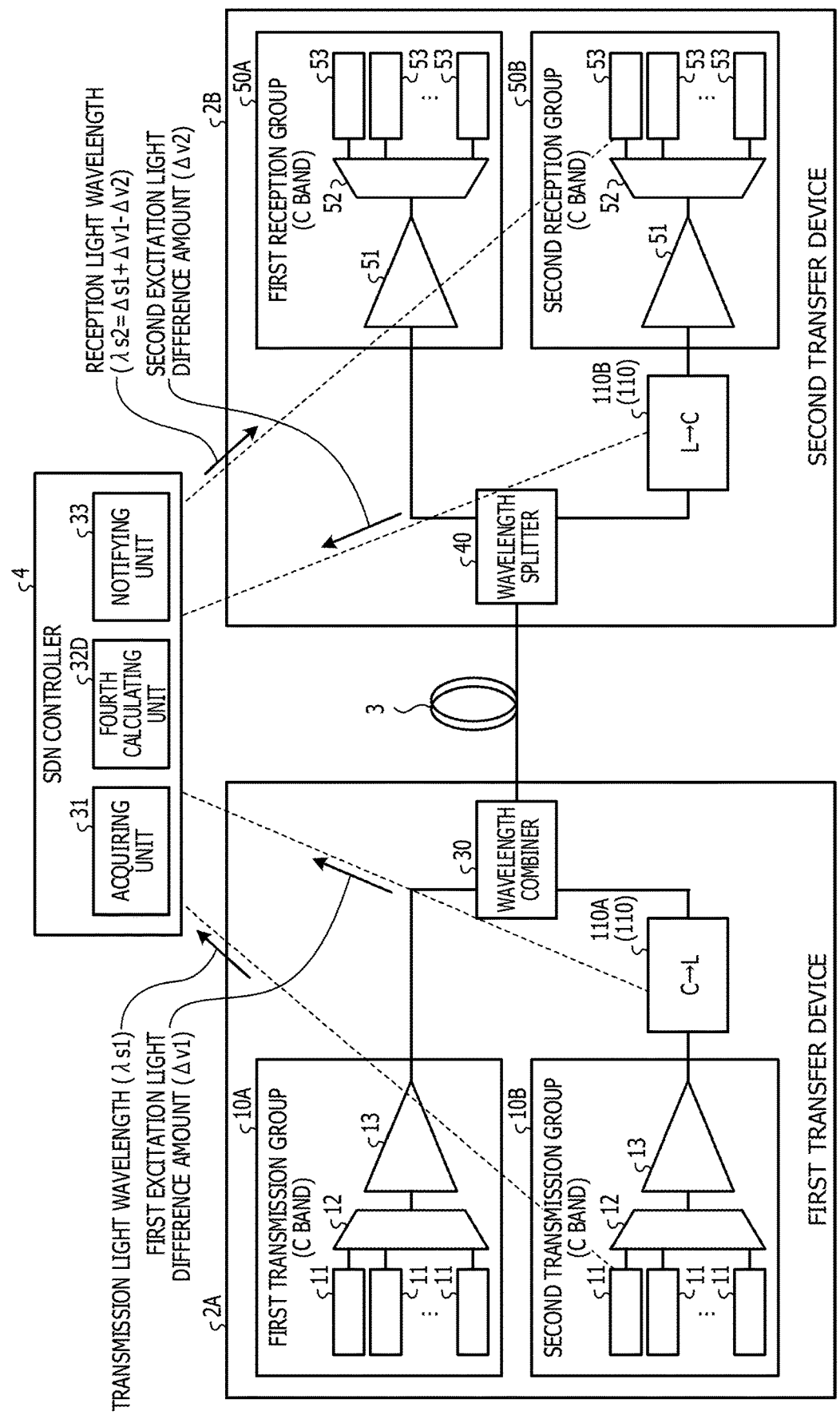
FIG. 29 is an explanatory figure illustrating an exemplary WDM system in an eleventh embodiment.

In view of this, to cope with such a situation, an embodiment of a WDM system 1K to which the non-degenerate four-wave mixing wavelength converter 110 is applied is explained below as an eleventh embodiment. FIG. 29 is an explanatory figure illustrating an exemplary WDM system 1K in the eleventh embodiment. The same configurations as those in the WDM system 1 illustrated in FIG. 1 are given the same signs, and explanations about the overlapping configurations and operation are omitted.

The WDM system 1K illustrated in FIG. 29 is different from the WDM system 1 illustrated in FIG. 1 in that a twenty-first wavelength converter 110A, and a twenty-second wavelength converter 110B are arranged, instead of the degenerate four-wave mixing first wavelength converter 20A, and second wavelength converter 20B. The twenty-first wavelength converter 110A, and twenty-second wavelength converter 110B are non-degenerate four-wave mixing wavelength converters. A fourth calculating unit 32D is arranged in the SDN controller 4, instead of the calculating unit 32.

The acquiring unit 31 in the SDN controller 4 acquires a transmission light wavelength λs1 from each transmitter 11 in the second transmission group 10B through the information communicating unit 4A. The acquiring unit 31 acquires a first excitation light difference amount Δv1 from the twenty-first wavelength converter 110A through the information communicating unit 4A. The first excitation light difference amount Δv1 is the difference between eleventh excitation light of the first excitation light source 113A, and twelfth excitation light of the second excitation light source 113B in the twenty-first wavelength converter 110A. The acquiring unit 31 acquires a second excitation light difference amount Δv2 from the twenty-second wavelength converter 110B through the information communicating unit 4A. The second excitation light difference amount Δv2 is the difference between eleventh excitation light of the first excitation light source 113A, and twelfth excitation light of the second excitation light source 113B in the twenty-second wavelength converter 110B.

The fourth calculating unit 32D in the SDN controller 4 uses the formula, (Δv2−Δv1)+λs1, to calculate a reception light wavelength λs2 based on a transmission light wavelength λs1, a first excitation light difference amount Δv1, and a second excitation light difference amount Δv2. The notifying unit 33 in the SDN controller 4 notifies the calculated reception light wavelength λs2 to a corresponding receiver 53 through the information communicating unit 4A. The receiving-side CPU 53D in the receiver 53 that communicates with a transmitter 11 that uses the transmission light wavelength λs1 sets the reception light wavelength λs2 as the local emission light wavelength.

Figure 30:
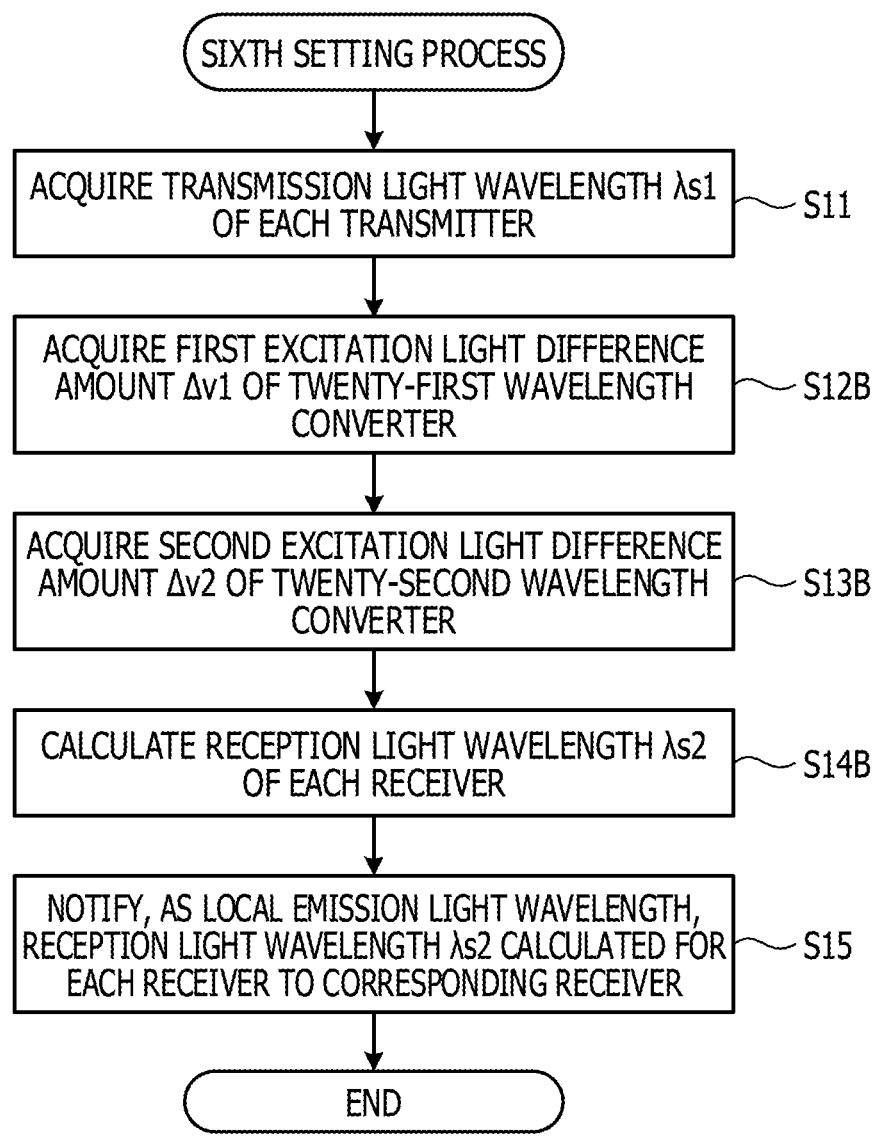
FIG. 30 is a flow diagram illustrating exemplary processing operation to be performed at a CPU in an SDN controller related to a sixth setting process.

Next, operation of the WDM system 1K in the eleventh embodiment is explained. FIG. 30 is a flow diagram illustrating exemplary processing operation to be performed at a CPU in an SDN controller related to a sixth setting process. The CPU and the SDN controller described by reference to FIG. 30 may be the CPU 4C and the SDN controller 4 illustrated in FIG. 6. In FIG. 30, the acquiring unit 31 acquires the transmission light wavelength λs1 of each transmitter 11 from each transmitter 11 in the second transmission group 10B through the information communicating unit 4A (Step S11). The transmission light wavelength λs1 is the wavelength of transmission light which is different for each transmitter 11 in the second transmission group 10B. The acquiring unit 31 acquires a first excitation light difference amount $\Delta v1$ from the twenty-first wavelength converter 110A through the information communicating unit 4A (Step S12B). The acquiring unit 31 acquires a second excitation light difference amount $\Delta v2$ from the twenty-second wavelength converter 110B through the information communicating unit 4A (Step S13B). The fourth calculating unit 32D uses the formula, $(\Delta v2-\Delta v1)+\lambda s1$, to calculate the reception light wavelength $\lambda s2$ of the receiver 53 corresponding to a transmitter 11 (Step S14B). The notifying unit 33 notifies, as the local emission light wavelength, the reception light wavelength $\lambda s2$ calculated for each receiver 53 to a corresponding receiver 53 through the information communicating unit 4A (Step S15), and ends the processing operation illustrated in FIG. 30.

Each receiver 53 receives a reception light wavelength $\lambda s2$ from the SDN controller 4, and sets the reception light wavelength $\lambda s2$ as the local emission light wavelength in the local emission light source 53A. As a result, since, in the receiver 53, a mismatch between a local emission light wavelength and a reception light wavelength is removed, deterioration of reception quality may be suppressed.

The SDN controller 4 in the eleventh embodiment acquires the transmission light wavelength $\lambda s1$ of each transmitter 11 in the second transmission group 10B, the first excitation light difference amount $\Delta v1$ of the twenty-first wavelength converter 110A, and the second excitation light difference amount $\Delta v2$ of the twenty-second wavelength converter 110B. The SDN controller 4 uses the formula, $2(\Delta v2-\Delta v1)+\lambda s1$, to calculate the reception light wavelength $\lambda s2$ of each receiver 53 in the second reception group 50B, and notifies each receiver 53 of the reception light wavelength $\lambda s2$. As a result, since the receiver 53 sets the received reception light wavelength $\lambda s2$ as the local emission light wavelength, deterioration of reception quality may be suppressed even if non-degenerate four-wave mixing wavelength converters are used.

The acquiring unit 31 acquires the first excitation light difference amount $\Delta v1$ from the twenty-first wavelength converter 110A, and acquires the second excitation light difference amount $\Delta v2$ from the twenty-second wavelength converter 110B. However, the acquiring unit 31 may acquire an excitation light wavelength of the first excitation light source 113A, and an excitation light wavelength of the second excitation light source 113B from the twenty-first wavelength converter 110A. In this case, the fourth calculating unit 32D may use the excitation light wavelength of the first excitation light source 113A, and the excitation light wavelength of the second excitation light source 113B to calculate the first excitation light difference amount $\Delta v1$, and second excitation light difference amount $\Delta v2$, and configurations related to this may be changed as appropriate.

Although the fourth calculating unit 32D uses the formula, $(\Delta v2-\Delta v1)+\lambda s1$, to calculate a reception light wavelength $\lambda s2$ of each receiver 53 in the second reception group 50B, receivers 53 themselves may calculate reception light wavelengths $\lambda s2$, and configurations related to this may be changed as appropriate.

Although the WDM system 1K in the eleventh embodiment including one span of a transfer line fiber 3 between the first transfer device 2A and the second transfer device 2B is illustrated as an example, the present embodiment may be applied to a WDM system including a plurality of (N) spans. Using the formula, $2\times\Sigma[$(the second excitation light difference amounts $\Delta v2$ of the N spans of twenty-second wavelength converters 110B)−(the first excitation light difference amounts $\Delta v1$ of the N spans of twenty-first wavelength converters 110A)]+(the transmission light wavelength $\Delta s1$), the reception light wavelength $\lambda s2$ of a receiver 53 may be calculated even in the case of N spans.

Figure 31:
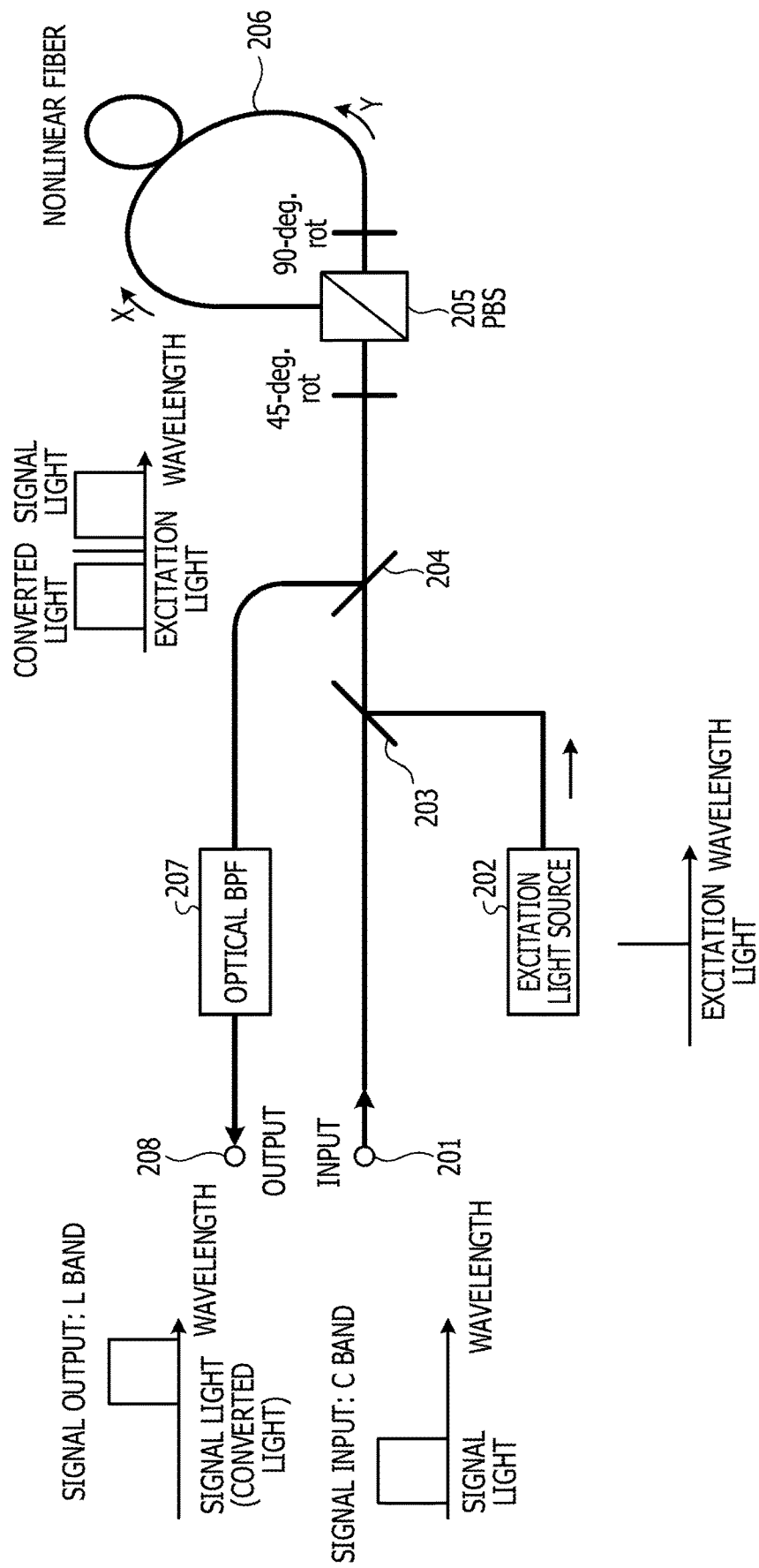
FIG. 31 is an explanatory figure illustrating an exemplary degenerate four-wave mixing wavelength converter.

Degenerate four-wave mixing wavelength converters are employed for the WDM system 1 in the above-mentioned first embodiment. In the wavelength converters, the four-wave mixing (FWM) nonlinear optical phenomenon is utilized, for example. FIG. 31 is an explanatory figure illustrating an exemplary wavelength converter. The wavelength converter 200 illustrated in FIG. 31 is a degenerate four-wave mixing wavelength converter. The wavelength converter 200 includes an input port 201, an excitation light source 202, a WDM coupler 203, an optical circulator 204, and a PBS 205. The wavelength converter 200 includes a nonlinear fiber 206, an optical BPF 207, and an output port 208. For example, if the wavelength converter 200 performs wavelength-conversion of C-band multiplexed light into L-band multiplexed light, wavelength-unconverted C-band multiplexed light is signal light, and wavelength-converted L-band multiplexed light is converted light.

The input port 201 is a port through which signal light is input. The excitation light source 202 is a laser diode (LD) that outputs excitation light. The WDM coupler 203 combines signal light from the input port 201, and excitation light from the excitation light source 202. The optical circulator 204 outputs signal light and excitation light from the WDM coupler 203 to the PBS 205, and outputs wavelength-converted converted light, signal light, and excitation light from the PBS 205 to the optical BPF 207. The PBS 205 polarizes and splits wavelength-unconverted signal light, and excitation light into vertically polarized signal light, and excitation light, and horizontally polarized signal light, and excitation light. The PBS 205 inputs the vertically polarized signal light, and excitation light from the nonlinear fiber 206 in the X-direction, and inputs the horizontally polarized signal light, and excitation light from the nonlinear fiber 206 in the Y-direction.

The nonlinear fiber 206 uses four-wave mixing of the horizontally polarized excitation light, and horizontally polarized signal light to perform wavelength-conversion of the horizontally polarized signal light into horizontally polarized converted light while keeping the horizontally polarized signal light. The nonlinear fiber 206 outputs the horizontally polarized converted light, signal light, and excitation light to the PBS 205. The nonlinear fiber 206 uses four-wave mixing of the vertically polarized excitation light, and vertically polarized signal light to perform wavelength-conversion of the vertically polarized signal light into vertically polarized converted light while keeping the vertically polarized signal light. The nonlinear fiber 206 outputs the vertically polarized converted light, signal light, and excitation light to the PBS 205.

The PBS 205 combines the vertically polarized converted light, excitation light, and signal light, and the horizontally polarized converted light, excitation light, and signal light, and outputs the wavelength-converted converted light, signal light, and excitation light to the optical circulator 204. The optical circulator 204 outputs the wavelength-converted converted light, signal light, and excitation light to the optical BPF 207. The optical BPF 207 extracts only the converted light from the wavelength-converted converted light, signal light, and excitation light, and outputs the extracted converted light to the output port 208. The wavelength converter 200 eventually may perform wavelength-conversion of C-band multiplexed light into L-band multiplexed light, for example.

Figure 32:
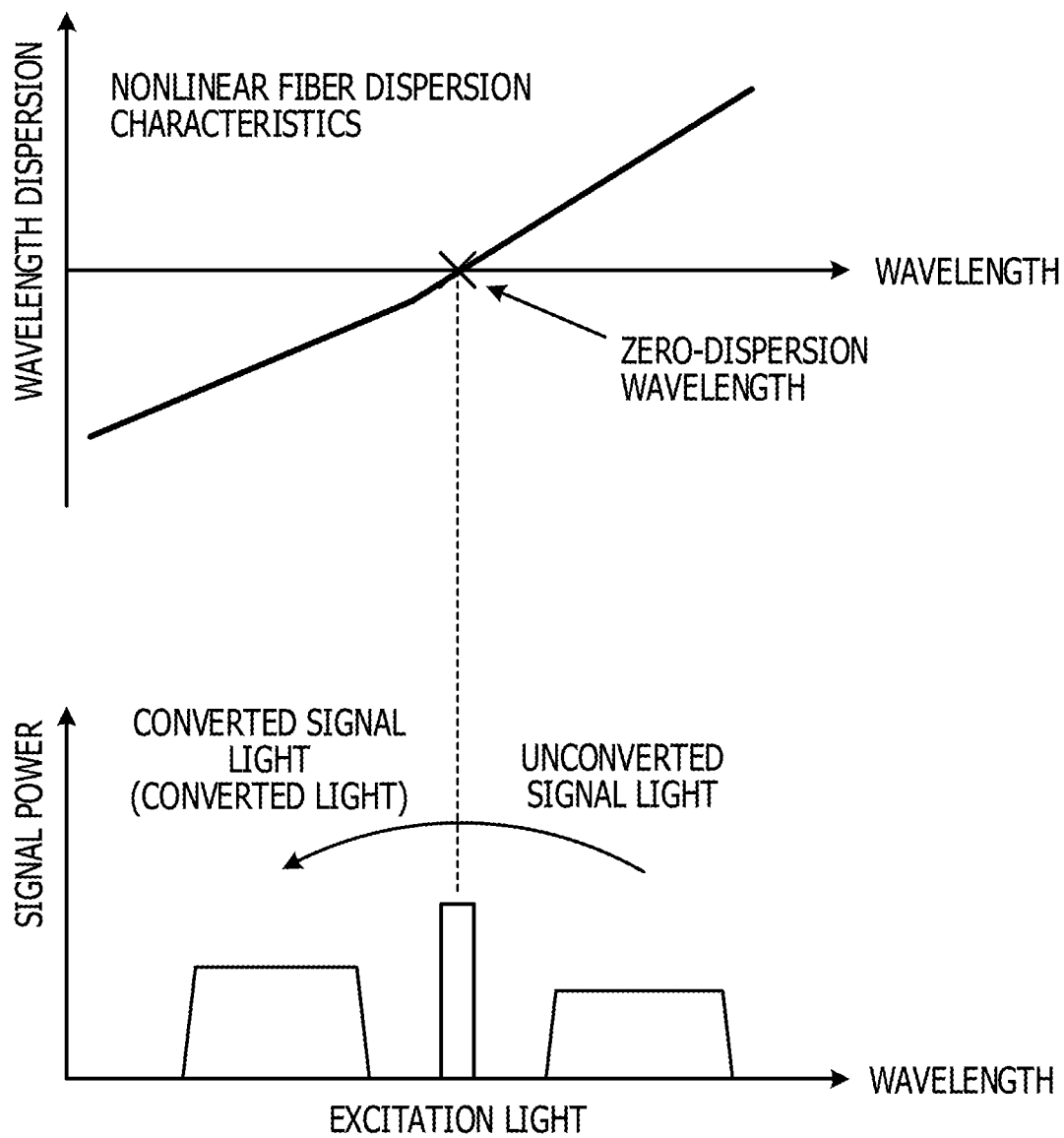
FIG. 32 is an explanatory figure illustrating an exemplary relationship between signal light and converted light in a case where a zero-dispersion wavelength of a nonlinear fiber matches an excitation light wavelength.

It is important in the wavelength converter 200 to make the zero-dispersion wavelength of the nonlinear fiber 206 and an excitation light wavelength matched in order to enhance the power efficiency of wavelength-converted signal light (converted light) relative to the power of wavelength-unconverted signal light, for example, the wavelength-conversion efficiency, for example. FIG. 32 is an explanatory figure illustrating an exemplary relationship between signal light and converted light in a case where the zero-dispersion wavelength of a nonlinear fiber and an excitation light wavelength are matched. The nonlinear fiber illustrated by reference to FIG. 32 may be the nonlinear fiber 206 illustrated in FIG. 31. If the excitation light wavelength matches the zero-dispersion wavelength of the nonlinear fiber 206, the wavelength-conversion efficiency of wavelength-conversion of signal light into converted light increases as illustrated in FIG. 32.

Figure 33:
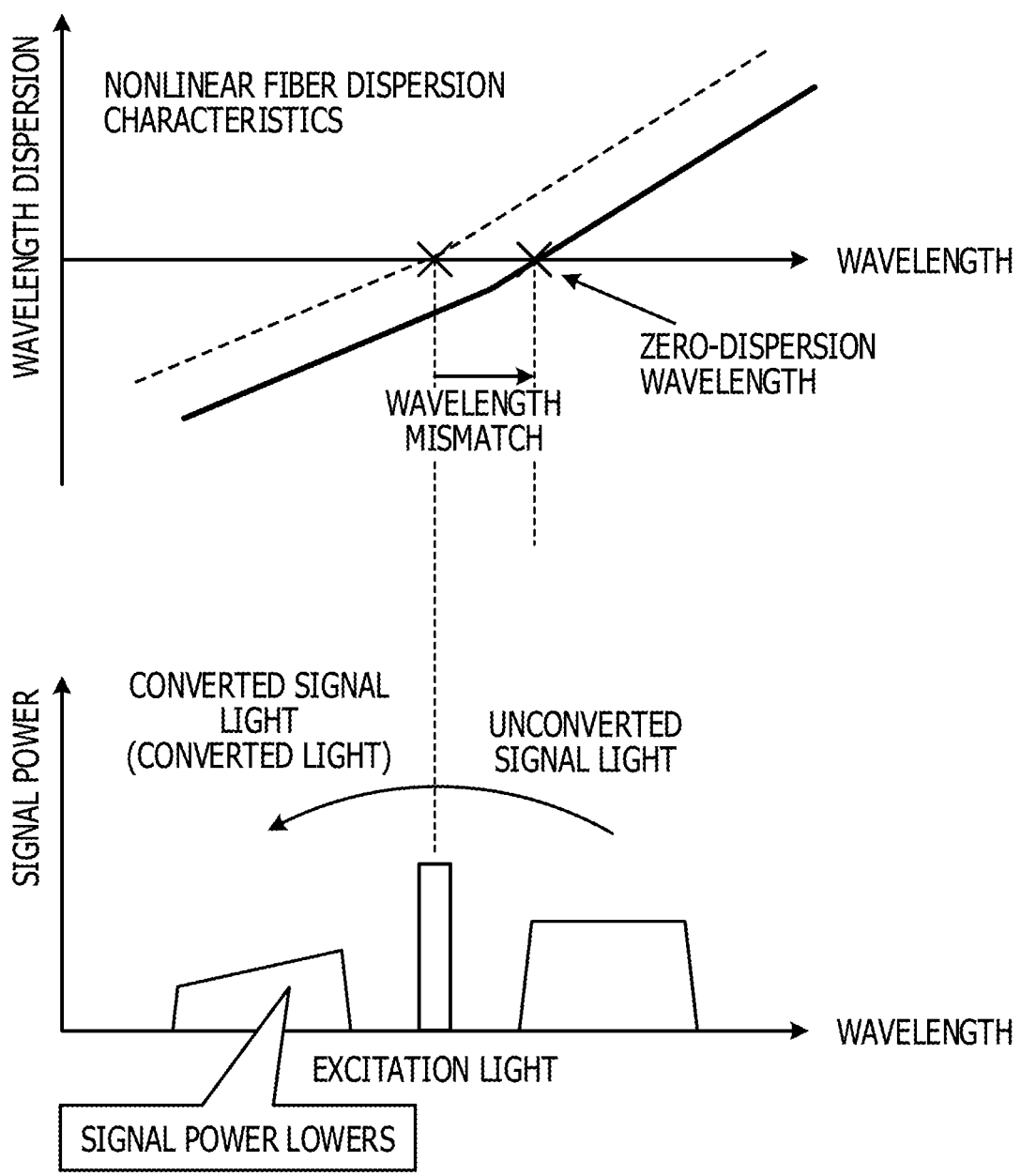
FIG. 33 is an explanatory figure illustrating an exemplary relationship between signal light and converted light in a case where a zero-dispersion wavelength of a nonlinear fiber does not match an excitation light wavelength.

FIG. 33 is an explanatory figure illustrating an exemplary relationship between signal light and converted light in a case where a zero-dispersion wavelength of a nonlinear fiber and an excitation light wavelength are not matched. The nonlinear fiber illustrated by reference to FIG. 33 may be the nonlinear fiber 206 illustrated in FIG. 31. The nonlinear fiber 206 has the zero-dispersion wavelength that changes according to manufacturing errors, temperature changes, or the like, for example. If the zero-dispersion wavelength changes, a wavelength mismatch occurs between the zero-dispersion wavelength and the excitation light wavelength. If a wavelength mismatch occurs between the zero-dispersion wavelength and the excitation light wavelength, lowering of the power of wavelength-converted signal light (converted light), or tilting (inclination) between converted light in the same wavelength band occurs, as illustrated in FIG. 33. As a result, lowering of the power of converted light, or tilting between converted light leads to lowering of the input power of a receiver that receives the converted light, or deterioration of reception quality due to an increase of the amplified spontaneous emission (ASE) noise amount of a receiving-side optical amplifier.

Figure 34:
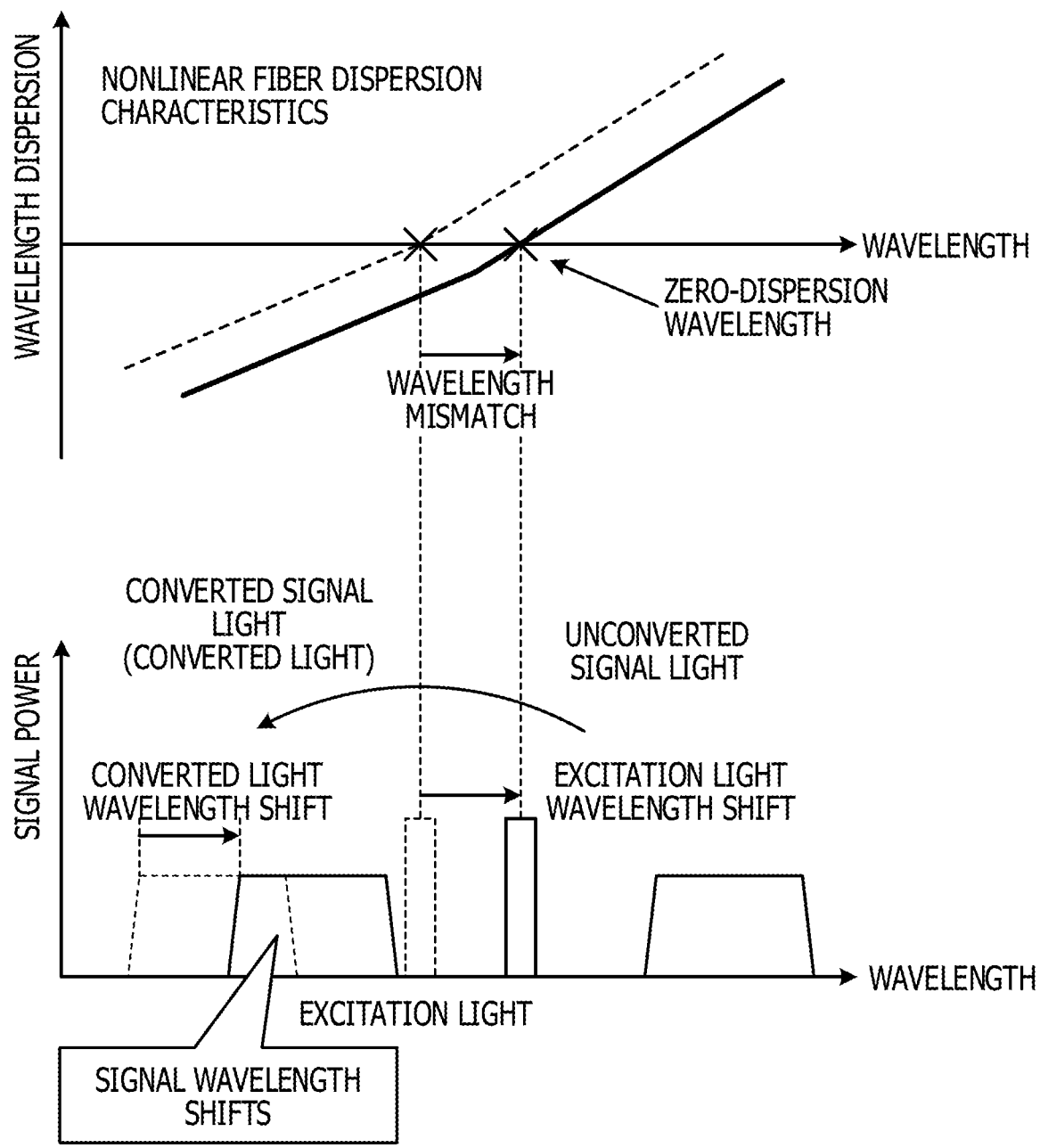
FIG. 34 is an explanatory figure illustrating an exemplary relationship between signal light and converted light after excitation light wavelength shifting.

In view of this, as a measure to correct a mismatch of the zero-dispersion wavelength of the nonlinear fiber 206, a method of shifting the excitation light wavelength of the wavelength converter 200 such that the excitation light wavelength matches the zero-dispersion wavelength of the nonlinear fiber 206, and suppress deterioration of the power of a wavelength-converted signal is conceivable. FIG. 34 is an explanatory figure illustrating an exemplary relationship between signal light and converted light after excitation light wavelength shifting. In this method, since shifting of an excitation light wavelength leads to shifting of the entire band of the wavelength-converted signal light, the power lowers significantly in a partial band of the wavelength-converted signal light, for example, in a low wavelength band, as illustrated in FIG. 34. As a result, since it is not possible to recognize, on the side of a receiver, to what extent the wavelength of reception light is shifted, the reception quality deteriorates significantly due to a mismatch between a local emission light wavelength of a receiver to receive the converted light as reception light and a reception light wavelength.

However, in the WDM system 1 in the first embodiment, since the wavelength of local emission light of a receiver 53 is corrected to match a reception light wavelength, lowering of a signal power caused by a mismatch of the zero-dispersion wavelength of a nonlinear fiber in the wavelength converter 20, and deterioration of reception quality due to the influence of a signal wavelength mismatch may be suppressed.

Although the wavelength converter 20 in the present embodiment refers to a zero-dispersion wavelength table to set the excitation light wavelength of the zero-dispersion wavelength according to a current internal temperature, this is not the sole example, signal light power may be monitored, and the excitation light wavelength may be adjusted such that the signal power is optimized.

The SDN controller 4 uses a transmission light wavelength $\lambda s1$, a first excitation light wavelength $\lambda p1$, and a second excitation light wavelength $\lambda p2$ to calculate a reception light wavelength $\lambda s2$ which is the reception light wavelength, and shifts the wavelength of local emission light such that it matches the reception light wavelength $\lambda s2$. However, the wavelength of transmission light may be shifted instead of the local emission light wavelength. Both transmission light and local emission light may be shifted bidirectionally such that reception light and the local emission light match.

If a single light source is used for both signal light and local emission light of a transceiver, and a bidirectional wavelength converter that uses a common excitation wavelength bidirectionally is applied, the wavelengths of reception light and local emission light may be made matched.

Even if the ROADMs are pass-through modulators, the number of stages of passage through wavelength converters increases. In this case also, the wavelength of reception signal may be calculated in the same way of thinking as that of the above-mentioned means for solution of the present embodiment.

In the examples illustrated, an EDFA is used as the C-band and L-band light optical amplifier 13, and a thulium doped fiber amplifier is used as the S-band optical amplifier 13. However, a praseodymium doped fiber amplifier or the like may be used as an original (O)-band optical amplifier, and configurations related to this may be changed as appropriate. A semiconductor optical amplifier or Raman amplifier may be used, for example, as an extended (E)-band or ultralong-wavelength (U)-band optical amplifier, and configurations related to this may be changed as appropriate.

The present embodiment illustrated, as an example, wavelength converters that perform wavelength-conversion of C-band first multiplexed light into L-band second multiplexed light, for example. However, the present embodiment may be applied not only to wavelength converters that perform wavelength-conversion of multiplexed light, but also to wavelength converters that perform wavelength-conversion of C-band signal light into L-band converted light, and configurations related to this may be changed as appropriate. Although the C band is used as the reference band for convenience of explanation, the present embodiment may be applied to a transfer system in the case where wavelength-conversion is performed between the S band and the L band, both from the S band to L band, and from the L band to the S band, and configurations related to this may be changed as appropriate.

In the first transfer device 2A in the above-mentioned embodiment, excitation light used for the wavelength converter 20 may be re-utilized for another wavelength converter 20 in the same device. Furthermore, excitation light used for optical components such as an optical amplifier may be used for a wavelength converter or another optical component in the same device, and configurations related to this may be changed as appropriate.

Although the wavelength converter 20 converts multiplexed light into light in an arbitrary wavelength band by propagating the multiplexed light and excitation light through a nonlinear fiber, frequency modulated (FM) (or phase modulated (PM)) excitation light may be used.

In the above-mentioned embodiment, a system that uses C-band optical components, performs wavelength-conversion of C-band multiplexed light into S-band or L-band light, and transfers the light to the transfer line fiber 3 is illustrated as an example. However, the present embodiment may be applied to a system that uses S-band optical components, performs wavelength-conversion of S-band multiplexed light into C-band or L-band light, and transfers the light to the transfer line fiber 3, or a system that uses L-band optical components, performs wavelength-conversion of L-band multiplexed light into C-band or S-band light, and transfers the light to the transfer line fiber 3.

Although in the above-mentioned embodiment, the ranges of C-band, S-band, and L-band wavelengths are defined, these wavelength ranges are not the sole examples, and settings of the ranges may be changed as appropriate. Furthermore, although in the above-mentioned embodiment, the case where the C band, S band, and L band are used is illustrated as an example, bands that may be used are not limited to the C band, S band, and L band. For example, the present embodiment may be applied to the O band, E band, or U band, and configurations related to this may be changed as appropriate.

For example, although an illustrated example of the transfer device 2A (2B) has a built-in transmitting unit or receiving unit, the present embodiment may be applied also to the transfer device 2A (2B) that is externally couple to a transmitting unit or receiving unit.

For example, an illustrated example of the SDN controller 4 uses a transmission light wavelength λs1, a first excitation light wavelength λp1, and a second excitation light wavelength λp2 to calculate a reception light wavelength λs2 which is the reception light wavelength, and decides a local emission light wavelength based on the calculated reception light wavelength λs2. However, for example, the second transfer device 2B may acquire a transmission light wavelength λs1 from a transmitter 11 in the first transfer device 2A, a first excitation light wavelength λp1 from the first wavelength converter 20A, and a second excitation light wavelength λp2 from the second wavelength converter 20B. The second transfer device 2B may calculate a reception light wavelength λs2 from the transmission light wavelength λs1, first excitation light wavelength λp1, and second excitation light wavelength λp2, and decide a local emission light wavelength based on the calculated reception light wavelength λs2, and configurations related to this may be changed as appropriate. The receiver 53 may acquire a transmission light wavelength λs1, a first excitation light wavelength λp1, and a second excitation light wavelength λp2, and calculate a reception light wavelength λs2 from the acquired transmission light wavelength λs1, first excitation light wavelength λp1, and second excitation light wavelength λp2. The receiver 53 may decide a local emission light wavelength based on the calculate reception light wavelength λs2, and configurations related to this may be changed as appropriate.

The SDN controller 4 may control the wavelength of second excitation light in the second wavelength converter 20B such that the difference between a first excitation light wavelength λp1 and a second excitation light wavelength λp2 becomes small, and configurations related to this may be changed as appropriate.

Although it is described in the embodiments that a wavelength and a wavelength are the same or made matched for convenience of explanation, they are not necessarily the same or made matched, but only have to have a small difference, and configurations related to this may be changed as appropriate.

The individual configurations of illustrated units are not necessarily required to be configured physically as illustrated. For example, the specific forms of distribution/integration of individual units are not limited to the illustrated ones, and they may be configured by being functionally or physically distributed/integrated entirely or partially in arbitrary units according to various types of loads, situations of use, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transfer system comprising:
    a transmitter configured to transmit transmission light;
    a first wavelength converter configured to use first excitation light to perform wavelength-conversion of first signal light which is the transmission light into second signal light in a different wavelength band;
    a second wavelength converter configured to use second excitation light to perform wavelength-conversion of the second signal light into third signal light in a different wavelength band;
    a receiver configured to use local emission light to receive the third signal light as reception light; and
    a control device configured to acquire a wavelength of the transmission light, a wavelength of the first excitation light, and a wavelength of the second excitation light, and decide a wavelength of local emission light of the receiver based on a wavelength of the reception light of the receiver obtained from the wavelength of the transmission light, the wavelength of the first excitation light, and the wavelength of the second excitation light.

2. The optical transfer system according to claim 1, further comprising:
    a transparently transmitting portion located between the transmitter and the receiver, and configured to transparently transmit light with the wavelength of the reception light received by the receiver, wherein
    the control device notifies the transparently transmitting portion of the wavelength of the reception light such that a difference between the wavelength of the reception light of the receiver and a transparently transmitted wavelength of the transparently transmitting portion is reduced.

3. The optical transfer system according to claim 1, wherein the control device calculates a difference amount between the wavelength of the first excitation light and the wavelength of the second excitation light, and notifies the transmitter of the difference amount such that, based on the difference amount, the wavelength of the transmission light is shifted to reduce a difference between the wavelength of the reception light and the wavelength of the local emission light.

4. The optical transfer system according to claim 1, wherein the control device calculates a difference amount between the wavelength of the first excitation light and the wavelength of the second excitation light, and notifies the receiver and the transmitter of the difference amount such that, based on the difference amount, a difference between the wavelength of the reception light and the wavelength of the local emission light is reduced.

5. The optical transfer system according to claim 4, wherein
when the transmitter receives the difference amount, the transmitter shifts the wavelength of the transmission light based on the difference amount, and
when the receiver receives the difference amount, the receiver shifts the wavelength of the local emission light of the receiver based on the difference amount.

6. The optical transfer system according to claim 1, wherein the first wavelength converter and the second wavelength converter are degenerate four-wave mixing wavelength converters.

7. The optical transfer system according to claim 1, wherein
the first wavelength converter is a non-degenerate four-wave mixing wavelength converter, and uses third excitation light and fourth excitation light in the first excitation light to perform wavelength-conversion of the first signal light from the transmitter into the second signal light,
the second wavelength converter is a non-degenerate four-wave mixing wavelength converter, and uses fifth excitation light and sixth excitation light in the second excitation light to perform wavelength-conversion of second signal light from the first wavelength converter into the third signal light, and
the control device calculates the wavelength of the reception light of the receiver based on: a first difference amount which is a difference between a wavelength of the third excitation light and a wavelength of the fourth excitation light; a second difference amount which is a difference between a wavelength of the fifth excitation light and a wavelength of the sixth excitation light; and the wavelength of the transmission light of the transmitter.

8. The optical transfer system according to claim 1, wherein the control device calculates the wavelength of the reception light based on: the wavelength of the transmission light; a difference amount of the wavelength of the first excitation light; and a difference amount of the wavelength of the second excitation light.

9. The optical transfer system according to claim 1, wherein the control device controls the wavelength of the second excitation light such that a difference between the wavelength of the first excitation light and the wavelength of the second excitation light is reduced.

10. A control device comprising:
a memory; and
a processor coupled to the memory and configured to
acquire a wavelength of transmission light from a transmitter, a wavelength of first excitation light from a first wavelength converter that uses the first excitation light to perform wavelength-conversion of first signal light which is the transmission light into second signal light in a different wavelength band, and a wavelength of second excitation light from a second wavelength converter that uses the second excitation light to perform wavelength-conversion of the second signal light into third signal light in a different wavelength band, and
decide local emission light of a receiver that receives the third signal light as reception light based on a wavelength of the reception light of the receiver obtained from the wavelength of the transmission light, the wavelength of the first excitation light, and the wavelength of the second excitation light.

11. The control device according to claim 10, wherein the processor calculates a difference amount between the wavelength of the first excitation light and the wavelength of the second excitation light, and notifies the transmitter of the difference amount such that, based on the difference amount, the wavelength of the transmission light is shifted to reduce a difference between the wavelength of the reception light and the wavelength of the local emission light.

12. The control device according to claim 10, wherein the processor calculates a difference amount between the wavelength of the first excitation light and the wavelength of the second excitation light, and notifies the receiver and the transmitter of the difference amount such that, based on the difference amount, a difference between the wavelength of the reception light and the wavelength of the local emission light is reduced.

13. An optical transfer method of an optical transfer system including: a transmitter configured to transmit transmission light; a first wavelength converter configured to use first excitation light to perform wavelength-conversion of first signal light which is the transmission light into second signal light in a different wavelength band; a second wavelength converter configured to use second excitation light to perform wavelength-conversion of the second signal light into third signal light in a different wavelength band; and a receiver configured to use local emission light to receive the third signal light as reception light, the method comprising:
acquiring a wavelength of the transmission light, a wavelength of the first excitation light, and a wavelength of the second excitation light; and
deciding local emission light of the receiver based on a wavelength of reception light of the receiver obtained from the wavelength of the transmission light, the wavelength of the first excitation light, and the wavelength of the second excitation light.

14. A transfer device comprising:
a memory; and
a processor coupled to the memory and configured to
acquire a wavelength of transmission light from a transmitter, a wavelength of first excitation light from a first wavelength converter that uses the first excitation light to perform wavelength-conversion of first signal light which is the transmission light from the transmitter into second signal light in a different wavelength band, and a wavelength of second excitation light from a second wavelength converter that uses the second excitation light to perform wavelength-conversion of the second signal light into third signal light in a different wavelength band, and
decide a wavelength of local emission light received as the third signal light as reception light based on a wavelength of the reception light obtained from the wavelength of the transmission light, the wavelength of the first excitation light, and the wavelength of the second excitation light.

* * * * *